US009810446B2

(12) United States Patent
Harada et al.

(10) Patent No.: US 9,810,446 B2
(45) Date of Patent: Nov. 7, 2017

(54) CONTROL METHOD OF TERMINAL DEVICE IN AIR CONDITIONING CONTROL SYSTEM WITH SELECTABLE OPERATING MODE ACCORDING TO TIME AND CHARGES, AND NON-TRANSITORY COMPUTER-READABLE RECORDING MEDIUM STORING A PROGRAM

(71) Applicant: Panasonic Intellectual Property Corporation of America, Torrance, CA (US)

(72) Inventors: Naoyuki Harada, Osaka (JP); Takamitsu Sasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 343 days.

(21) Appl. No.: 14/682,329

(22) Filed: Apr. 9, 2015

(65) Prior Publication Data
US 2015/0308708 A1 Oct. 29, 2015

Related U.S. Application Data

(60) Provisional application No. 61/985,995, filed on Apr. 29, 2014.

(30) Foreign Application Priority Data

Jul. 8, 2014 (JP) ................................ 2014-140882

(51) Int. Cl.
*F24F 11/00* (2006.01)
*F24D 19/10* (2006.01)
(Continued)

(52) U.S. Cl.
CPC ...... *F24F 11/0086* (2013.01); *F24D 19/1084* (2013.01); *F24F 11/006* (2013.01); *G05F 1/66* (2013.01); *G06Q 20/085* (2013.01); *G06Q 50/06* (2013.01); *F24F 11/0012* (2013.01); *F24F 2011/0047* (2013.01);
(Continued)

(58) Field of Classification Search
None
See application file for complete search history.

(56) References Cited

U.S. PATENT DOCUMENTS

2006/0195801 A1* 8/2006 Iwamura ............... G06F 3/0362
715/864
2011/0153090 A1* 6/2011 Besore ................... G05B 15/02
700/278
(Continued)

FOREIGN PATENT DOCUMENTS

JP 2004-085042 3/2004

*Primary Examiner* — Christopher E Everett
*Assistant Examiner* — Istiaque Ahmed
(74) *Attorney, Agent, or Firm* — Greenblum & Bernstein, P.L.C.

(57) ABSTRACT

Time information indicating a necessary amount of time for a room temperature to reach a set temperature, and charges information indicating electricity charges corresponding to an amount of electric power consumed that is necessary for the room temperature to reach the set temperature, are displayed correlated with each of a plurality of running buttons corresponding to each of a plurality of operating modes.

21 Claims, 48 Drawing Sheets

(51) Int. Cl.
*G06Q 20/08* (2012.01)
*G05F 1/66* (2006.01)
*G06Q 50/06* (2012.01)

(52) U.S. Cl.
CPC ............... *F24F 2011/0063* (2013.01); *F24F 2011/0064* (2013.01); *F24F 2011/0072* (2013.01); *F24F 2011/0094* (2013.01)

(56) References Cited

U.S. PATENT DOCUMENTS

| | | | | |
|---|---|---|---|---|
| 2012/0125559 A1* | 5/2012 | Fadell | ............... | F24F 11/0012 165/11.2 |
| 2012/0259469 A1* | 10/2012 | Ward | ............... | G05B 15/02 700/276 |
| 2012/0264366 A1* | 10/2012 | Eastman | ............... | H04H 20/28 455/3.02 |
| 2013/0274968 A1* | 10/2013 | Federico | ............... | B60H 1/00735 701/22 |

* cited by examiner

FIG. 5

DEVICE TABLE 500

| DEVICE ID | MODEL NO. | ROOM NAME | DEVICE ACCESS METHOD |
|---|---|---|---|
| A | AC-001 | LIVING ROOM | VIA SERVER |
| B | AC-002 | DEN | DIRECTLY TO DEVICE |
| C | AC-001 | BEDROOM | VIA SERVER |
| ... | ... | ... | ... |

FIG. 6

DEVICE STATE TABLE 600

| DEVICE ID | RUNNING STATE | OPERATING MODE | SET TEMPERATURE | ROOM TEMPERATURE |
|---|---|---|---|---|
| A | RUNNING | POWERFUL MODE | 20°C | 20°C |
| B | RUNNING | ECO MODE | 20°C | 18°C |
| C | STOPPED | NORMAL MODE | 21°C | 16°C |
| ... | ... | ... | ... | ... |

FIG. 7

DEVICE STATE TABLE 600

| DEVICE ID | RUNNING STATE | OPERATING MODE | SET TEMPERATURE | ROOM TEMPERATURE |
|---|---|---|---|---|
| C | STOPPED | NORMAL MODE | 21°C | 16°C |

FIG. 8

AIR CONDITIONING COST CALCULATION TABLE

| MODEL NO. | AIR CONDITIONING CONTROL SPEED | AIR CONDITIONING CONTROL UNIT COST | AIR CONDITIONING MAINTAINING UNIT COST |
|---|---|---|---|
| AC-001 | ECO MODE: 5 MINUTES/°C<br>NORMAL MODE: 4 MINUTES/°C<br>POWERFUL MODE: 3 MINUTES/°C | ECO MODE: 2 CENTS/°C<br>NORMAL MODE: 3 CENTS/°C<br>POWERFUL MODE: 4 CENTS/°C | ECO MODE: 10 CENTS/HOUR<br>NORMAL MODE: 10 CENTS/HOUR<br>POWERFUL MODE: 10 CENTS/HOUR |
| AC-002 | ECO MODE: 7 MINUTES/°C<br>NORMAL MODE: 5 MINUTES/°C<br>POWERFUL MODE: 4 MINUTES/°C | ECO MODE: 4 CENTS/°C<br>NORMAL MODE: 5 CENTS/°C<br>POWERFUL MODE: 6 CENTS/°C | ECO MODE: 8 CENTS/HOUR<br>NORMAL MODE: 8 CENTS/HOUR<br>POWERFUL MODE: 9 CENTS/HOUR |
| ... | ... | ... | ... |

AIR CONDITIONING COST CALCULATION TABLE

| MODEL NO. | AIR CONDITIONING CONTROL SPEED | AIR CONDITIONING CONTROL UNIT COST | AIR CONDITIONING MAINTAINING UNIT COST |
|---|---|---|---|
| AC-001 | ECO MODE: 5 MINUTES/°C<br>NORMAL MODE: 4 MINUTES/°C<br>POWERFUL MODE: 3 MINUTES/°C | ECO MODE: 2 CENTS/°C<br>NORMAL MODE: 3 CENTS/°C<br>POWERFUL MODE: 4 CENTS/°C | ECO MODE: 10 CENTS/HOUR<br>NORMAL MODE: 10 CENTS/HOUR<br>POWERFUL MODE: 10 CENTS/HOUR |

800

CONTROL METHOD OF TERMINAL DEVICE IN AIR CONDITIONING CONTROL SYSTEM WITH SELECTABLE OPERATING MODE ACCORDING TO TIME AND CHARGES, AND NON-TRANSITORY COMPUTER-READABLE RECORDING MEDIUM STORING A PROGRAM

BACKGROUND

1. Technical Field

The present disclosure relates to a control method of a terminal device in an air conditioning control system that controls an air conditioner.

2. Description of the Related Art

There have been disclosed air conditioners which present a user with information relating to change of in-room environment in conjunction with the air conditioner running, as criteria for the user to judge the state of control, to consequently create an in-room environment according to user demands. For example, Japanese Unexamined Patent Application Publication No. 2004-085042 discloses an air conditioner which generates estimated time information regarding the amount of time for the room environment to reach a set room environment according to setting conditions of the air conditioner. The generated estimated time information is then displayed on a display unit to be presented to the user. However, there has been recognized a need for further improvement over the above-described related art.

SUMMARY

In one general aspect, the techniques disclosed here feature a method for controlling a terminal device in an air conditioning control system that controls an air conditioner. The air conditioner has a plurality of operating modes to cause a room temperature of a room in which the air conditioner has been installed to reach a set temperature of the air conditioner. The method includes: causing a computer of the terminal device to acquire, for each of the plurality of operating modes in a case where the air conditioner is in a stopped state, i) time information indicating time from when the air conditioner switches from a stopped state to a running state, till the room temperature of the room reaches the set temperature, and ii) first charges information indicating electricity charges corresponding to an amount of electric power consumed by the air conditioner from when the air conditioner switches from the stopped state to the running state, till the room temperature of the room reaches the set temperature, to display each of a plurality of running buttons corresponding to each of the plurality of operating modes, in association with the time information and the first charges information corresponding each of the plurality of running buttons; and upon detecting selection of one running button corresponding to one operating mode out of the plurality of operating modes, to transmit a control command to the air conditioner, to control the air conditioner to run in the one operating mode.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating an example of a data structure of a device table;

FIG. 6 is a diagram illustrating a first example of a data structure of a device state table;

FIG. 7 is a diagram illustrating a second example of a data structure of a device state table;

FIG. 8 is a diagram illustrating a first example of a data structure of an air conditioning cost calculation table;

FIG. 9 is a diagram illustrating a second example of a data structure of an air conditioning cost calculation table;

DETAILED DESCRIPTION

Figure 1:
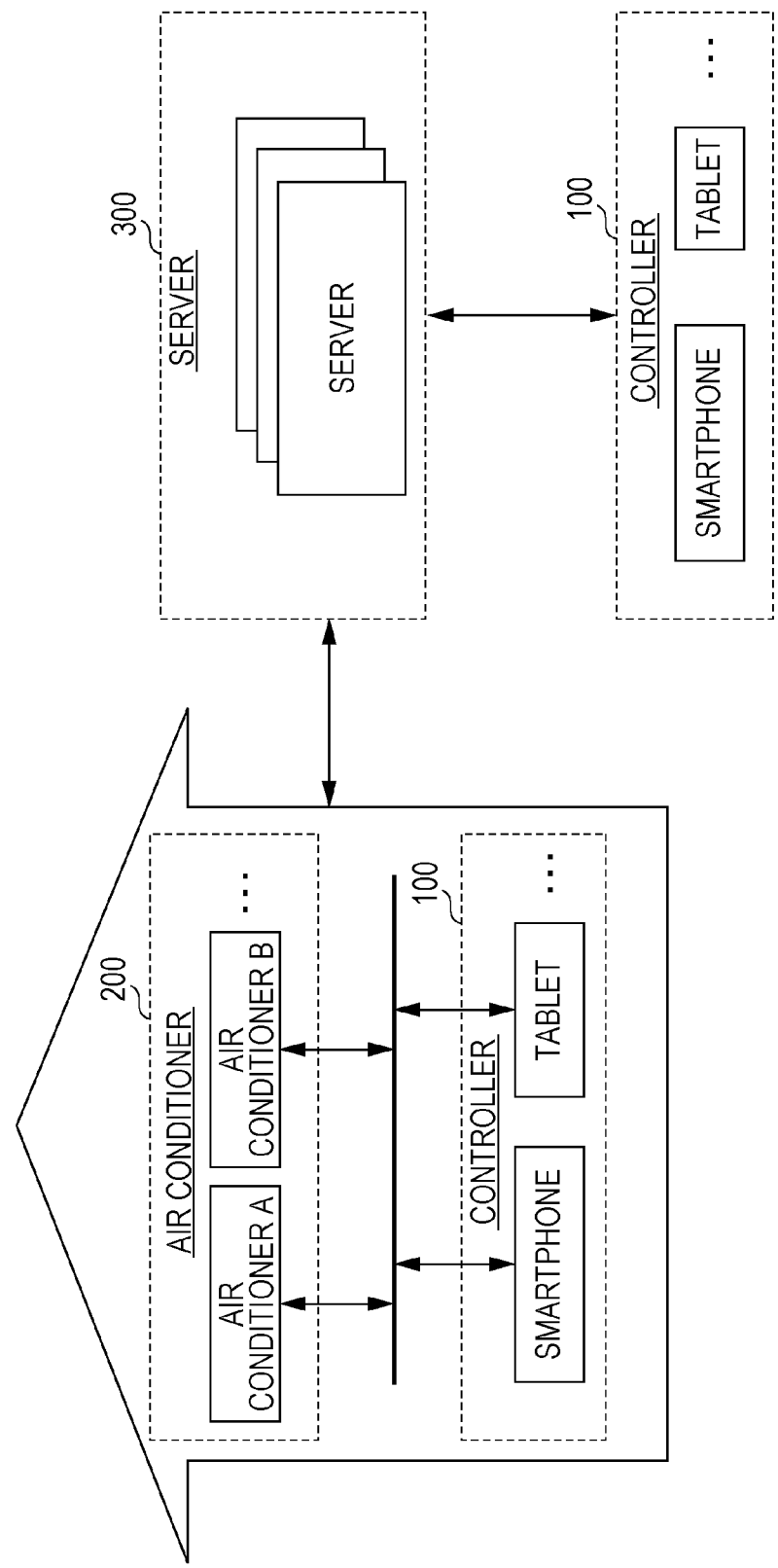
FIG. 1 is a diagram illustrating an overall configuration of an air conditioning control system according to the present disclosure.

Underlying Knowledge Forming Basis of the Present Disclosure

The aforementioned Japanese Unexamined Patent Application Publication No. 2004-085042 describes an air conditioner which generates estimated time information regarding the amount of time for the room environment to reach a set room environment according to setting conditions of the air conditioner, and displays the generated estimated time information on a display unit for presentation to the user.

Generally, air conditioners have multiple operating modes whereby the room temperature of the room where the air conditioner is installed is made to reach a temperature set to the air conditioner. Examples of the multiples include a "normal mode", an "eco mode" which consumes less electric power than the normal mode for the current room temperature to reach the set temperature, but takes more time, and so forth.

However, Japanese Unexamined Patent Application Publication No. 2004-085042 does not disclose presenting the user with estimated time information for the room environment to reach the room environment set according to the setting conditions of the air conditioner corresponding to the multiple operating modes. Accordingly, there is the problem that, regardless of the air conditioner having multiple operating modes, the user cannot quantitatively comprehend what sort of difference there is among the multiple operating modes, and accordingly cannot tell which operating mode to select.

Also, the eco mode allows the room temperature to reach the predetermined set temperature at lower electricity charges than the normal mode, for example, but this takes more time than the normal mode. Accordingly, criteria to be provided to the user to decide which operating mode to select should include the estimated amount of time for the room environment to reach the set room environment according to the setting conditions of the air conditioner, and the electricity charges for each operating mode. That is to say, there is a problem that just the estimated amount of time for the room environment to reach the set room environment according to the setting conditions of the air conditioner as disclosed in Japanese Unexamined Patent Application Publication No. 2004-085042 is insufficient.

Accordingly, provided is an arrangement where time information and charges information are displayed in a correlated manner with operating buttons corresponding to each of the multiple operating modes. The time information indicates the amount of time from an air conditioner in a stopped state turning on till the room temperature of the room reaches the set room temperature. The charges information indicates the electricity charges corresponding to the electric power consumed by the air conditioner from the air conditioner in a stopped state turning on till the room temperature of the room reaches the set room temperature.

According to one aspect of the present disclosure, provided is al method for controlling a terminal device in an air conditioning control system that controls an air conditioner which has a plurality of operating modes to cause a room temperature of a room in which the air conditioner has been installed to reach a set temperature of the air conditioner. The method includes causing a computer of the terminal device to acquire, for each of the plurality of the operating modes in a case where the air conditioner is in a stopped state, i) time information indicating time from when the air conditioner switches from a stopped state to a running state, till the room temperature of the room reaches the set temperature, and ii) first charges information indicating electricity charges corresponding to an amount of electric power consumed by the air conditioner from when the air conditioner switches from the stopped state to the running state, till the room temperature of the room reaches the set temperature, to display each of a plurality of running buttons corresponding to each of the plurality of operating modes, in association with the time information and the first charges information corresponding to each of the plurality of running buttons, and upon detecting selection of one running button corresponding to one operating mode out of the plurality of operating modes, to transmit a control command to the air conditioner, to control the air conditioner to run in the one operating mode.

Air conditioners generally have multiple operating modes by which the room temperature of the room where the air conditioner is installed is made to reach a set temperature set to the air conditioner (e.g., a "normal mode", an "eco mode" which consumes less electricity than the "normal mode" for the current room temperature to reach the set temperature, and so forth).

However, there is the problem with conventional air conditioners that, regardless of the air conditioner having multiple operating modes, the user cannot quantitatively comprehend what sort of difference there is among the multiple operating modes, and accordingly cannot tell which operating mode to select.

For example, the eco mode allows the room temperature to reach the predetermined set temperature at lower electricity charges than the normal mode, but this takes more time than the normal mode. In this case, the user cannot tell how much savings in electricity charges the eco mode can realize in comparison with the normal mode, and how long this will take, so the user is at a loss as which of the normal mode and the eco mode to select.

Accordingly, the above-described aspect displays time information indicating time from when the air conditioner switches from a stopped state to a running state, till the room temperature of the room reaches the set temperature, and charges information indicating electricity charges corresponding to an amount of electric power consumed by the air conditioner from when the air conditioner switches from the stopped state to the running state, till the room temperature of the room reaches the set temperature, in correlation is running buttons corresponding to each of the operating modes.

Thus, the user can be presented with criteria regarding which operating mode should be selected. For example, the user can confirm the specific numbers regarding time information and charges information, and comprehend thereby how much savings in electricity charges the eco mode can realize in comparison with the normal mode, and how long this will take.

Having this knowledge of how much savings in electricity charges can be realized, and how long this will take, allows a user who finds cheaper electricity charges attractive even if it takes a longer time for the room temperature to reach the set temperature, to select the eco mode. Similarly, a user who finds speed of reaching the set temperature attractive even if the electricity charges for the room temperature to reach the set temperature are relatively high can select the normal mode.

When causing the computer of the terminal device to display each of the plurality of the running buttons corresponding to each of the plurality of the operating modes, the time information and the first charges information corresponding to each of the plurality of operating modes may be displayed within each of the plurality of the running buttons corresponding to each of the plurality of the operating modes.

Accordingly, displaying the time information and the first charges information corresponding to each of the plurality of modes within the frame of the corresponding running button of each operating mode enables space of the display region of the terminal device to be conserved, while maintaining the state in which the user can comprehend the correlation between the operating mode, the time information, and the first charges information.

As a result of being able to conserve space of the display region of the terminal device, visual recognition of the operating mode, time information, and first charges information can be improved by using larger size characters or the like, and the user can be effectively presented with criteria regarding which operating mode should be selected.

In a case where the air conditioner is running in the one operating mode, the running button corresponding to the one operating mode may be hidden from display. The time information and the first charges information corresponding to the one operating mode in which the air conditioner is currently running may be displayed in a region where the one running button, corresponding to the one operating mode had been displayed, and the time information and the first charges information corresponding to the one operating modes other than the one operating mode may be displayed within the respective other operating buttons corresponding to the respective other operating modes.

Conventionally, if the user pressed a running button corresponding to the operating mode in which the air conditioner is currently running, an error sound was emitted to notify the user that pressing the button will not change the operations of the air conditioner. However, there have been problems with this arrangement, such as the user not being able to recognize the meaning of the error sound, or the user not being able to hear the error sound.

Accordingly, by hiding a running button corresponding to the operating mode in which the air conditioner is currently running, the user can be notified in a sure manner that selecting the button corresponding to the operating mode in which the air conditioner is currently running will not change the operations of the air conditioner.

Further, displaying time information and the first charges information corresponding to the operating mode in which the air conditioner is currently running in the same region as a region in which the running button corresponding to the operating mode in which the air conditioner is currently running, and displaying the time information and the first charges information corresponding to the operating modes other than the operating mode in which the air conditioner is currently running may be displayed within the frames of the operating buttons corresponding to the respective operating modes, enables space of the display region of the terminal device to be conserved, while maintaining the state in which the user can comprehend the correlation between the operating mode, the time information, and the first charges information.

As a result of being able to conserve space of the display region of the terminal device, visual recognition of the operating mode, time information, and first charges information can be improved by using larger size characters or the like, and the user can be effectively presented with criteria regarding which operating mode should be selected.

The control method may further causing the computer of the terminal device to: display a set temperature changing button that changes the set temperature of the air conditioner; acquire, in a case where selection of the set temperature changing button is detected in a stopped state of the air conditioner before selection of the running button, the time information and the first charges information corresponding to the changed set temperature of the air conditioner; and update the displayed time information and first charges information, corresponding to each of the plurality of operating modes, to the newly acquired time information and first charges information.

The control method may further causing the computer of the terminal device to: display a set temperature changing button that changes the set temperature of the air conditioner; newly acquiring, in a case where selection of the set temperature changing button is detected in a running state of the air conditioner after selection of the running button, the time information and the first charges information corresponding to the changed set temperature of the air conditioner; and update the displayed time information and first charges information corresponding to each of the plurality of operating modes displayed.

Accordingly, in a case where the user has changed the set temperature of the air conditioner, the user can confirm the time information and first charges information for each of the multiple modes at the set temperature after changing. Thus, the user can decide what temperature to set the set temperature of the air conditioner at, while confirming the electricity charges and time for different set temperatures for the air conditioner. The user can further confirm which set temperature will take what sort of electricity charges and time for each of the multiple operating modes, so the user is presented with criteria on which operating mode to select.

In a case where selection of the set temperature changing button is detected, a control command for controlling to change the set temperature of the air conditioner may be transmitted to the air conditioner.

The control method may further causing the computer of the terminal device to: acquire, at a predetermined timing, temperature information indicating the room temperature of the room where the air conditioner is installed, newly acquire, in a case where the acquired temperature information changes from the temperature information acquired a previous time, the time information and the first charges information corresponding to the changed temperature information; and update the time information and first charges information, corresponding to each of the plurality of operating modes, to the newly acquired time information and first charges information.

The room temperature is changed toward the set temperature by the air conditioner operating. The user can confirm the time information and first charges information corresponding to each of the multiple operating modes at the changed room temperature.

The plurality of operating modes may include a normal mode, and an eco mode which consumes less electric power than the normal mode for the current room temperature to reach the set temperature. In a case where a monetary amount indicated by the first charges information corresponding to the eco mode is smaller than a monetary amount indicated by the first charges information corresponding to the normal mode by a predetermined monetary amount or more, a running button corresponding to the eco mode may be displayed.

The eco mode enables the room temperature to reach the predetermined set temperature at lower electricity charges than the normal mode, but also takes more time than the normal mode. Displaying a running button corresponding to the eco mode in a case where a monetary amount indicated by the first charges information corresponding to the eco mode is smaller than a monetary amount indicated by the first charges information corresponding to the normal mode by a predetermined monetary amount or more, enables the eco mode to be presented to the user as an option in a case where the advantage of lower electricity charges is great by selecting the eco mode. Consequently, the user can select a suitable operating mode by having compared the advantages and disadvantages of the normal mode and eco mode.

In a case where the monetary amount indicated by the first charges information corresponding to the eco mode is not smaller than a monetary amount indicated by the first charges information corresponding to the normal mode by a predetermined monetary amount or more, the running button corresponding to the eco mode may be displayed in a different form from the operating button corresponding to the normal mode.

The control method may further causing the computer of the terminal device to display the running button corresponding to the eco mode in the different form comprises displaying the running button corresponding to the eco mode in a different color.

In the eco mode, the room temperature can be made to reach the predetermined set temperature at lower electricity charges as compared to the normal mode. However, in a case where the difference between the room temperature and the set temperature is small, the difference in electricity charges between the eco mode and the normal mode is scant. In this case, there is little advantage of lower electricity charges for the user to select the eco mode.

Accordingly, in a case where the monetary amount indicated by the first charges information corresponding to the eco mode is not smaller than the monetary amount indicated by the first charges information corresponding to the normal mode by a predetermined monetary amount or more, displaying the running button corresponding to the eco mode in a different color from the operating button corresponding to the normal mode can prompt the user to not select the eco mode. In other words, in a case where there is little difference in electricity charges between the eco mode and the normal mode, the user can be notified that the normal mode is the suitable operating mode.

The control method may further causing the computer of the terminal device to display the running button corresponding to the eco mode in the different form comprises hiding the running button corresponding to the eco mode from display.

In the eco mode, the room temperature can be made to reach the predetermined set temperature at lower electricity charges as compared to the normal mode. However, in a case where the difference between the current room temperature and the set temperature is small, the difference in electricity charges between the eco mode and the normal mode is scant.

Accordingly, in a case where the monetary amount indicated by the first charges information corresponding to the eco mode is not smaller than the monetary amount indicated by the first charges information corresponding to the normal mode by a predetermined monetary amount or more, hiding from display the running button corresponding to the eco mode can prevent the user from selecting the eco mode if there is little advantage of cheaper electricity charges for the user to select the eco mode. In other words, in a case where there is little difference in electricity charges between the eco mode and the normal mode, the user can be notified that the normal mode is the suitable operating mode.

The plurality of operating modes may include a normal mode, and a powerful mode which takes less time than the normal mode for the current room temperature to reach the set temperature. In a case where a duration indicated by the time information corresponding to the powerful mode is shorter than a duration indicated by the time information corresponding to the normal mode by a predetermined amount of time or more, a running button corresponding to the powerful mode may be displayed.

The powerful mode enables the room temperature to reach the predetermined set temperature faster than the normal mode, but the electricity charges are greater than the normal mode. Displaying a running button corresponding to the powerful mode in a case where the time information corresponding to the powerful mode is faster than the time information corresponding to the normal mode by a predetermined amount of time or more enables the powerful mode to be presented to the user as an option, if the advantage of reduction in time for the room temperature to reach the set temperature by selecting the powerful mode is great. Consequently, the user can be presented with the advantages and disadvantages of the normal mode and powerful mode, and thus presented with criteria regarding which operating mode is better to select.

In a case where the duration indicated by the time information corresponding to the powerful mode is not shorter than a duration indicated by the time information corresponding to the normal mode by a predetermined amount of time or more, the running button corresponding to the powerful mode may be displayed in a different form from the operating button corresponding to the normal mode.

The control method may further causing the computer of the terminal device to the running button corresponding to the powerful mode in the different form comprises displaying the running button corresponding to the powerful mode in a different color.

In the powerful mode, the room temperature can be made to reach the predetermined set temperature in a shorter time as compared to the normal mode. However, in a case where the difference between the room temperature and the set temperature is small, the difference in time for the room temperature to reach the set temperature between the powerful mode and the normal mode is scant.

Accordingly, in a case where the duration indicated by the time information corresponding to the powerful mode is not shorter than the duration indicated by the time information corresponding to the normal mode by a predetermined amount of time or more, displaying the running button corresponding to the powerful mode in a different color from the operating button corresponding to the normal mode can prompt the user to not select the powerful mode if the advantage of reduced time for the room temperature to reach the set temperature by the user selecting the powerful mode is small. In other words, in a case where there is little difference in time for the room temperature to reach the set temperature between the powerful mode and the normal mode, the user can be notified that the normal mode is the suitable operating mode.

In a case where a duration indicated by the time information corresponding to the powerful mode is not shorter than a duration indicated by the time information corresponding to the normal mode by a predetermined amount of time or more, the running button corresponding to the powerful mode may be hidden from display.

In the powerful mode, the room temperature can be made to reach the predetermined set temperature in a shorter time as compared to the normal mode. However, in a case where the difference between the current room temperature and the set temperature is small, the difference in time for the room temperature to reach the set temperature between the powerful mode and the normal mode is scant.

Accordingly, in a case where the duration indicated by the time information corresponding to the powerful mode is not smaller than the duration indicated by the time information corresponding to the normal mode by a predetermined amount of time or more, hiding the running button corresponding to the powerful mode from display can prompt the user to not select the powerful mode if the advantage of reduced time for the room temperature to reach the set temperature by the user selecting the powerful mode is small. In other words, in a case where there is little difference in time for the room temperature to reach the set temperature between the powerful mode and the normal mode, the user can be notified that the normal mode is the suitable operating mode.

The plurality of operating modes may include a normal mode, an eco mode which consumes less electric power than the normal mode for the current room temperature to reach the set temperature, and a powerful mode which takes less time than the normal mode for the current room temperature to reach the set temperature. In a case where a monetary amount indicated by the first charges information corresponding to the eco mode is not smaller than a monetary amount indicated by the first charges information corresponding to the normal mode by a predetermined monetary amount or more, and also a duration indicated by the time information corresponding to the powerful mode is not shorter than a duration indicated by the time information corresponding to the normal mode by a predetermined amount of time or more, only the running button corresponding to the normal mode may be displayed.

In the eco mode, the room temperature can be made to reach the predetermined set temperature at lower electricity charges as compared to the normal mode. However, in a case where the difference between the room temperature and the set temperature is small, the difference in electricity charges between the eco mode and the normal mode is scant.

In the powerful mode, the room temperature can be made to reach the predetermined set temperature in a shorter time as compared to the normal mode. However, in a case where the difference between the current room temperature and the set temperature is small, the difference in time for the room temperature to reach the set temperature between the powerful mode and the normal mode is scant.

Accordingly, displaying only the running button corresponding to the normal mode in a case where the advantage of the user selecting either of the eco mode and the powerful mode is small enables the user to be prevented from selecting the eco mode or the powerful mode.

In other words, in a case where there is little difference in electricity charges between the eco mode and normal mode, and there is little difference in time for the room temperature to reach the set temperature between the powerful mode and the normal mode, the user can be notified that the normal mode is the suitable operating mode.

The control method may further causing the computer of the terminal device to: acquire, at a predetermined timing, temperature information indicating the room temperature of the room where the air conditioner is installed; acquire, in a case where the acquired temperature information has reached the set temperature of the air conditioner, second charges information indicating electricity charges corresponding to the amount of electric power consumed by the air conditioner, that is necessary for the air conditioner to maintain the set temperature; and switch at least display of the time information and first charges information corresponding to the operating mode in which the air conditioner is running, to the second charges information corresponding to the operating mode in which the air conditioner is running.

In a case where the room temperature of the room where the air conditioner is installed has reached the set temperature, the time information, indicating the time from when the air conditioner switches from a stopped state to a running state till the room temperature of the room reaches the set temperature, which has been displayed so far, is now 0 minutes, and the electricity charges corresponding to the amount of electric power which the air conditioner has consumed from when the air conditioner switches from a stopped state to a running state till the room temperature of the room reaches the set temperature, which has been displayed so far, is now 0 cents. Accordingly, these are not information of interest to the user.

Accordingly, in a case where the acquired temperature information has reached the set temperature of the air conditioner, second charges information indicating electricity charges corresponding to the amount of electric power consumed by the air conditioner, that is necessary for the air conditioner to maintain the set temperature is acquired, and at least display of the time information and first charges information corresponding to the operating mode in which the air conditioner is running is switched to the second charges information corresponding to the operating mode in which the air conditioner is running. Thus, information of interest to the user can be provided even after the room temperature has reached the set temperature.

The control method may further causing the computer of the terminal device to: acquire, at a predetermined timing, temperature information indicating the room temperature of the room where the air conditioner is installed; acquiring, in a case where the acquired temperature information has reached the set temperature of the air conditioner, second charges information indicating electricity charges corresponding to an amount of electric power consumed by the air conditioner, that is necessary for the air conditioner to maintain the set temperature, in each of the plurality of operating modes; and switch display of the time information and first charges information corresponding to each of the plurality of operating modes, to the second charges information corresponding to each of the plurality of operating modes.

In a case where the room temperature of the room where the air conditioner is installed has reached the set temperature, the time information, indicating the time from when the air conditioner switches from a stopped state to a running state till the room temperature of the room reaches the set temperature, which has been displayed so far, is now 0 minutes, and the electricity charges corresponding to the amount of electric power which the air conditioner has consumed from when the air conditioner switches from a stopped state to a running state till the room temperature of the room reaches the set temperature, which has been displayed so far, is now 0 cents. Accordingly, these are not information of interest to the user.

Accordingly, in a case where the acquired temperature information has reached the set temperature of the air conditioner, second charges information indicating electricity charges corresponding to the amount of electric power consumed by the air conditioner, that is necessary for the air conditioner to maintain the set temperature is acquired, and at least display of the time information and first charges information in each of the multiple operating modes is switched to the second charges information in each of the multiple operating modes. Thus, information of interest to the user can be provided even after the room temperature has reached the set temperature.

For example, in a case where the electricity charges corresponding to the amount of electric power consumed by the air conditioner, that is necessary for the air conditioner to maintain the set temperature, differs among the operating modes, the user can be presented with criteria regarding which operating mode is better to select. Thus, the user can select operations such as selecting the powerful mode so that the room temperature quickly reaches the set temperature, and then selecting the eco mode to maintain the room temperature at the set temperature at relatively low electricity charges.

The control method may further causing the computer of the terminal device to: newly acquire, at a predetermined timing, time information indicating time from when the air conditioner switches from a stopped state to a running state, till the room temperature of the room reaches the set temperature, and a first charges information indicating electricity charges corresponding to an amount of electric power consumed by the air conditioner from when the air conditioner switches from the stopped state to the running state, till the room temperature of the room reaches the set temperature, for each of the plurality of operating modes; and update the time information and first charges information corresponding to each of the plurality of operating modes displayed, to the newly acquired time information and first charges information.

The control method may further causing the computer of the terminal device to: acquire, from the air conditioning control system, set information indicating a set temperature of the air conditioner, temperature information indicating the room temperature of the room where the air conditioner is installed, and capability information indicating an air conditioning control speed and an air conditioning control unit cost, for each of the plurality of operating modes of the air conditioner; and generating time information indicating time from when the air conditioner switches from the stopped state to the running state, till the room temperature of the room reaches the set temperature, and first charges information indicating electricity charges corresponding to an amount of electric power consumed by the air conditioner from when the air conditioner switches from the stopped state to the running state, till the room temperature of the room reaches the set temperature, for each of the plurality of operating modes, using the acquired set information, temperature information, and capability information.

The acquisition of the time information indicating time from when the air conditioner switches from the stopped state to the running state, till the room temperature of the room reaches the temperature set to the air conditioner, and the first charges information indicating electricity charges corresponding to an amount of electric power consumed by the air conditioner from when the air conditioner switches from the stopped state to the running state, till the room temperature of the room reaches the set temperature, for each of the plurality of operating modes, may be acquisition from the air conditioning control system.

Embodiment

An air conditioning control system according to the present disclosure will be described. The air conditioning control system according to the present disclosure is a system where the user can select operating modes while confirming time and charges at the time of giving commands for air conditioning control.

FIG. 1 is a diagram illustrating an overall configuration of the air conditioning control system according to the present disclosure. The air conditioning control system includes a controller 100, an air conditioner 200, and a server 300. The controller 100, air conditioner 200, and server 300 are communicably connected to each other via a network. Examples of networks which can be employed include the Internet and public telecommunication networks such as a cellular phone communication network. In a case where the controller 100 and the air conditioner 200 are in the same building, a local area network (LAN) of near-field communication (NFC) may be used as a network between the two.

The controller 100 in FIG. 1 is one or more terminals which provides the user with a graphical user interface (GUI) to control the air conditioner 200. Examples of the controller 100 include a smartphone, tablet terminal, personal computer, and air conditioner remote controller. The controller 100 may be situated inside or outside of the same building as the air conditioner 200. The controller 100 transmits control commands to the air conditioner 200 in accordance with operations accepted from the user. Note that transmission of control commands may be performed via the server 300. The controller 100 also presents information acquired from the air conditioner 200 to the user. The acquisition of information may be performed via the server 300. Particularly, in a case where the controller 100 and the air conditioner 200 cannot directly communicate, due to not being in the same building or the like, acquiring information via the server 300 is effective.

the air conditioner 200 in FIG. 1 is one or more air conditioners having temperature adjusting functions. The air conditioner 200 operates upon having received control commands from the controller 100 or server 300. The air conditioner 200 also transmits information about itself to the controller 100 and server 300.

The server 300 in FIG. 1 is, for example, a cloud server configured including one or more computers. The server 300 mediates communication between the controller 100 and the air conditioner 200. The server 300 may be a service provider server managed by a service provider which provides the service according to the present disclosure to the user, or may be a manufacturer server managed by the manufacturer of the air conditioner 200. The same advantages are obtained in either case.

Figure 2:
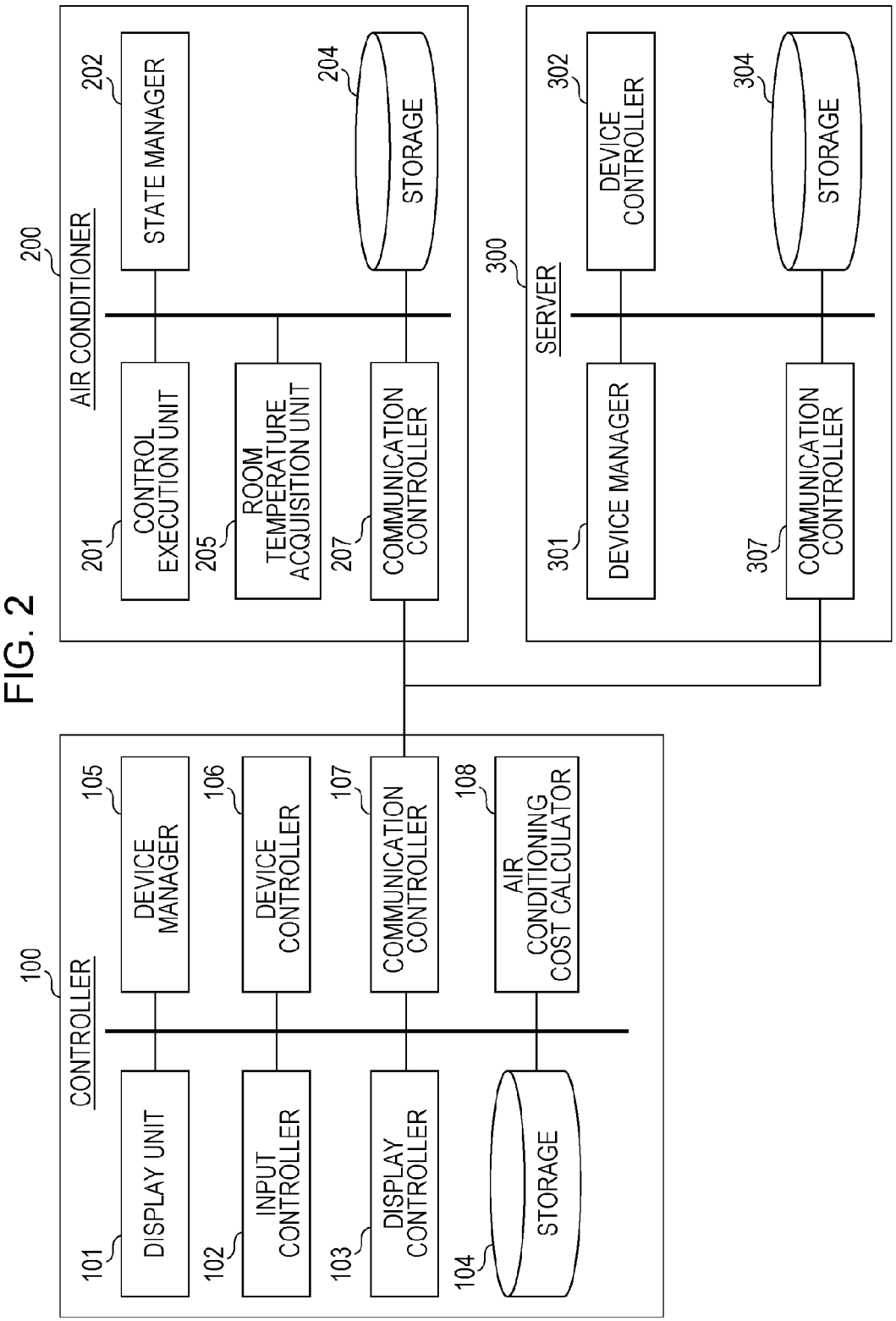
FIG. 2 is a diagram illustrating a first example of the configuration of the air conditioning control system according to the present disclosure.

FIG. 2 is a diagram illustrating a first example of the air conditioning control system configuration according to the present disclosure. The controller 100 in FIG. 2 includes a display unit 101, an input controller 102, a display controller 103, storage 104, a device manager 105, a device controller 106, a communication controller 107, and a air conditioning cost calculator 108.

The display unit 101 displays a screen for the user. An example of the display unit 101 is a liquid crystal display provided with a touch panel.

The input controller 102 detects various types of operations which the user performs as to various types of screens displayed on the display unit 101. The present disclosure employs an operating device which accepts user operations made at the touch panel provided to the display unit 101. The input controller 102 thus detects operations such as tapping, swiping, flicking, and so forth, input by the user at the touch panel. When the input controller 102 detects a tapping operation on a button displayed on the display unit 101, the input controller 102 determines that the button has been selected by the user. In a case where a keyboard or mouse or the like is to be used as an operating device, the input controller 102 detects user operations made using the keyboard, mouse, or the like.

The display controller 103 controls screens displayed on the display unit 101, based on information stored in the storage 104 and air conditioning cost calculated by the air conditioning cost calculator 108.

The storage 104 stores various types of information used when the controller 100 performs various types of processing. An example of the controller 100 is a rewritable nonvolatile storage device.

The device manager 105 acquires a list of air conditioners 200 which the controller 100 can control, and information relating to the air conditioners 200, via the communication controller 107. The device manager 105 stores the acquired information in the storage 104.

The device controller 106 converts user operations detected by the input controller 102 into control commands for controlling the air conditioner 200, and transmits the converted commands to the air conditioner 200 via the communication controller 107. The device controller 106 also acquires the state of the air conditioner 200 via the communication controller 107, and stores in the storage 104.

The communication controller 107 connects the controller 100 to a network, so as to communicate with the air conditioner 200 and server 300.

The air conditioning cost calculator 108 calculates air conditioning cost based on information stored in the storage 104. The air conditioning cost is information indicating time and money related costs necessary to run the air conditioner 200. In a case where the room temperature of the room where the air conditioner 200 is installed differs from the set temperature set for the air conditioner 200, the air conditioning cost is the amount of time and electricity charges corresponding to the amount of electric power consumed, necessary for the room temperature to reach the set temperature in each operating mode of the air conditioner 200, for example. In a case where the room temperature and the set temperature are the same, the air conditioning cost is the electricity charges corresponding to the amount of electric power consumed per hour in order to maintain the room temperature at the set temperature in each mode of the air conditioner 200, for example.

The air conditioner 200 in FIG. 2 includes a control execution unit 201, a state manager 202, storage 204, a room temperature acquisition unit 205, and a communication controller 207.

The control execution unit 201 controls the air conditioner 200 based on control commands received via the communication controller 207.

The state manager 202 stores the current state of the air conditioner 200 in the storage 204. The storage 204 stores various types of information which the air conditioner 200 uses for various types of processing. An example of the storage 204 is a rewritable nonvolatile storage device.

The room temperature acquisition unit 205 acquires the temperature of the room where the air conditioner 200 is installed, and stores this temperature in the storage 204. An example of the storage 204 is a temperature sensor.

The communication controller 207 connects the air conditioner 200 to a network, so as to communicate with the controller 100 and server 300.

The server 300 in FIG. 2 includes a device manager 301, a device controller 302, storage 304, and a communication controller 307.

The device manager 301 acquires a list of air conditioners 200 the controller 100 is capable of operating, and information relating to these air conditioners 200 via the communication controller 307. The device manager 301 then stores the obtained information in the storage 304.

The device controller 302 transmits air conditioner control commands for controlling the air conditioners 200 to the air conditioners 200 via the communication controller 307.

The storage 304 stores various types of information the server 300 uses to perform various types of processing. An example of the storage 304 is a rewritable nonvolatile memory device.

The communication controller 307 connects the server 300 to a network, for communication with the controller 100 and air conditioner 200.

Figure 3:
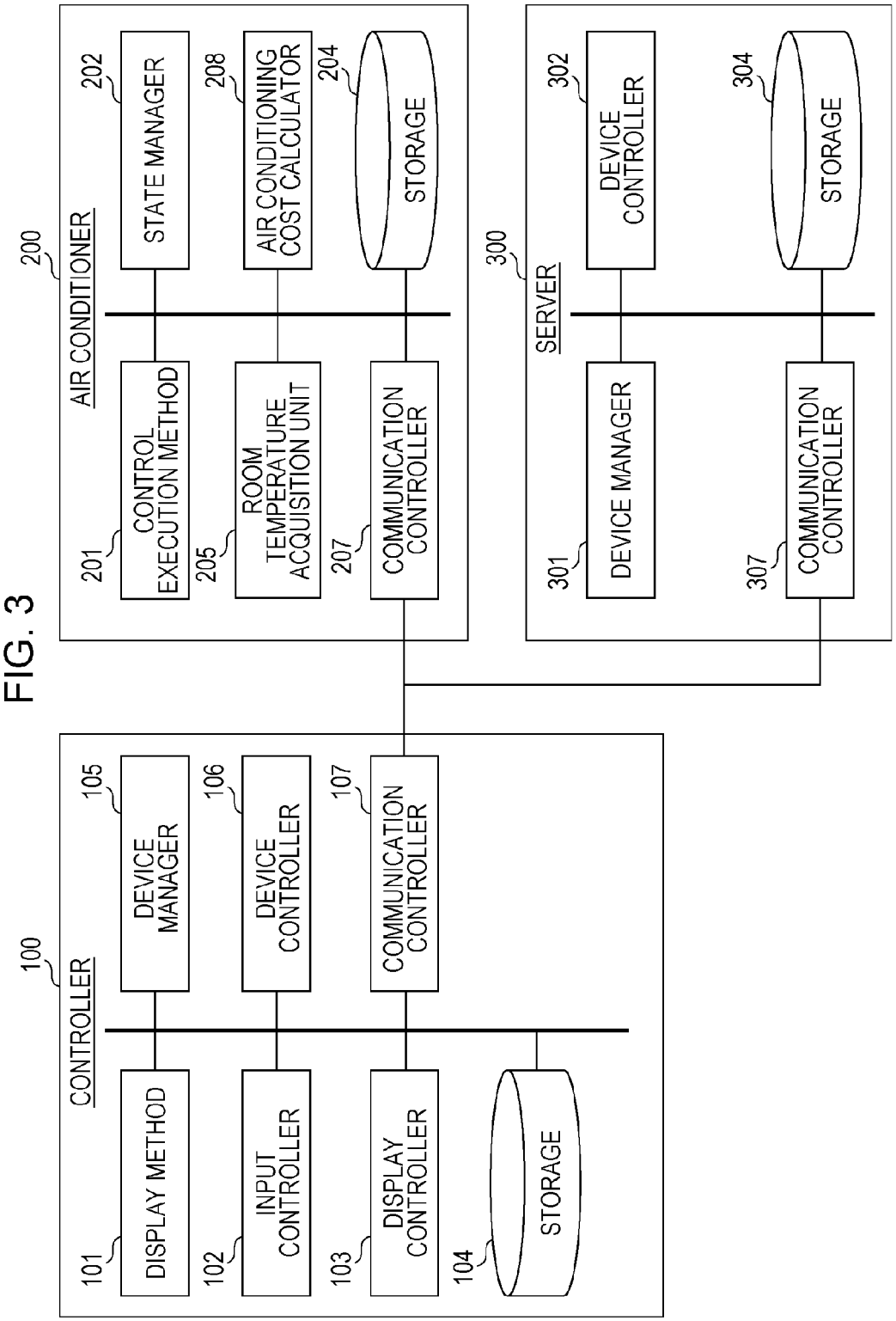
FIG. 3 is a diagram illustrating a second example of the configuration of the air conditioning control system according to the present disclosure.

FIG. 3 is a diagram illustrating a second example of the configuration of the air conditioning control system according to the present disclosure. A feature of the air conditioning control system according to the second example is that the air conditioning cost calculator 108 provided to the controller 100 in the air conditioning control system according to the first example is provided as an air conditioning cost calculator 208 of the air conditioner 200.

The air conditioning cost calculator 208 calculates air conditioning cost based on information stored in the storage 204 of the air conditioner 200. The display controller 103 of the controller 100 controls a screen to be displayed on the display unit 101 based the information stored in the storage 104 and the air conditioning cost calculated by the air conditioning cost calculator 208.

Figure 4:
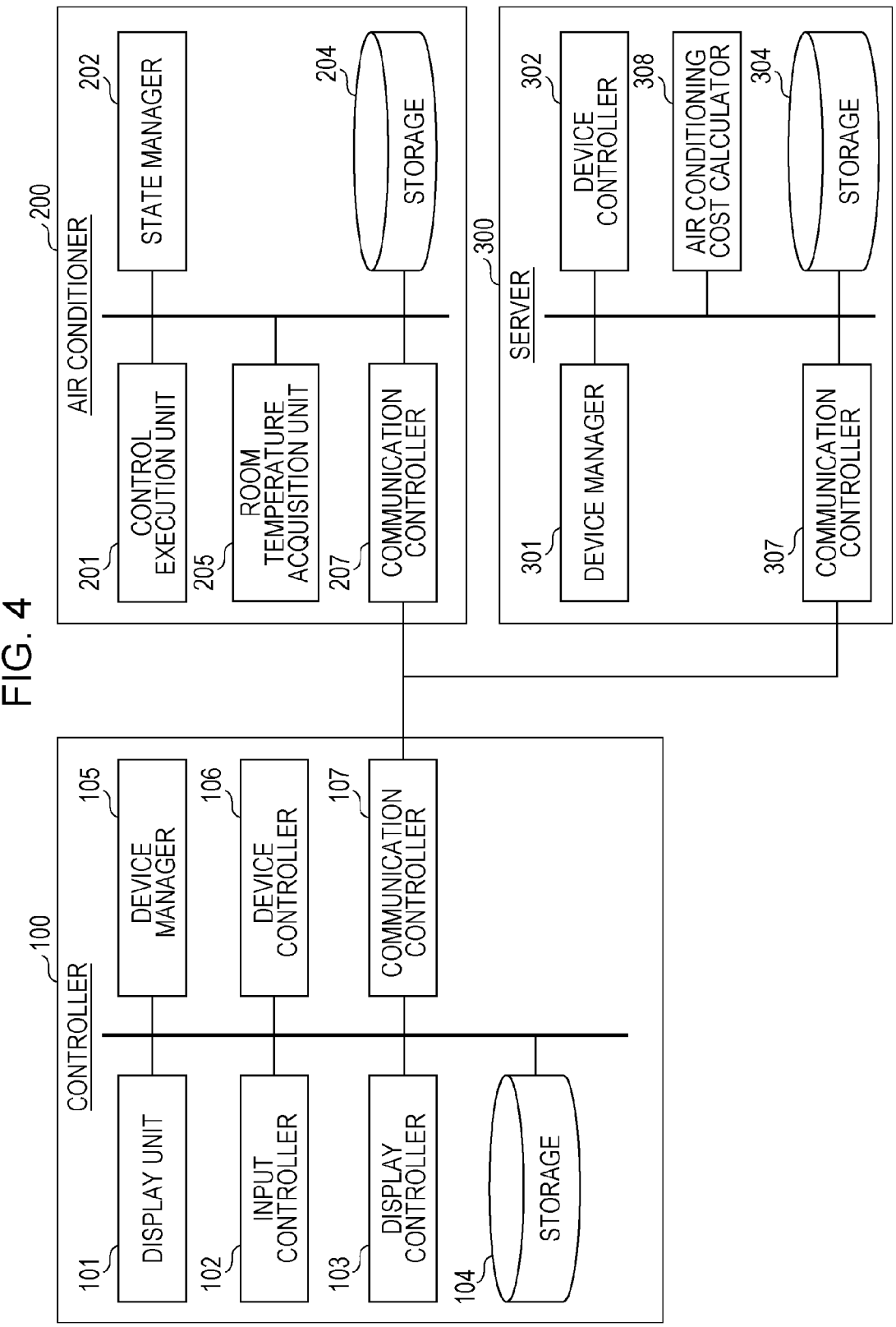
FIG. 4 is a diagram illustrating a third example of the configuration of the air conditioning control system according to the present disclosure.

FIG. 4 is a diagram illustrating a third example of the configuration of the air conditioning control system according to the present disclosure. A feature of the air conditioning control system according to the third example is that the air conditioning cost calculator 108 provided to the controller 100 in the air conditioning control system according to the first example is provided as an air conditioning cost calculator 308 of the server 300.

The air conditioning cost calculator 308 calculates air conditioning cost based on information stored in the storage 304 of the server 300. The display controller 103 of the controller 100 controls a screen to be displayed on the display unit 101 based on the information stored in the storage 104 and the air conditioning cost calculated by the air conditioning cost calculator 308.

FIG. 5 is a diagram illustrating an example of a data structure of a device table 500. The device table 500 is stored in the storage 104 and the storage 304. The device table 500 is data indicating a list of air conditioners 200 which the controller 100 is capable of operating. Each row in the device table 500 corresponds to one air conditioner 200, and includes "device ID", "model No.", "room name", and "device access method".

The "device ID" is an identifier for uniquely identifying the air conditioner 200. The manufacturing serial No. of the air conditioner 200 may serve as this "device ID", for example. The "model No." is an identifier for uniquely identifying the type of the air conditioner 200. A product number which the manufacturer assigns to each type of air conditioner 200 may be used as this "model No.", for example. The "room name" is the name of the room where the air conditioner 200 is installed.

The "device access method" is information relating to a method by which the controller 100 and air conditioner 200 communicate. Examples of this "device access method" include the text strings such as "directly to device" where the controller 100 and air conditioner 200 directly communicate, and "via server" where the controller 100 and air conditioner 200 communicate via the server 300.

FIG. 6 is a diagram illustrating a first example of a data structure of a device state table 600. The device state table 600 in the first example is information indicating the state of the air conditioners 200. The device state table 600 is stored in the storage 104 and the storage 304. Each row in the device state table 600 corresponds to one air conditioner 200, and includes "device ID", "running state", "operation mode", "set temperature", and "room temperature"

The "device ID" is an identifier for uniquely identifying the air conditioner 200. The manufacturing serial No. of the air conditioner 200 may serve as this "device ID", for example. The "running state" is information indicating the running state of the air conditioner 200. This "running state" is "running" when the air conditioner 200 is in a running state, and "stopped" when in a stopped state. The "running state" can be changed by operation at the controller 100.

The "operating mode" is information indicating which operating mode the air conditioner 200 currently is in. Examples of this "operating mode" include a "normal mode" which is a standard, an "eco mode" which consumes less electricity than the "normal mode", and a "powerful mode" which requires less time to adjust the temperature. In a case where the air conditioner 200 is running, the "operating mode" indicates the current operating mode, and in a case where the air conditioner 200 is stopped, indicates the operating mode which will be executed the next time the air conditioner 200 starts running. The "operating mode" can be changed by operation at the controller 100.

The "set temperature" is a target value for the room temperature which the user desires, that has been set to the air conditioner 200. The "set temperature" can be changed by operation at the controller 100.

The "room temperature" is the temperature in the room where the air conditioner 200 is installed. This "room temperature" is measured by the room temperature acquisition unit 205 of the air conditioner 200.

FIG. 7 is a diagram illustrating a second example of the data structure of the device state table 600. A feature of the device state table 600 according to the second example, which differs from the device state table 600 in the first example, is that there is only one row. The device state table 600 in the second example is stored in the storage 204 of the air conditioner 200. That is to say, the device state table 600 in the second example only has a row of information of the air conditioner 200 in which it is stored.

FIG. 8 is a diagram illustrating a first example of the data structure of an air conditioning cost calculation table 800. The air conditioning cost calculation table 800 is a table storing information necessary to calculate the following three types of information. The first type of information is required time information, which is information indicating how much time each operating mode of the air conditioner 200 requires for the current room temperature to reach the set temperature that has been set to the air conditioner 200. The second type of information is required charges information, which is information indicating the electric charges corresponding to the amount of electric power consumed in each operating mode of the air conditioner 200, for the current room temperature to reach the set temperature that has been set to the air conditioner 200. The third type of information is maintaining unit cost information, which is information indicating the electric charges corresponding to amount of electric power per time unit in each operating mode of the air conditioner 200, to maintain the room temperature at the set temperature once the room temperature has reached the set temperature. The required time information, required charges information, and maintaining unit cost information are combined to yield the air conditioning cost. The air conditioning cost calculation table 800 is used in the first example and the third example of the overall configuration of the air conditioning control system. In the first example of the overall configuration of the air conditioning control system, the air conditioning cost calculation table 800 is stored in the storage 104 of the controller 100, and in the third example, is stored in the storage 304 of the server 300.

Each row in the air conditioning cost calculation table 800 corresponds to the type of air conditioner 200, and includes "model No.", "air conditioning control speed", "air conditioning control unit cost", and "air conditioning maintaining unit cost".

The "model No." is an identifier for uniquely identifying the type of the air conditioner 200. A product number which the manufacturer of the air conditioner 200 assigns to each type of air conditioner 200 may be used as this "model No.", for example.

The "air conditioning control speed" is information to calculate required time information, which indicates the amount of time each operating mode of the air conditioner 200 requires for the current room temperature to reach the set temperature set to the air conditioner 200. An example of this "air conditioning control speed" is the amount of time required in each operating mode of the air conditioner 200 to raise/lower the room temperature by 1 degree Celsius. The value is set by the system architect beforehand. In the example illustrated in FIG. 8, the "air conditioning control speed" for the row where the model No. is AC-001 indicates that the amount of time the air conditioner of model No. AC-001 requires to raise/lower the current temperature by 1 degrees is 5 minutes in eco mode, 4 minutes in normal mode, and 3 minutes in powerful mode. The required time information here is calculated by multiplying the absolute value of difference between the room temperature and the set temperature by the air conditioning control speed. For example, in a case of raising the room temperature using the air conditioner of model No. AC-001 from 16° C. to 20° C., the required time in eco mode is 20 minutes, as calculated from |16−20|×5=20. The required time in normal mode is 16 minutes, as calculated from |16−20|×4=16, and the required time in powerful mode is 12 minutes, as calculated from |16−20|×3=12.

The "air conditioning control unit cost" is information for calculating the required charges information indicating electric charges corresponding to the amount of electric power consumed in each operating mode of the air conditioner 200, in order for the current room temperature to reach the set temperature set to the air conditioner 200. An example of this "air conditioning control unit cost" is the electric charges required in each operating mode of the air conditioner 200 to raise/lower the room temperature by 1 degree Celsius. The value is set by the system architect beforehand. In the example illustrated in FIG. 8, the "air conditioning control unit cost" for the row where the model No. is AC-001 indicates that the electricity charges the air conditioner of model No. AC-001 requires to raise/lower the current temperature by 1 degrees is 2 cents in eco mode, 3 cents in normal mode, and 4 cents in powerful mode. The required charges information here is calculated by multiplying the absolute value of difference between the room temperature and the set temperature by the air conditioning control unit cost. For example, in a case of raising the room temperature using the air conditioner of model No. AC-001 from 16° C. to 20° C., the required charges in eco mode is 8 cents, as calculated from |16−20|×2=8. The required charges in normal mode is 12 cents, as calculated from |16−20|×3=12, and the required charges in powerful mode is 16 cents, as calculated from |16−20|×4=16.

The "air conditioning maintaining unit cost" is information for calculating the air conditioning maintaining unit cost indicating electric charges corresponding to the amount of electric power consumed per unit time by each operating mode of the air conditioner 200 in order to maintain the room temperature at the set temperature. An example of this "air conditioning maintaining unit cost" is the electric charges required in each operating mode of the air conditioner 200 to maintain the room temperature for one hour. The value is set by the system architect beforehand. Another example may be the electric charges required to maintain the room temperature for one minute. In the example illustrated in FIG. 8, the "air conditioning maintaining unit cost" for the row where the model No. is AC-001 indicates that the electricity charges the air conditioner of model No. AC-001 requires to maintain the current temperature for one hour is 10 cents in eco mode, 10 cents in normal mode, and 10 cents in powerful mode. In a case where the time unit is all the same in the "air conditioning maintaining unit cost", the "air conditioning maintaining unit cost" itself is the maintaining unit cost information. In a case where time units differ, the "air conditioning maintaining unit cost" provided with the time units serves as the maintaining unit cost information.

Note that in the example in FIG. 8, the "air conditioning control speed", "air conditioning control unit cost", and "air conditioning maintaining unit cost" in the air conditioning cost calculation table 800 have been described as being values, but these may be expressions instead. In this case, the "air conditioning control speed" would be an expression to calculate the required time information, written as "(required time in eco mode)=(room temperature)−(set temperature)×5", for example. The "air conditioning control unit cost" would be an expression to calculate the required charges information, written as "(required charges in eco mode)=(room temperature)−(set temperature)×2", for example. The "air conditioning maintaining unit cost" would be an expression to calculate the maintaining unit cost information, written as "(maintaining unit cost in eco mode)=10", for example. Of course, these expressions are only exemplary, and other expressions may be used. Also, variables such as external temperature and humidity may be added to the expression. The expressions are set by the system architect beforehand. This arrangement enables expressions closer to actual conditions to be employed in the method for calculating air conditioning cost, so the air conditioning cost can be calculated more precisely.

Note further than the expressions set to the "air conditioning control speed", "air conditioning control unit cost", and "air conditioning maintaining unit cost" in the air conditioning cost calculation table 800 may be set having been calculated from past operating performance of the air conditioner 200. This arrangement enables expressions closer to actual conditions to be employed, so the air conditioning cost can be calculated more precisely, and the trouble of the system architect setting the expressions can be done away with.

While description has been made above regarding an arrangement where the rows of the air conditioning cost calculation table 800 correspond to the model Nos. of the air conditioners 200, this may be arranged by individual device IDs of the air conditioners 200. Thus, air conditioning costs of air conditioners 200 which are of the same type but are installed in different environments can be calculated more precisely.

FIG. 9 is a diagram illustrating a second example of the data structure of the air conditioning cost calculation table 800. A feature of the air conditioning cost calculation table 800 according to the air conditioning cost calculation table 800 in the second example which differs from the first example is that there is only one row. The air conditioning cost calculation table 800 according to the second example of the overall configuration of the air conditioning control system is stored in the storage 204 of the air conditioner 200. That is to say, the air conditioning cost calculation table 800 according to the second example only has a row of information of the air conditioner 200 in which it is stored.

Figure 10:
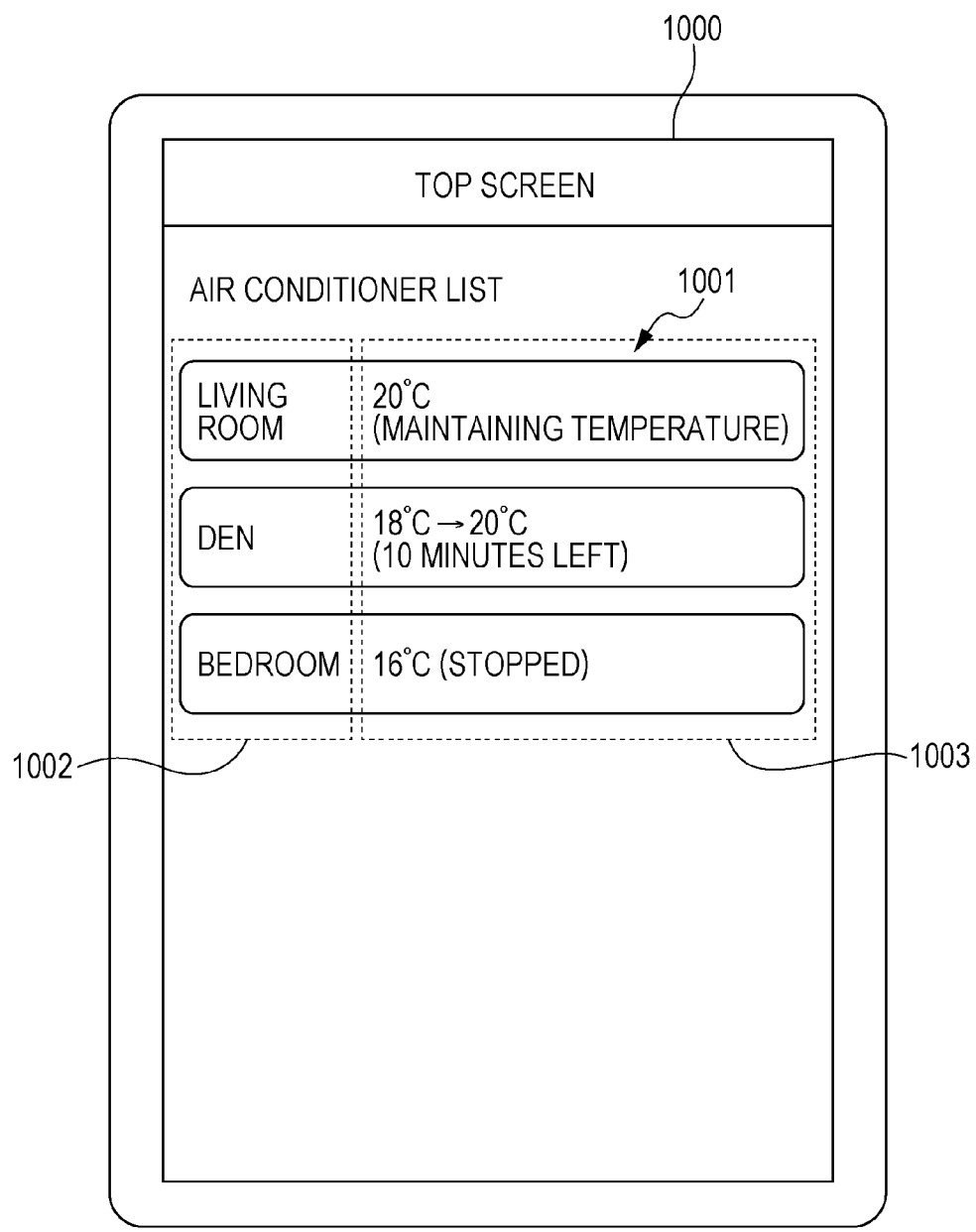
FIG. 10 is a diagram illustrating an example of a top screen.

FIG. 10 is a diagram illustrating an example of a top screen 1000. The top screen 1000 presents the user with a list of air conditioners 200 which the controller 100 can operate, so that the user can select an air conditioner 200 to operate therefrom. The top screen 1000 is displayed on the display unit 101.

A device selection button 1001 is provided for each air conditioner 200 which the controller can operate. Each device selection button 1001 is a button for displaying a screen enabling the user to operate an air conditioner 200, on the display unit 101. In a case where the air conditioner 200 corresponding to the selected device selection button 1001 is currently stopped, an operating screen for when stopped 1100 (FIG. 11) is displayed on the display unit 101. In a case where the air conditioner 200 corresponding to the selected device selection button 1001 is currently running, an operating screen for when running 1300 (FIG. 13) is displayed on the display unit 101. The device selection button 1001 has a room name display region 1002 and a device state display region 1003.

The room name display region 1002 is a region to display the name of the room where the air conditioner 200 is installed. The device state display region 1003 is a region to display the state of the air conditioner 200. For example, in a case where the air conditioner 200 is stopped, the room temperature and a text string stating "stopped" is displayed. In a case where the air conditioner 200 is running to maintain the room temperature, the room temperature and a text string stating "maintaining temperature" is displayed. Further, in a case where the air conditioner 200 is running so that the room temperature reaches the set temperature, the room temperature, set temperature, and time required for the room temperature to reach the set temperature, are displayed.

In the example in FIG. 10, the device state display region 1003 of the device selection button 1001 where the room name display region 1002 has "living room" displayed indicates information to the effect that "the current room temperature so 20° C., and the air conditioner is currently running to maintain the room temperature". Also, in the example in FIG. 10, the device state display region 1003 of the device selection button 1001 where the room name display region 1002 has "den" displayed indicates information to the effect that "the air conditioner is currently running so that the room temperature, currently at 18° C., will reach 20° C., which will take 10 more minutes". Further, in the example in FIG. 10, the device state display region 1003 of the device selection button 1001 where the room name display region 1002 has "bedroom" displayed indicates information to the effect that "the current room temperature is 16° C., and the air conditioner is stopped".

Figure 11:
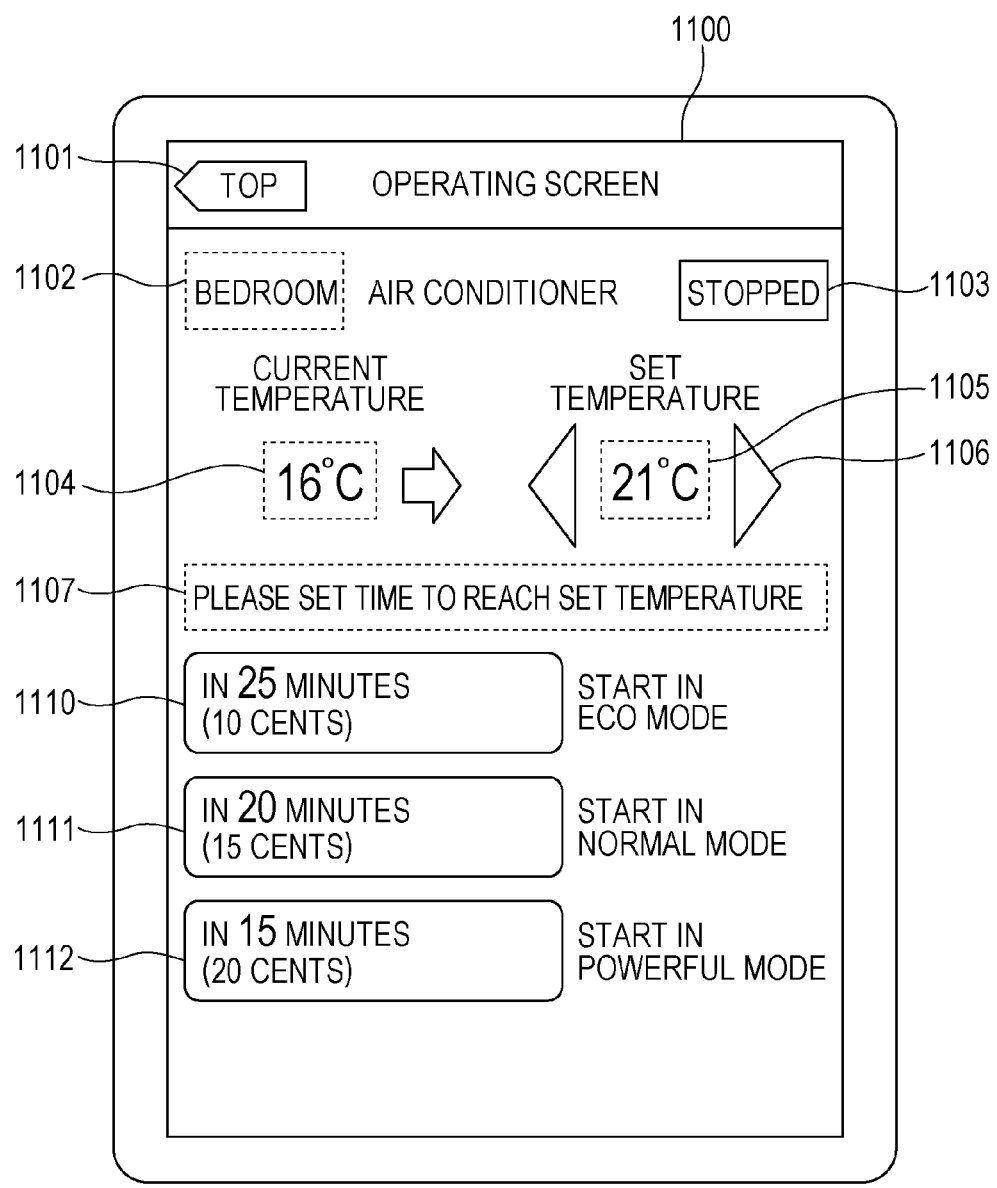
FIG. 11 is a diagram illustrating an example of an operating screen for when stopped.

FIG. 11 is a diagram illustrating an example of the operating screen for when stopped 1100. The operating screen for when stopped 1100 is a screen for presenting the user with information relating to the air conditioner 200 that is currently stopped, and a button to operate the stopped air conditioner 200. The operating screen for when stopped 1100 is displayed on the display unit 101 of the controller 100. The operating screen for when stopped 1100 illustrated in FIG. 11 typically is displayed in a case where a device selection button 1001 corresponding to an air conditioner 200 has been selected from the top screen 1000 in FIG. 10, the stopped air conditioner 200 installed in the bedroom in this case.

A switch to top screen button 1101 is a button for switching the screen displayed on the display unit 101 to the top screen 1000.

A room name display region 1102 is a region to display the name of the room where the air conditioner 200 has been installed. This is "bedroom" in the example in FIG. 11, indicating that the air conditioner 200 is installed in the bedroom.

A running state display region 1103 is a region for displaying a text string indicating whether or not the air conditioner 200 is running. For example, if the air conditioner 200 is running, "running" is displayed, and if not, "stopped" is displayed.

A room temperature display region 1104 is a region for displaying the room temperature of the room where the air conditioner 200 is installed. This indicates that the room temperature in the bedroom is 16° C. in the example in FIG. 11.

A set temperature display region 1105 is a region for displaying the set temperature, that is to say the room temperature that the user desires. This indicates that the set temperature for the bedroom is 21° C. in the example in FIG. 11.

A set temperature changing button 1106 is a button for changing the set temperature. The set temperature can be raised/lowered by selecting this button. Raising/lowering the set temperature changes the numerical value displayed in the set temperature display region 1105, and a control command for changing the set temperature is transmitted to the air conditioner 200. In the example in FIG. 11, the set temperature changing button 1106 is illustrated as being made up of two symmetrical triangular buttons, with the triangular button pointing toward the right being used to raise the set temperature, and the triangular button pointing toward the left being used to lower the set temperature.

A message display region 1107 is a region to notify the user of the operating state of the air conditioner 200, and to display messages to prompt the user to operate the screen. In the example in FIG. 11, a message "Please set time to reach set temperature" is displayed in the message display region 1107, prompting the user to select one of an eco mode running button 1110, a normal mode running button 1111, and a powerful mode running button 1112, each of the buttons stating the amount of time which it will take for the room temperature to reach the set temperature.

The eco mode running button 1110 is a button to cause the air conditioner 200 to run in the eco mode, and to switch the display screen of the display unit 101 to the operating screen for when running 1300. The eco mode running button 1110 shows displayed therein the air conditioning cost in a case of running the air conditioner 200 in the eco mode. The example in FIG. 11 shows the amount of time and electricity charges necessary for the current room temperature to reach the set temperature displayed as the air conditioning cost. The amount of time necessary for the current room temperature to reach the set temperature in the eco mode in this example is 25 minutes, and the necessary electricity charges are 10 cents.

The normal mode running button 1111 is a button to cause the air conditioner 200 to run in the normal mode, and to switch the display screen of the display unit 101 to the operating screen for when running 1300. The normal mode running button 1111 shows displayed therein the air conditioning cost in a case of running the air conditioner 200 in the normal mode. The example in FIG. 11 shows the amount of time and electricity charges necessary for the current room temperature to reach the set temperature displayed as the air conditioning cost. The amount of time necessary for the current room temperature to reach the set temperature in the normal mode in this example is 20 minutes, and the necessary electricity charges are 15 cents.

The powerful mode running button 1112 is a button to cause the air conditioner 200 to run in the powerful mode, and to switch the display screen of the display unit 101 to the operating screen for when running 1300. The powerful mode running button 1112 shows displayed therein the air conditioning cost in a case of running the air conditioner 200 in the powerful mode. The example in FIG. 11 shows the amount of time and electricity charges necessary for the current room temperature to reach the set temperature displayed as the air conditioning cost. The amount of time necessary for the current room temperature to reach the set temperature in the powerful mode in this example is 15 minutes, and the necessary electricity charges are 20 cents.

The arrangement in FIG. 11 where the running buttons corresponding to the operating modes of the air conditioner 200 are displayed correlated with the air conditioning costs can give the user a guideline regarding which operating mode is better to select. Displaying the air conditioning costs inside the frames of the running buttons corresponding to the operating modes allows the display region to be conserved while maintaining ease of user comprehension of the correlation between the operating mode and the air conditioning cost.

Figure 12:
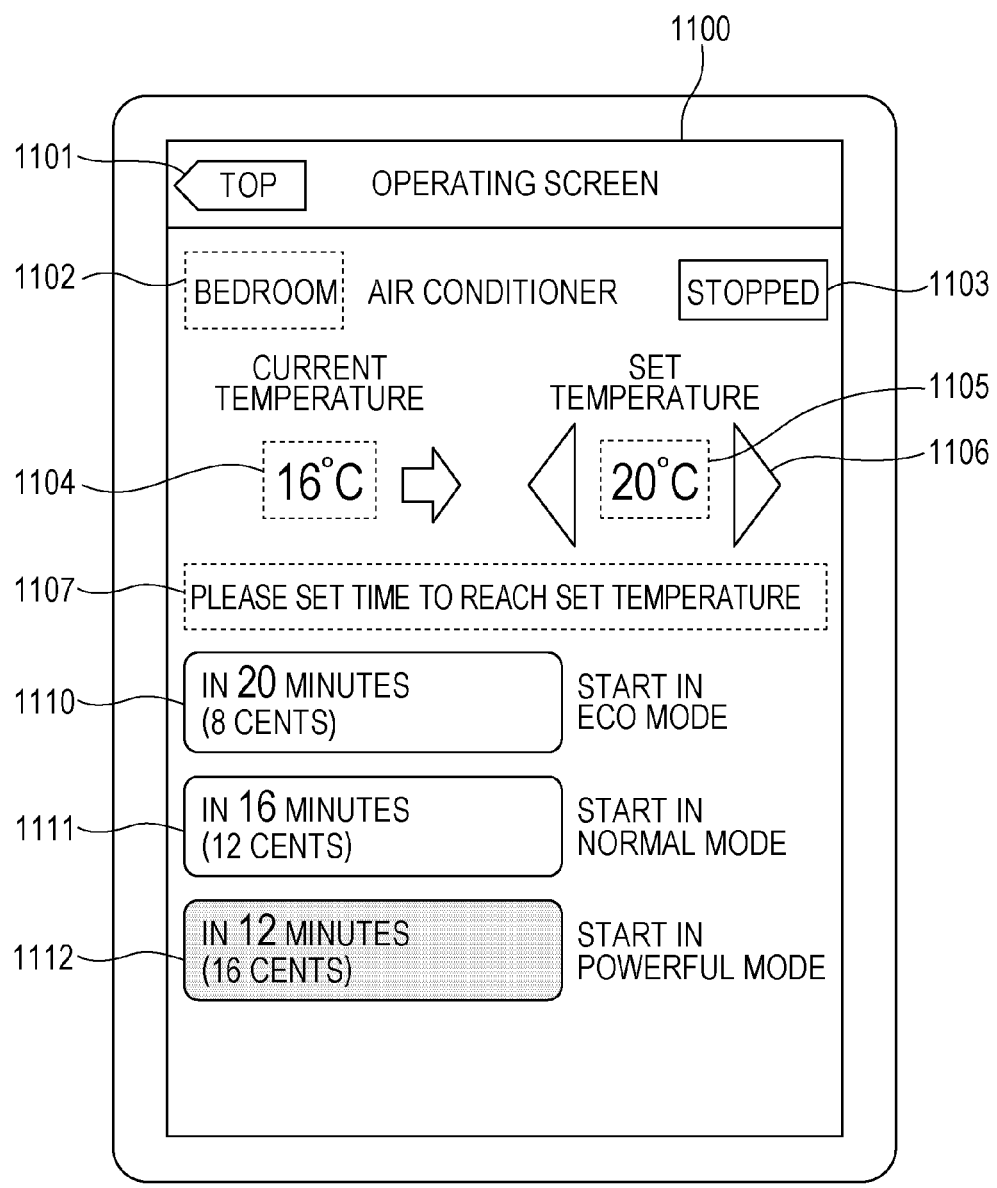
FIG. 12 is a diagram illustrating another example of an operating screen for when stopped.

FIG. 12 is a diagram illustrating another example of the operating screen for when stopped 1100. A feature of the operating screen for when stopped 1100 in FIG. 12 as compared to the operating screen for when stopped 1100 in FIG. 11 is that the powerful mode running button 1112 is displayed in a different color from the normal mode running button 1111. The components in FIG. 12 which are denoted by the same reference numerals as components in FIG. 11 are the same, and accordingly description thereof will be omitted.

The operating screen for when stopped 1100 in FIG. 12 is typically displayed in a case where the user has selected the set temperature changing button 1106 from the operating screen for when stopped 1100 in FIG. 11, to lower the temperature by 1° C. in this case. As compared to the operating screen for when stopped 1100 in FIG. 11, the set temperature in the operating screen for when stopped 1100 in FIG. 12 has been lowered from 21° C. to 20° C., and the time for the room temperature to reach the set temperature is reduced from 20 minutes to 16 minutes in the normal mode, and from 15 minutes to 12 minutes in the powerful mode. At this time, the difference between the time of the powerful mode and the time in the normal mode is less than 5 minutes, so the powerful mode running button 1112 is displayed in gray.

In a case where the amount of time for the room temperature to reach the set temperature in the powerful mode is not quicker in comparison with the normal mode by a predetermined amount of time or more, i.e., in a case where the advantage of reduced time for the room temperature to reach the set temperature by selecting the powerful mode is small, the arrangement in FIG. 12 displays the powerful mode running button 1112 in a different color from the normal mode running button 1111, bringing the attention of the user to this fact so the user does not select the powerful mode.

Now, the threshold value for comparison between time in the normal mode and time in the powerful mode is set to "5 minutes" in the present embodiment, but this is only exemplary. If many users feel that 5 minutes is worthwhile selecting the powerful mode, a different value may be used to obtain the same advantages.

While a value set by the system builder for all users has been employed as the threshold value for comparison between time in the normal mode and time in the powerful mode in the present embodiment, this value may be individually set for each user. For example, a user who feels that even 1 minute in time difference is sufficient to justify selecting the powerful mode can set the value to "1 minute", and a user who feels that selecting the powerful mode is not worthwhile unless there is a time difference of 10 minutes or more can set the value to "10 minutes". Allowing the user to set the threshold value for comparing the time in the powerful mode with the time in the normal mode enables a screen display to be realized according to the intuition of each individual user. Of course, the initial value should be a value where a great part of users feel selecting the powerful mode is worthwhile. Accordingly, advantages the same as when using the same value for all users can be obtained even if users do not perform individual settings.

While the present embodiment has been described as changing the display color of the powerful mode running button 1112 to "gray" in a case where the advantage of the powerful mode is small, this is only exemplary. The same advantages can be obtained by other colors, as long as the color is different from that of the normal mode running button 1111, and many users can recognize thereby that the advantage of the powerful mode is small. Suitably used colors other than gray include black, dark blue, and translucent.

While a color set by the system builder for all users has been employed as the display color for the powerful mode running button 1112 in the case that the advantage of the powerful mode is small in the present embodiment, this color may be individually set for each user. Enabling each user to set the display color for the powerful mode running button 1112 in the case that the advantage of the powerful mode is small realizes display screens which match the intuition of each individual user. Of course, the initial color should be one where a great part of users recognize that the advantage of the powerful mode is small. Accordingly, advantages the same as when using the same color for all users can be obtained even if users do not perform individual settings.

Figure 13:
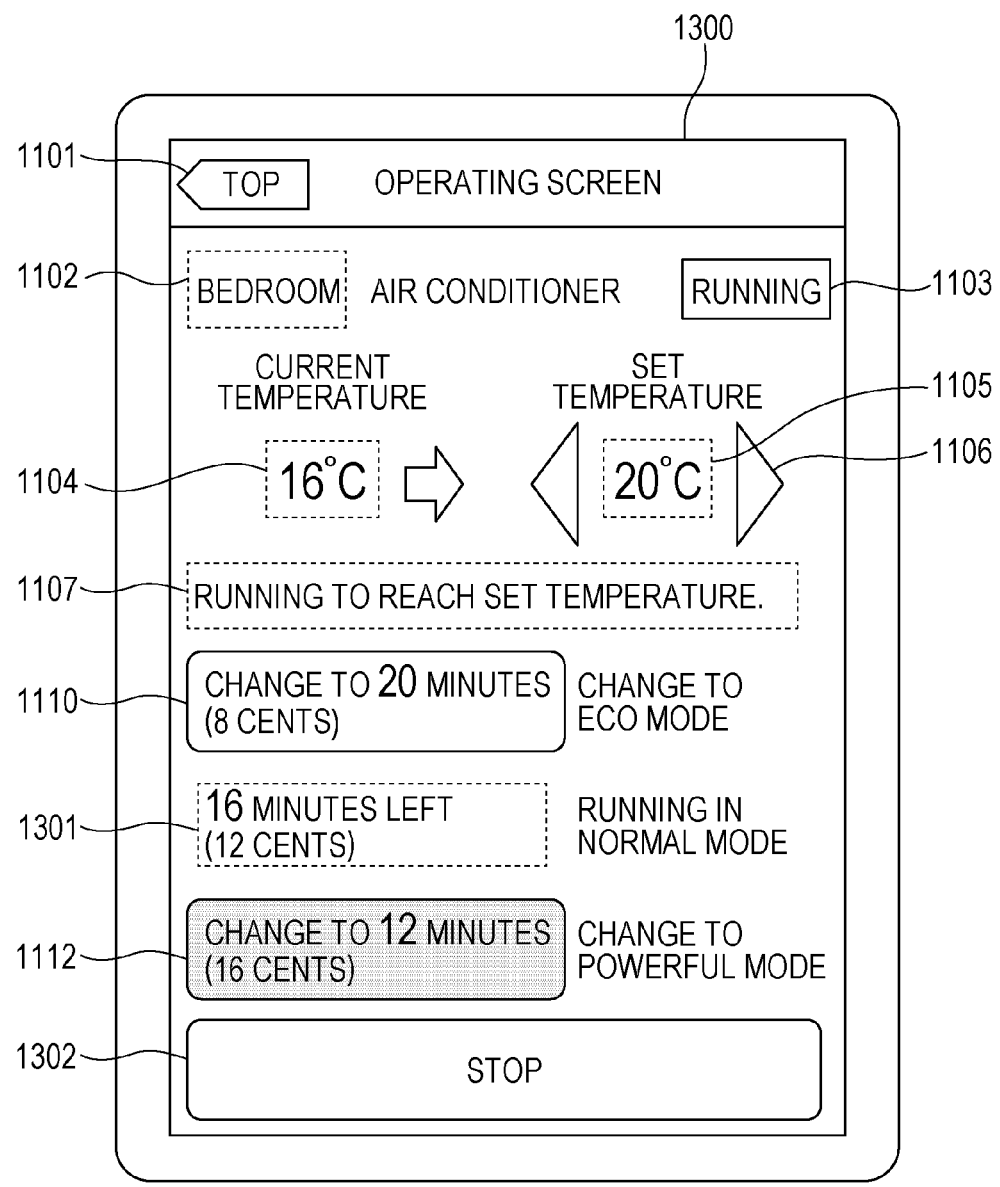
FIG. 13 is a diagram illustrating an example of an operating screen for when running.

FIG. 13 is a diagram illustrating an example of the operating screen for when running 1300. The operating screen for when running 1300 is a screen to present the user with information relating to an air conditioner 200 that is currently running, and buttons to operate the running air conditioner 200. The operating screen for when running 1300 is displayed on the display unit 101. The operating screen for when running 1300 in FIG. 13 typically is displayed in a case where the normal mode running button 1111 has been selected from the operating screen for when stopped 1100 in FIG. 12, and the air conditioner 200 is running in the normal mode.

An air conditioning cost display region 1301 is a region for displaying the air conditioning cost in the current operating mode of the air conditioner 200, and is displayed within the same region as that of the running button corresponding to the current operating mode. At this time, the running button corresponding to the current operating mode is hidden. The air conditioner 200 is running in the normal mode in the example in FIG. 13, so the normal mode running button 1111 is hidden, and the air conditioning cost display region 1301 is displayed in that space. The time and electricity charges necessary for the room temperature to reach the set temperature are displayed as the air conditioning cost in the air conditioning cost display region 1301 in the example in FIG. 13.

A stop button 1302 is a button for stopping the air conditioner 200 being operated, and switching the display screen on the display unit 101 to the operating screen for when stopped 1100. Other components in FIG. 13, which have been denoted by the same reference numerals as components in FIG. 11, are the same, and accordingly description thereof is omitted here.

Hiding the normal mode running button 1111 during running in the normal mode in FIG. 13 ensures that the user can tell that the operations of the air conditioner 200 will not change even if the running button corresponding to the operating mode that is currently running. Further, the air conditioning cost display region 1301 is displayed in the same region as the normal mode running button 1111, which allows the display region to be conserved while maintaining ease of user comprehension of the correlation between the operating mode and the air conditioning cost.

While description has been made regarding the example in FIG. 13 that the air conditioner 200 is running in the normal mode, the same holds for running in the eco mode and the powerful mode as well. In a case where the air conditioner 200 is running in the eco mode, the eco mode running button 1110 is hidden and the air conditioning cost display region 1301 is displayed in the same region. At this time, the air conditioning cost in the case of running the air conditioner 200 in the eco mode is displayed in the air conditioning cost display region 1301. In a case where the air conditioner 200 is running in the powerful mode, the powerful mode running button 1112 is hidden and the air conditioning cost display region 1301 is displayed in the same region. At this time, the air conditioning cost in the case of running the air conditioner 200 in the powerful mode is displayed in the air conditioning cost display region 1301.

Figure 14:
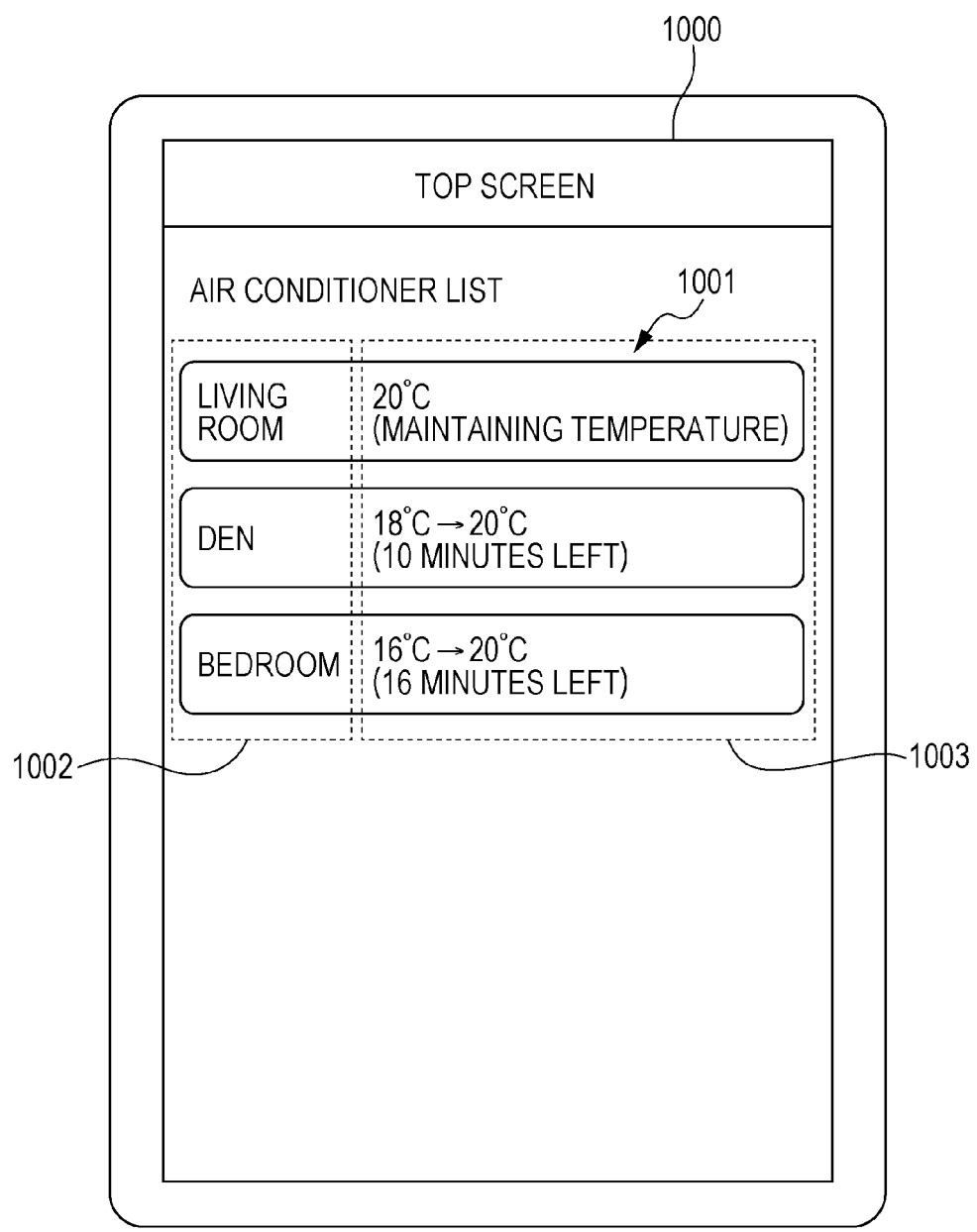
FIG. 14 is a diagram illustrating another example of a top screen.

FIG. 14 is a diagram illustrating another example of the top screen 1000. The top screen 1000 illustrated in FIG. 14 typically is displayed in a case where the switch to top screen button 1101 has been selected from the operating screen for when running 1300 in FIG. 13. A feature of the top screen 1000 in FIG. 14 is that the content of the device state display region 1003 is changed as compared to the top screen 1000 in FIG. 10. This is because the air conditioner 200 installed in the bedroom has been changed from running to stopped. Components in FIG. 14, which have been denoted by the same reference numerals as components in FIG. 10, are the same, and accordingly description thereof is omitted here.

Figure 15:
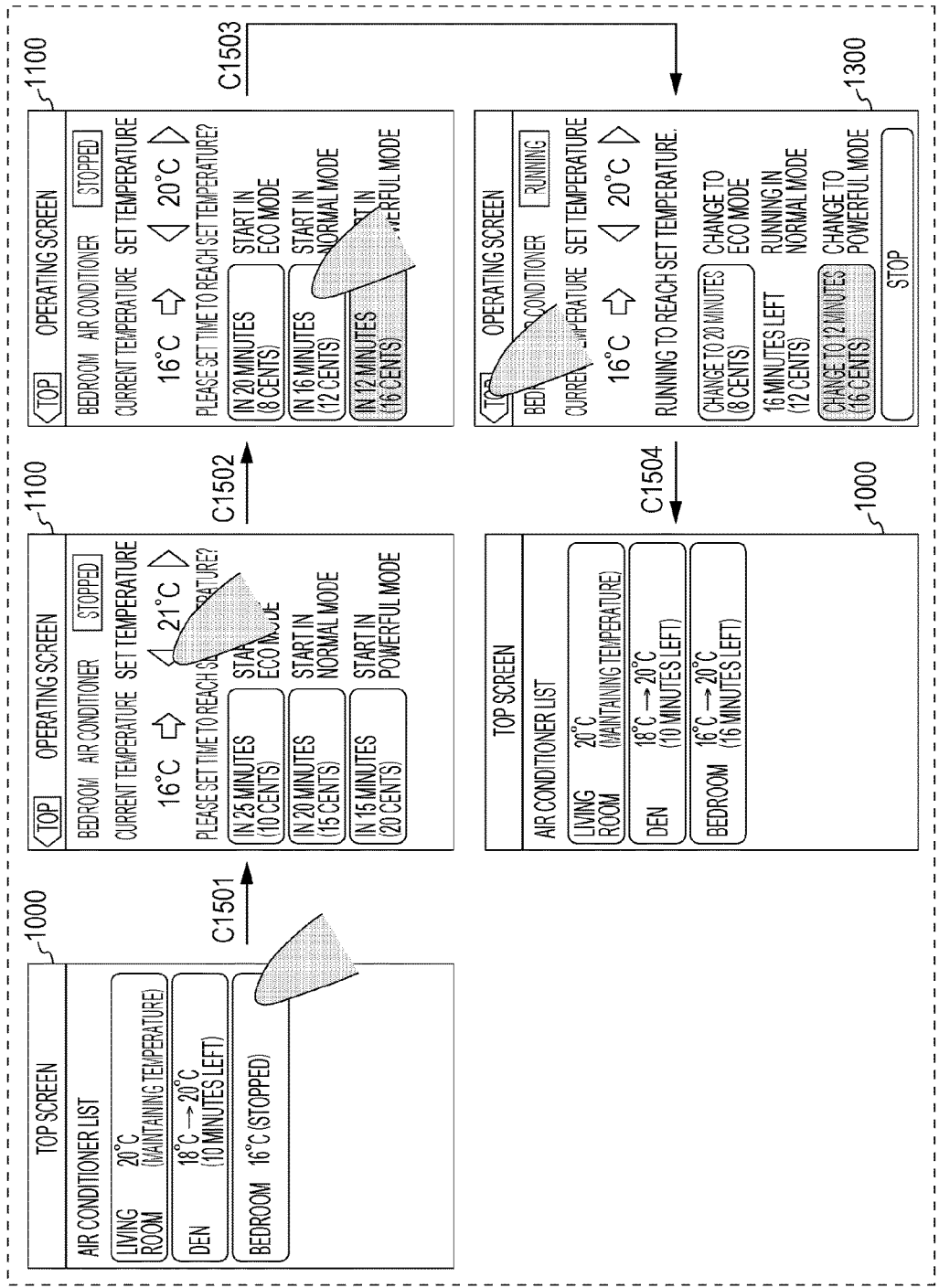
FIG. 15 is a diagram illustrating an example of a screen flow for operating a stopped air conditioner.

FIG. 15 is a diagram illustrating an example of a screen flow for changing the state of a stopped air conditioner 200 to a running state. FIG. 15 will be described below with reference to FIGS. 10 through 14.

First, at the top screen 1000 in FIG. 10, the device selection button 1001 corresponding to the stopped air conditioner 200 installed in the bedroom is selected, which brings up the operating screen for when stopped 1100 in FIG. 11 (C1501).

Next, in the operating screen for when stopped 1100 in FIG. 11, the set temperature changing button 1106 is selected, which brings up the operating screen for when stopped 1100 in FIG. 12 (C1502). At this time, the set temperature has been changed, so the display content of the set temperature display region 1105, eco mode running button 1110, normal mode running button 1111, and powerful mode running button 1112 is updated. Also, the change to the set temperature has resulted in the difference between the time for the room temperature to reach the set temperature in the powerful mode and the time in the normal mode is less than 5 minutes, so the powerful mode running button 1112 is displayed in gray.

Next, in the operating screen for when stopped 1100 in FIG. 12, the normal mode running button 1111 is selected, whereby the air conditioner 200 being operated starts to run in the normal mode, and the operating screen for when running 1300 in FIG. 13 is displayed (C1503).

Next, the switch to top screen button 1101 is selected from the operating screen for when running 1300 in FIG. 13, so the top screen 1000 in FIG. 14 is displayed (S1504).

At the time of the set temperature changing button 1106 being selected in FIG. 15, the content of the set temperature display region 1105, eco mode running button 1110, normal mode running button 1111, and powerful mode running button 1112 is updated, so the user can decide what temperature to set as the set temperature, while confirming how much the electricity charges will be and how much time it will take for setting the set temperature of the air conditioner 200 to what temperature.

Figure 16:
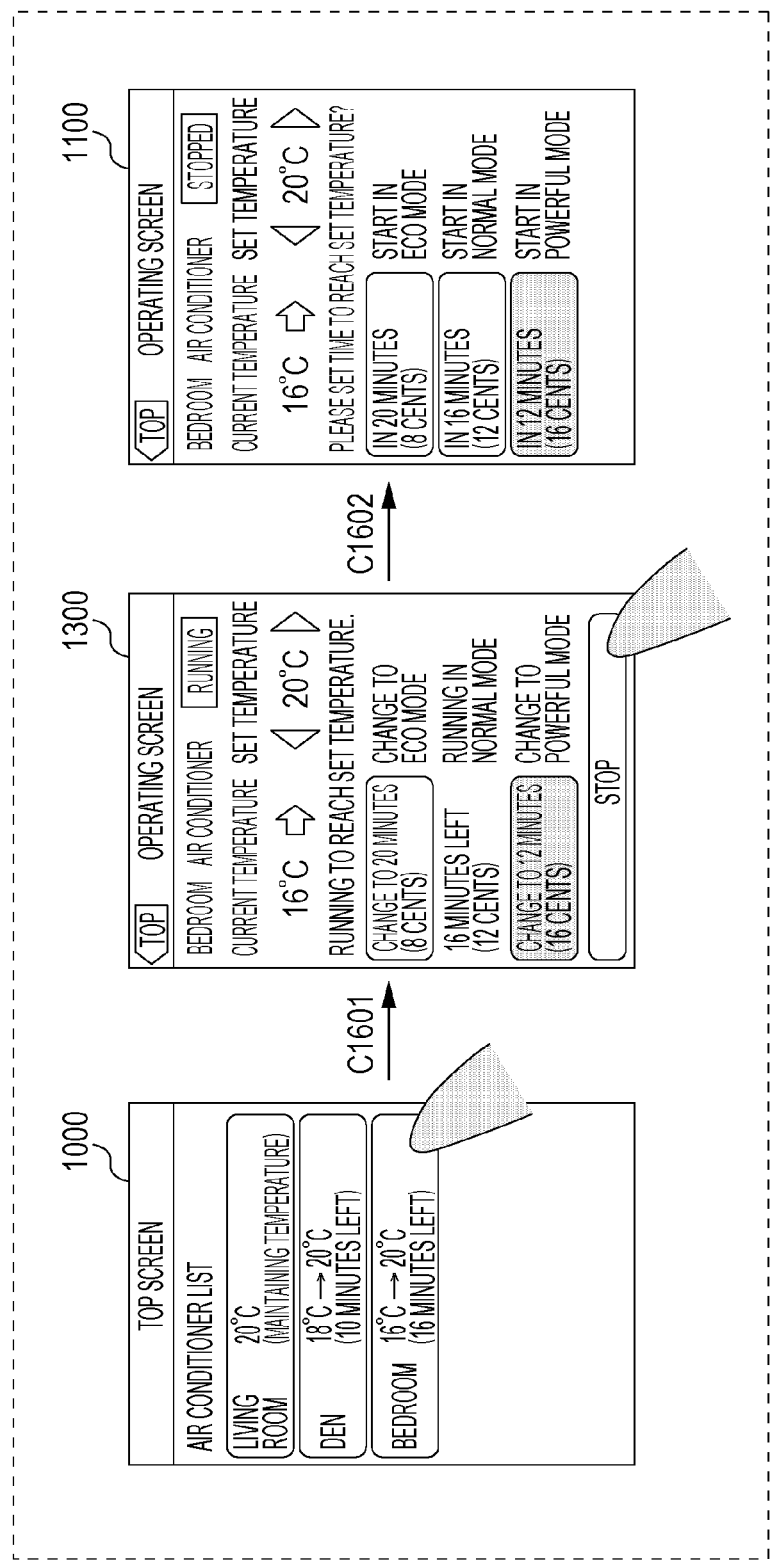
FIG. 16 is a diagram illustrating an example of a screen flow for stopping a running air conditioner.

FIG. 16 is a diagram illustrating an example of a screen flow for bringing a running air conditioner 200 to a stopped state. FIG. 16 will be described below with reference to FIGS. 12 through 14.

First, at the top screen 1000 in FIG. 14, the device selection button 1001 corresponding to the running air conditioner 200 installed in the bedroom is selected, thus bringing up the operating screen for when running 1300 in FIG. 13 (C1601).

Next, the stop button 1302 is pressed in the operating screen for when running 1300 in FIG. 13, whereby the air conditioner 200 being operated is stopped, and the operating screen for when stopped 1100 in FIG. 12 is displayed (C1602).

Figure 17:
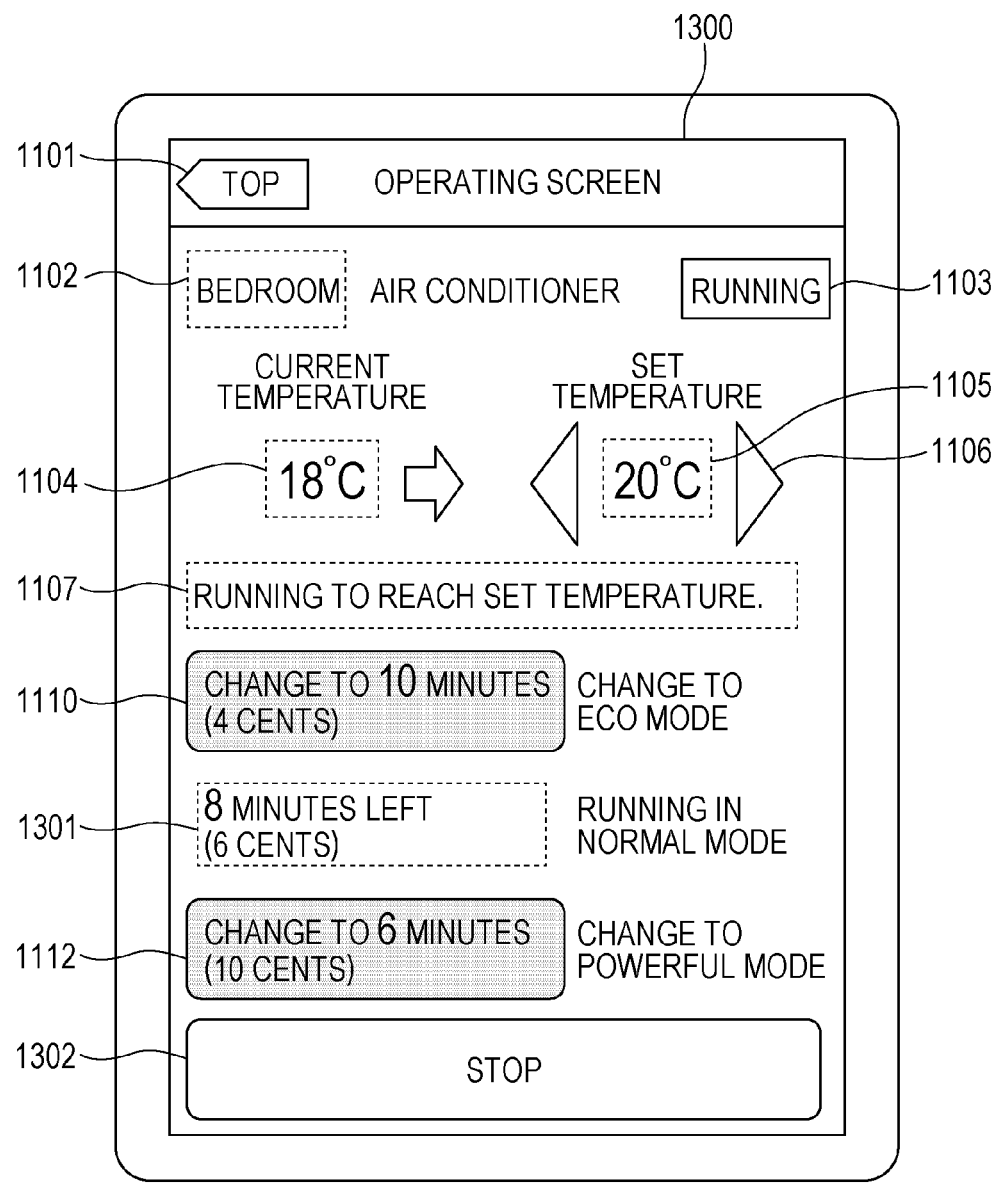
FIG. 17 is a diagram illustrating another example of an operating screen for when running.

FIG. 17 is a diagram illustrating another example of the operating screen for when running 1300. A feature of the operating screen for when running 1300 in FIG. 17 as compared with the operating screen for when running 1300 in FIG. 13 is that the eco mode running button 1110 is displayed in a different color from the normal mode running button 1111. Components in FIG. 17 which are denoted with the same reference numerals as components in FIG. 13 are the same, so description will be omitted here.

The operating screen for when running 1300 illustrated in FIG. 17 typically is displayed in a case where time has elapsed from the operating screen for when running 1300 in FIG. 13, and the room temperature has risen by 2° C. The operating screen for when running 1300 in FIG. 17 has changed from the operating screen for when running 1300 in FIG. 13 in that the room temperature has risen from 16° C. to 18° C., and the electricity charges for the room temperature to reach the set temperature have changed from 12 cents to 6 cents in the normal mode, and from 8 cents to 4 cents in the eco mode. In doing so, the difference between the electricity charges in the eco mode and the electricity charges in the normal mode is smaller than 3 cents, so the eco mode running button 1110 is displayed in gray.

In a case where the electricity charges for the room temperature to reach the set temperature in the eco mode is not cheaper in comparison with the normal mode by a predetermined amount of electricity charges or more, i.e., in a case where the advantage of reduced electricity charges for the room temperature to reach the set temperature by selecting the eco mode is small, the arrangement in FIG. 17 displays the eco mode running button 1110 in a different color from the normal mode running button 1111, bringing the attention of the user to this fact so the user does not select the eco mode.

Now, the threshold value for comparison between electricity charges in the normal mode and electricity charges in the eco mode is set to "3 cents" in the present embodiment, but this is only exemplary. If many users feel that 3 cents is worthwhile selecting the eco mode, a different value may be used to obtain the same advantages.

While a value set by the system builder for all users has been employed as the threshold value for comparison between electricity charges in the normal mode and electricity charges in the eco mode in the present embodiment, this value may be individually set for each user. For example, a user who feels that even 1 cent difference in savings is sufficient to justify selecting the eco mode can set the value to "1 cent", and a user who feels that selecting the eco mode is not worthwhile unless there are savings in electricity charges of 10 cents or more can set the value to "10 cents". Allowing the user to set the threshold value for comparing the electricity charges in the eco mode with the electricity charges in the normal mode enables a screen display to be realized according to the intuition of each individual user. Of course, the initial value should be a value where a great part of users feel selecting the eco mode is worthwhile. Accordingly, advantages the same as when using the same value for all users can be obtained even if users do not perform individual settings.

While the present embodiment has been described as changing the display color of the eco mode running button 1110 to "gray" in a case where the advantage of the eco mode is small, this is only exemplary. The same advantages can be obtained by other colors, as long as the color is different from that of the normal mode running button 1111, and many users can recognize thereby that the advantage of the eco mode is small. Suitably used colors other than gray include black, dark blue, and translucent.

While a color set by the system builder for all users has been employed as the display color for the eco mode running button 1110 in the case that the advantage of the eco mode is small in the present embodiment, this color may be individually set for each user. Enabling each user to set the display color for the eco mode running button 1110 in the case that the advantage of the eco mode is small realizes display screens which match the intuition of each individual user. Of course, the initial color should be one where a great part of users recognize that the advantage of the eco mode is small. Accordingly, advantages the same as when using the same color for all users can be obtained even if users do not perform individual settings.

Figure 18:
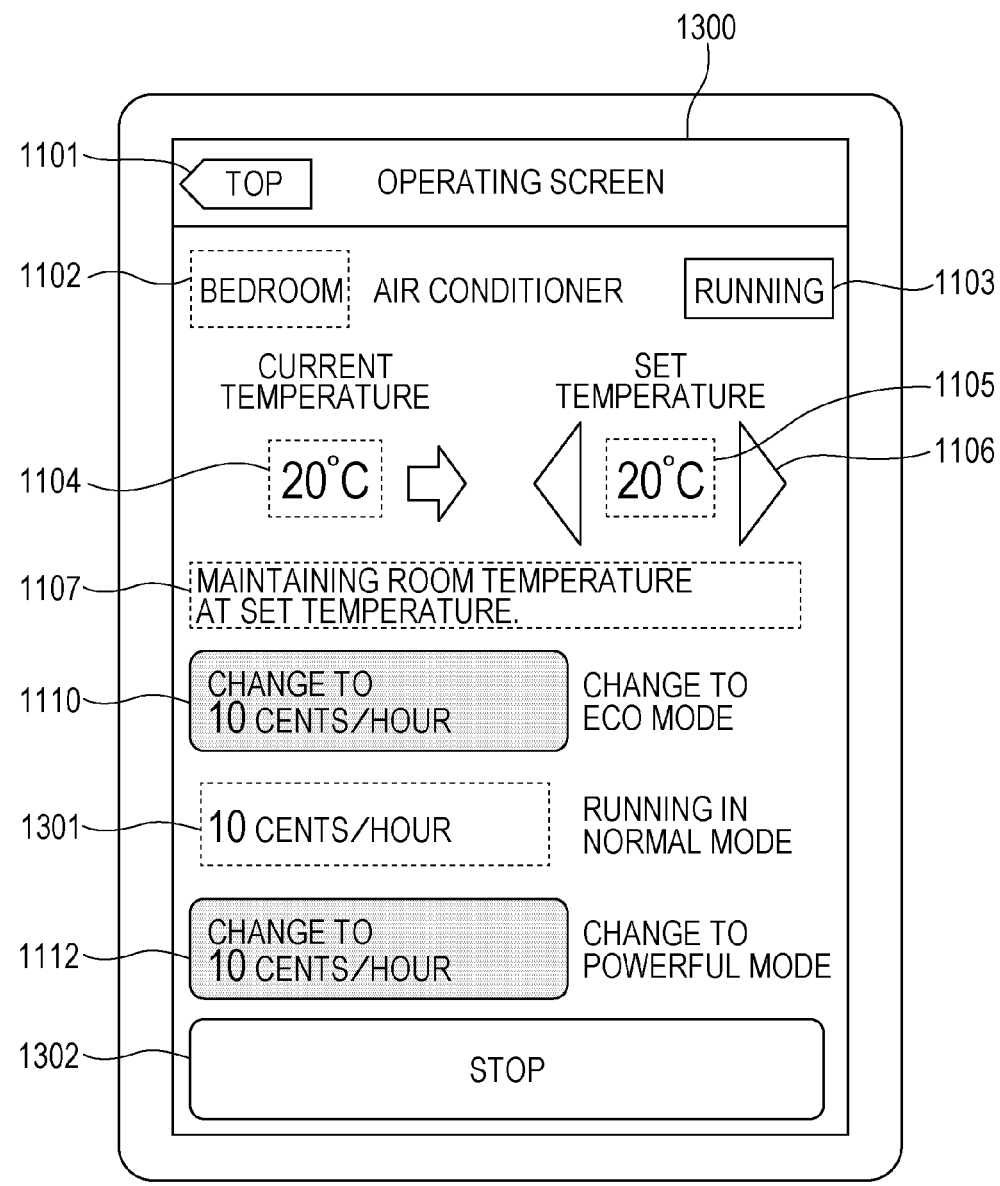
FIG. 18 is a diagram illustrating an example of an operating screen for when running, in a case where the room temperature and set temperature are the same.

FIG. 18 is a diagram illustrating an example of the operating screen for when running 1300 in a case where the room temperature and the set temperature are the same. The operating screen for when running 1300 in FIG. 18 typically is displayed in a case where time has elapsed from the operating screen for when running 1300 in FIG. 17, and the room temperature has reached the set temperature. A feature of the operating screen for when running 1300 in FIG. 18 as compared to the operating screen for when running 1300 in FIG. 17 is that the air conditioning cost displayed in the eco mode running button 1110, air conditioning cost display region 1301, and powerful mode running button 1112, have been changed to electric charges to maintain the room temperature. Components in FIG. 18 which are denoted with the same reference numerals as components in FIG. 13 are the same, so description will be omitted here.

In the example in FIG. 18, the room temperature has reached 20° C., which is the same as the set temperature, so the eco mode running button 1110, the air conditioning cost display region 1301, and the powerful mode running button 1112 display electricity charges to maintain the room temperature, as the air conditioning cost. The air conditioning cost display region 1301 here indicates that the electricity charges for the air conditioner 200 to maintain the room temperature in the normal mode are 10 cents per hour. In the same way, the eco mode running button 1110 indicates that the electricity charges for the air conditioner 200 to maintain the room temperature in the eco mode are 10 cents per hour, and similarly the powerful mode running button 1112 indicates that the electricity charges for the air conditioner 200 to maintain the room temperature in the powerful mode are 10 cents per hour.

This arrangement in FIG. 18 where the air conditioning cost displayed in the eco mode running button 1110, air conditioning cost display region 1301, and powerful mode running button 1112, are changed to electric charges to maintain the room temperature, when the room temperature reaches the set temperature, continues to display information which is of interest to the user thereafter. It can also be seen in the example in FIG. 18 that the electricity charges for the air conditioner 200 to maintain the room temperature in the eco mode is not cheaper than the normal mode by a margin of 3 cents or more (the same 10 cents in both the eco mode and the normal mode), the eco mode running button 1110 is displayed in gray.

While the example in FIG. 18 uses the same value as the case of the room temperature reaching the set temperature, as the threshold value for comparing the electricity charges for the air conditioner 200 to maintain the room temperature in the eco mode with the electricity charges in the normal mode, but this may be different. In a case where these are different, a small value such as "1 cent" is preferably used. The reason is that, once the room temperature has reached the set temperature, there is no need to consider the disadvantage of the eco mode where a longer amount of time is required for the room temperature to reach the set temperature, so an advantage of being cheaper by even 1 cent is sufficiently meaningful for many users to select the eco mode.

Similarly, it can be seen in the example in FIG. 18 that the time for the air conditioner 200 to bring the room temperature to the set temperature in the powerful mode is not faster than the normal mode by a margin of 5 minutes or more (the same 0 minutes in both the powerful mode and the normal mode), the powerful mode running button 1112 is displayed in gray.

While description has been made in the example in FIG. 18 regarding a case where the air conditioner 200 is running in the normal mode, the same holds for cases of running in the eco mode and powerful mode as well. In a case where the air conditioner 200 is running in the eco mode, the operating screen for when running 1300 displays the air conditioning cost display region 1301, normal mode running button 1111, and powerful mode running button 1112, along with the electricity charges to maintain the room temperature. In a case where the air conditioner 200 is running in the powerful mode, the operating screen for when running 1300 displays the eco mode running button 1110, normal mode running button 1111, and air conditioning cost display region 1301, along with the electricity charges to maintain the room temperature.

Figure 19:
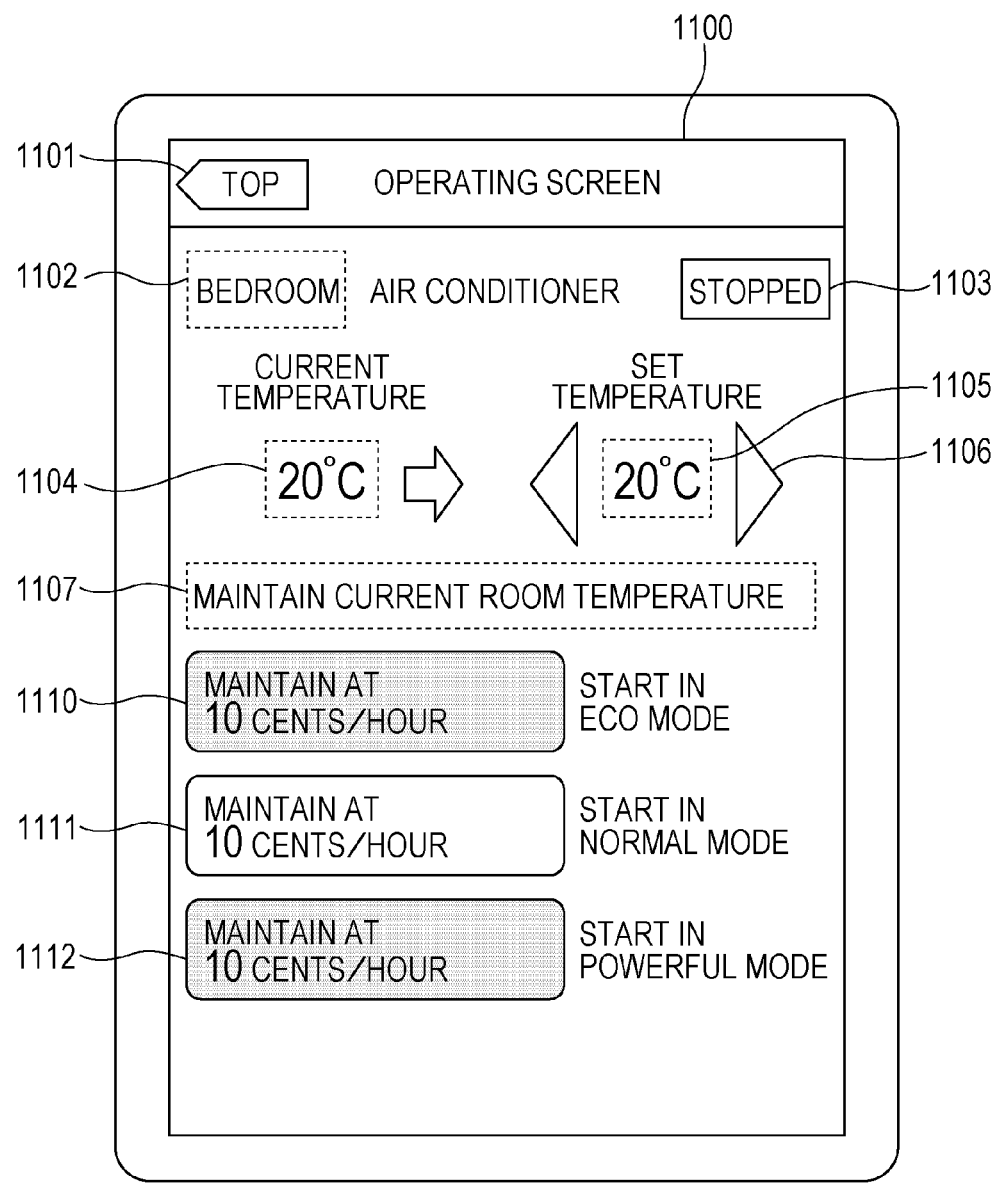
FIG. 19 is a diagram illustrating an example of an operating screen for when stopped, in a case where the room temperature and set temperature are the same.

FIG. 19 is a diagram illustrating an example of the operating screen for when stopped 1100 in a case where the room temperature and the set temperature are the same. The operating screen for when stopped 1100 in FIG. 19 typically is displayed in a case where the user has selected the stop button 1302 from the operating screen for when running 1300 in FIG. 18. Components in FIG. 19 which are denoted with the same reference numerals as components in FIG. 11 are the same, so description will be omitted here. A feature of the operating screen for when running 1300 in FIG. 19 as compared to the operating screen for when running 1300 in FIG. 11 is that the air conditioning cost displayed in the eco mode running button 1110, normal mode running button 1111, and powerful mode running button 1112, has been changed to electric charges to maintain the room temperature.

Figure 20:
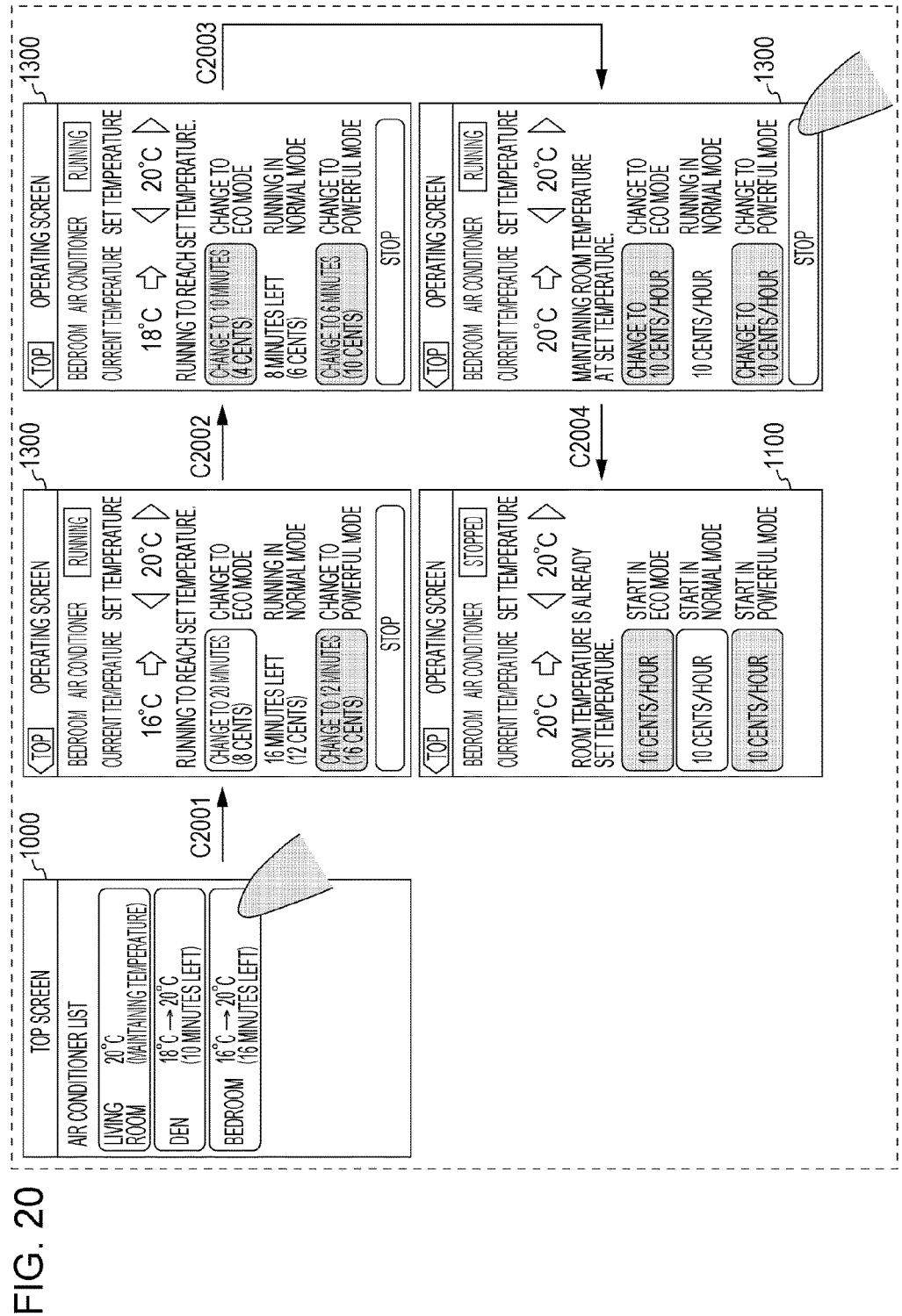
FIG. 20 is a diagram illustrating an example of a screen flow for stopping a running air conditioner when the room temperature has reached the set temperature.

FIG. 20 is a diagram illustrating an example of a screen flow for stopping a running air conditioner 200 when the room temperature has reached the set temperature. FIG. 20 will be described below with reference to FIGS. 13 and 14, and 17 through 19.

First, the user selects the device selection button 1001 from the top screen 1000 in FIG. 14 that corresponds to the air conditioner 200 installed in the bedroom. This brings up the operating screen for when running 1300 in FIG. 13 (C2001).

Next, time elapses from the state in operating screen for when running 1300 in FIG. 13 and the room temperature rises, bringing up the operating screen for when running 1300 in FIG. 17 (C2002). Time has changed here, so the display contents of the eco mode running button 1110, the air conditioning cost display region 1301, and the powerful mode running button 1112, are updated. The room temperature has also changed, so the numerical value displayed in the room temperature display region 1104 is updated. Further, the rise in the room temperature has led the difference in electricity charges for the room temperature to reach the set temperature in eco mode and the electricity charges in normal mode to fall below 3 cents, so the eco mode running button 1110 is displayed in gray.

Next, time further elapses in the operating screen for when running 1300 in FIG. 17 and the room temperature reaches the set temperature, bringing up the operating screen for when running 1300 in FIG. 18 (C2003). The room temperature has reached the set temperature, so the air conditioning cost displayed in the eco mode running button 1110, air conditioning cost display region 1301, and powerful mode running button 1112, is changed to electricity charges to maintain the room temperature.

The air conditioner 200 is stopped by the stop button 1302 being selected in the operating screen for when running 1300 in FIG. 18, thereby bringing up the operating screen for when stopped 1100 in FIG. 19 (C2004).

Figure 21:
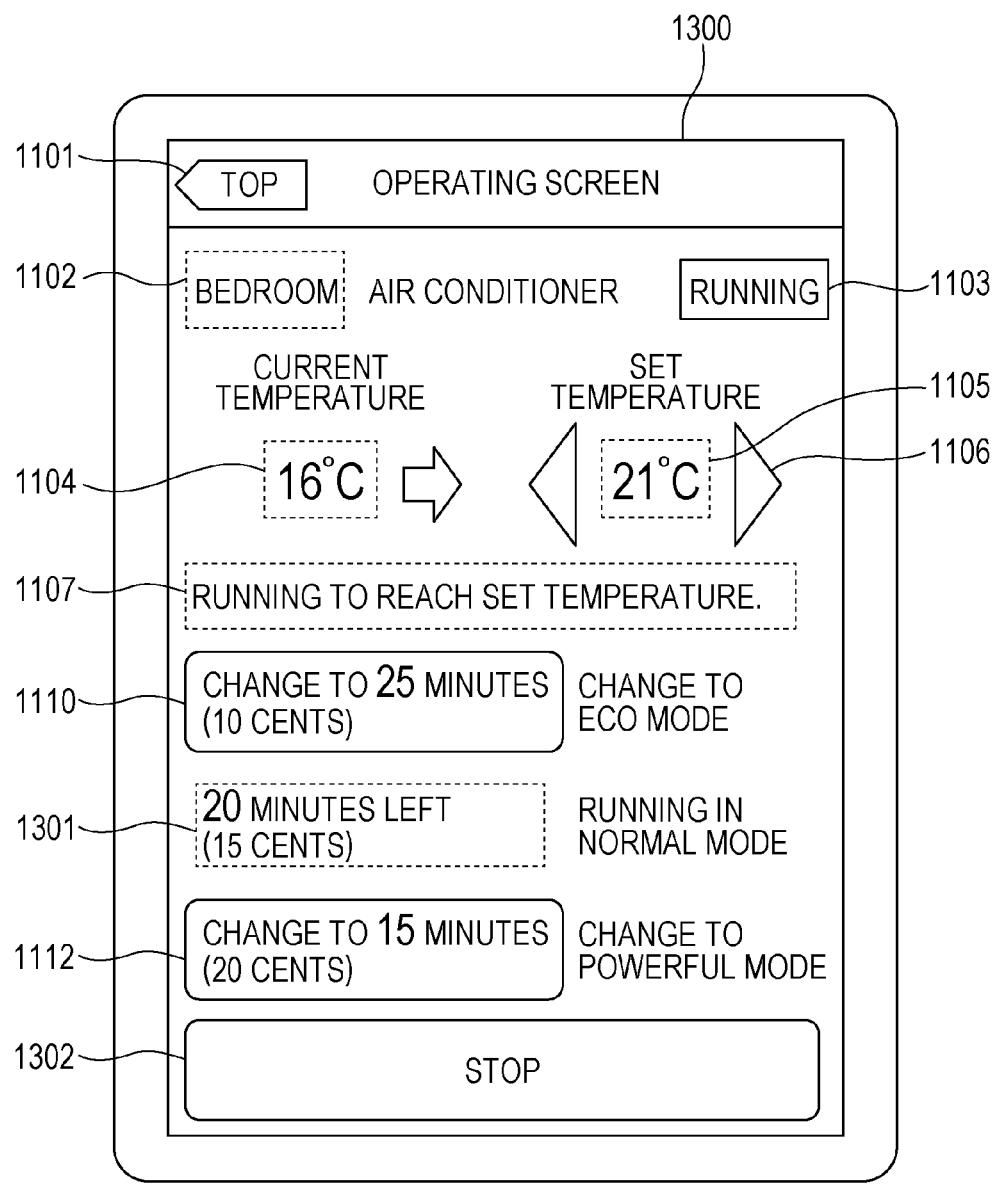
FIG. 21 is another example of an operating screen for when running.

FIG. 21 is another example of the operating screen for when running 1300. The operating screen for when running 1300 in FIG. 21 is typically displayed in a case where the user has selected the set temperature changing button 1106 in the operating screen for when running 1300 in FIG. 13, to raise the set temperature by 1° C. in this case. A feature of the operating screen for when running 1300 in FIG. 21 as compared to the operating screen for when running 1300 in FIG. 13 is that the value of the set temperature display region 1105 has charged, and that the powerful mode running button 1112 is displayed in the same color as the normal mode running button 1111. Components in FIG. 21 which are denoted with the same reference numerals as components in FIG. 13 are the same, so description will be omitted here.

The set temperature has been raised by 1° C. from that in FIG. 13, so the amount of time necessary for the room temperature to reach the set temperature in the powerful mode is now 5 minutes or more faster than in the normal mode, so the color of the powerful mode running button 1112 is changed form the gray color to the white color, the same as with the normal mode.

Figure 22:
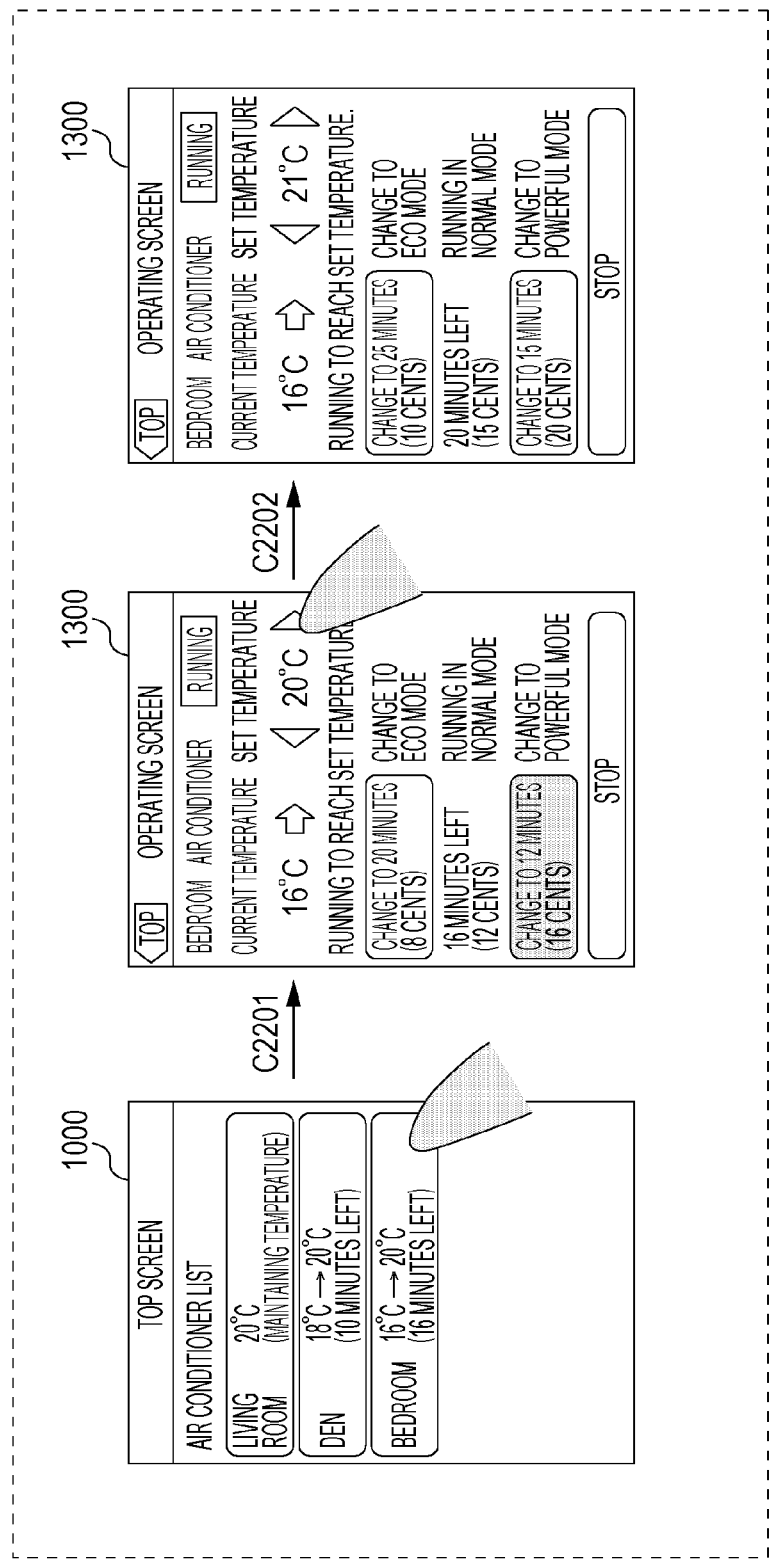
FIG. 22 is a diagram illustrating an example of a screen flow for changing a set temperature of a running air conditioner.

FIG. 22 is a diagram illustrating an example of a screen flow for changing the set temperature of a running air conditioner 200. FIG. 22 will be described below with reference to FIGS. 13, 14, and 21.

First, the user selects the device selection button 1001 from the top screen 1000 in FIG. 14 that corresponds to the running air conditioner 200 installed in the bedroom. This brings up the operating screen for when running 1300 in FIG. 13 (C2201).

Next, the user selects the set temperature changing button 1106 so as to raise the set temperature by 1° C., which brings up the operating screen for when running 1300 in FIG. 21 (C2202). Having raised the set temperature by 1° C. has caused the amount of time necessary for the room temperature to reach the set temperature in the powerful mode is now 5 minutes or more faster than in the normal mode, so the color of the powerful mode running button 1112 is changed from the gray color to the white color, the same as with the normal mode running button 1111.

Figure 23:
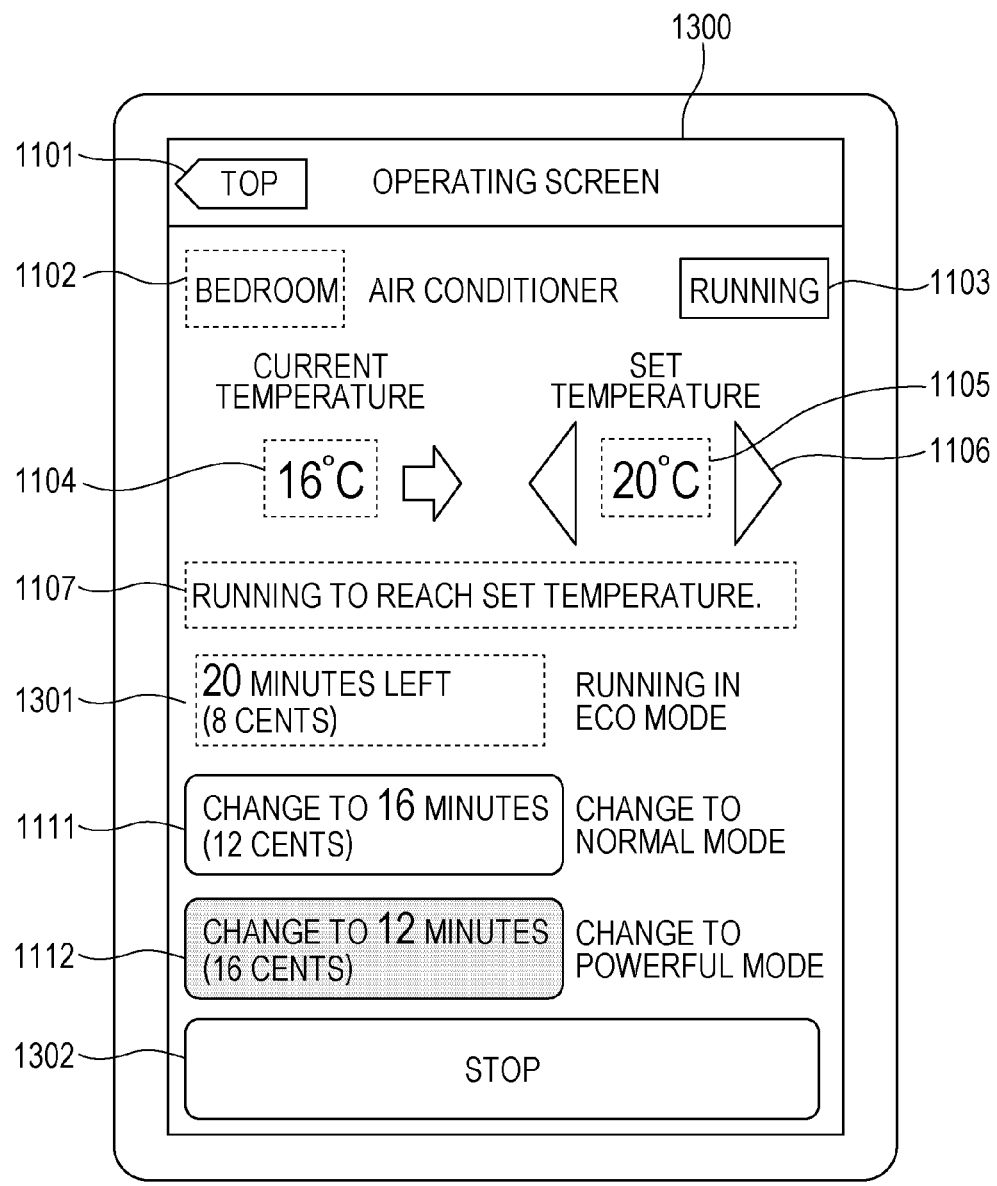
FIG. 23 is another example of an operating screen for when running.

FIG. 23 is another example of the operating screen for when running 1300. The operating screen for when running 1300 in FIG. 23 is typically displayed in a case where the user has selected the eco mode running button 1110 in the operating screen for when running 1300 in FIG. 13. A feature of the operating screen for when running 1300 in FIG. 23 as compared to the operating screen for when running 1300 in FIG. 13 is that the air conditioning cost display region 1301 is hidden and the normal mode running button 1111 is displayed in the same region, and that the eco mode running button 1110 is hidden and the air conditioning cost display region 1301 is displayed in the same region. Components in FIG. 23 which are denoted with the same reference numerals as components in FIG. 13 are the same, so description will be omitted here.

Figure 24:
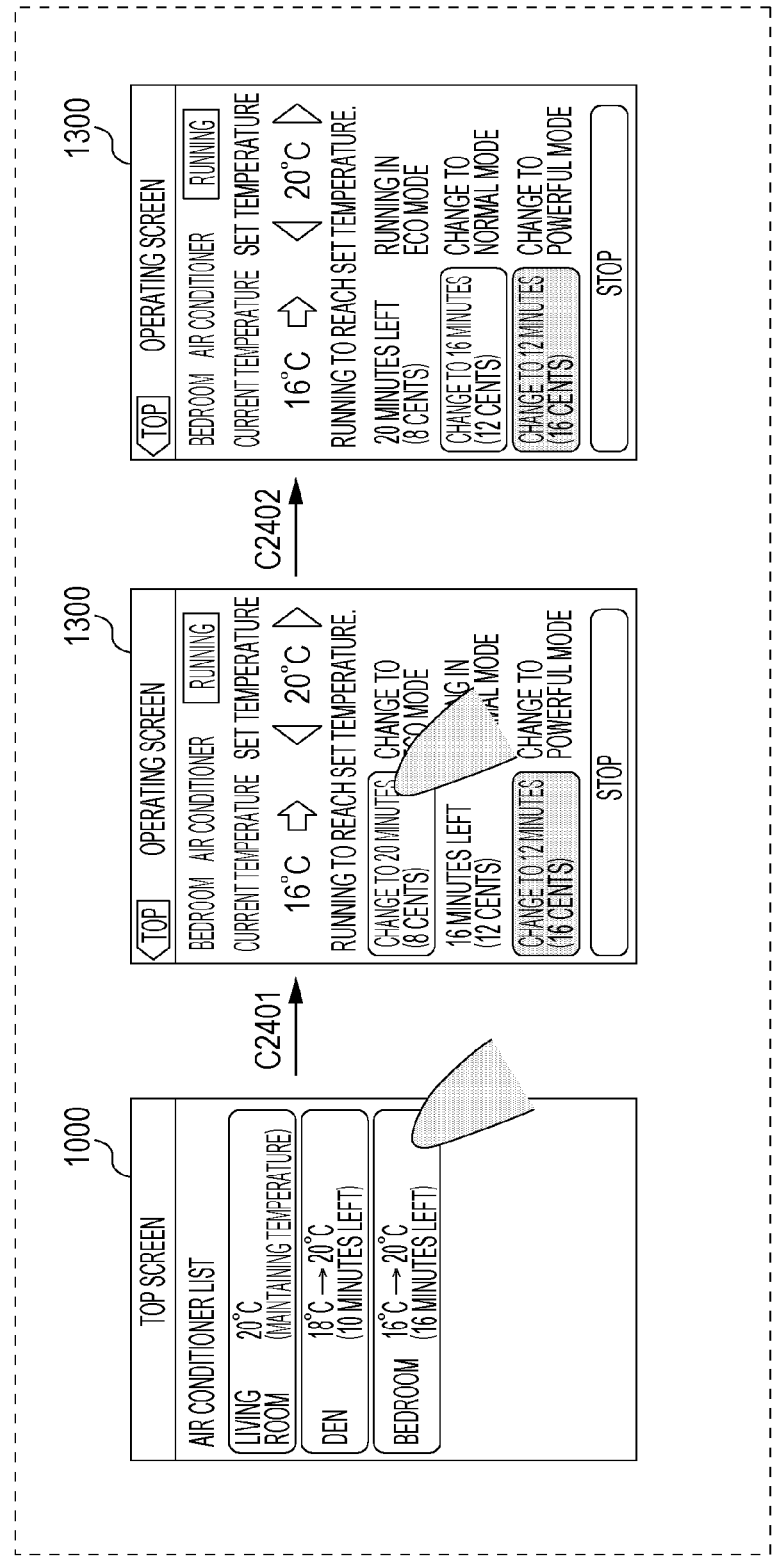
FIG. 24 is a diagram illustrating an example of a screen flow for changing an operating mode of a running air conditioner.

FIG. 24 is a diagram illustrating an example of a screen flow for changing the operating mode of a running air conditioner 200. FIG. 24 will be described below with reference to FIGS. 13, 14, and 23.

First, at the top screen 1000 illustrated in FIG. 14, the user selects the device selection button 1001 that corresponds to the air conditioner 200 installed in the bedroom. This brings up the operating screen for when running 1300 in FIG. 13 (C2401).

Next, the eco mode running button 1110 is selected at the operating screen for when running 1300 in FIG. 13, which brings up the operating screen for when running 1300 in FIG. 23 (C2402).

Figure 25:
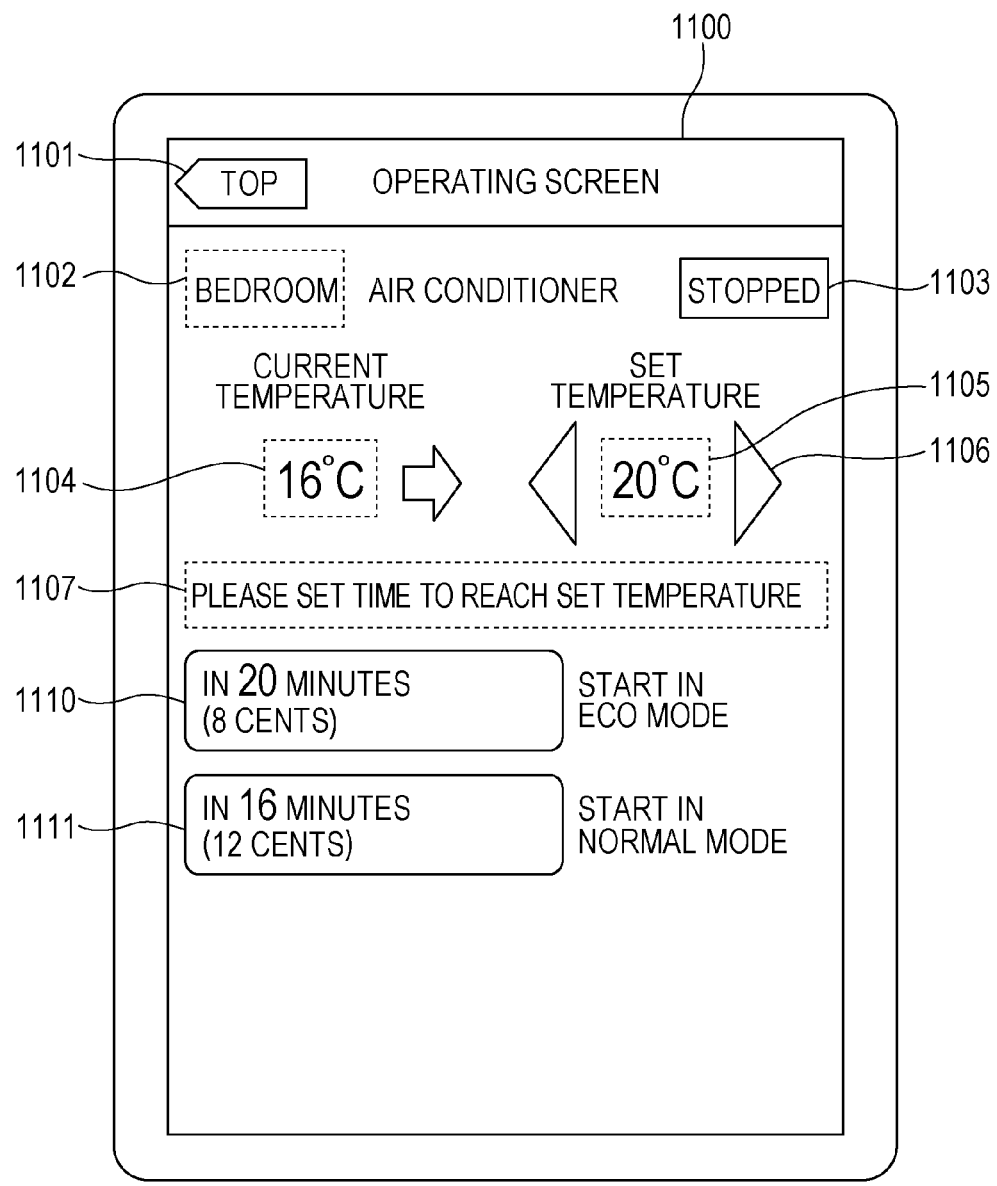
FIG. 25 is a diagram illustrating another example of the operating screen in FIG. 12.

FIG. 25 is a different example of the operating screen for when stopped 1100 in FIG. 12. A feature of the operating screen for when stopped 1100 in FIG. 25 as compared to the operating screen for when stopped 1100 in FIG. 12 is that the powerful mode running button 1112 is hidden instead of being displayed in gray. Components in FIG. 25 which are denoted with the same reference numerals as components in FIG. 12 are the same, so description will be omitted here.

In the arrangement illustrated in FIG. 25, the powerful mode running button 1112 is hidden when the advantage of the time for the room temperature to reach the set temperature being reduced by the user selecting the powerful mode is small. Thus, the user can be prevented from selecting the powerful mode.

While an arrangement is illustrated in the example in FIG. 25 where the powerful mode running button 1112 has simply been hidden, the normal mode running button 1111 may be increased in size to cover the area that was covered by the powerful mode running button 1112 as well. In this case, the user can be effectively notified that the normal mode is being recommended instead of the powerful mode with little advantage, since the normal mode running button 1111 also covers the area that was covered by the powerful mode running button 1112.

Figure 26:
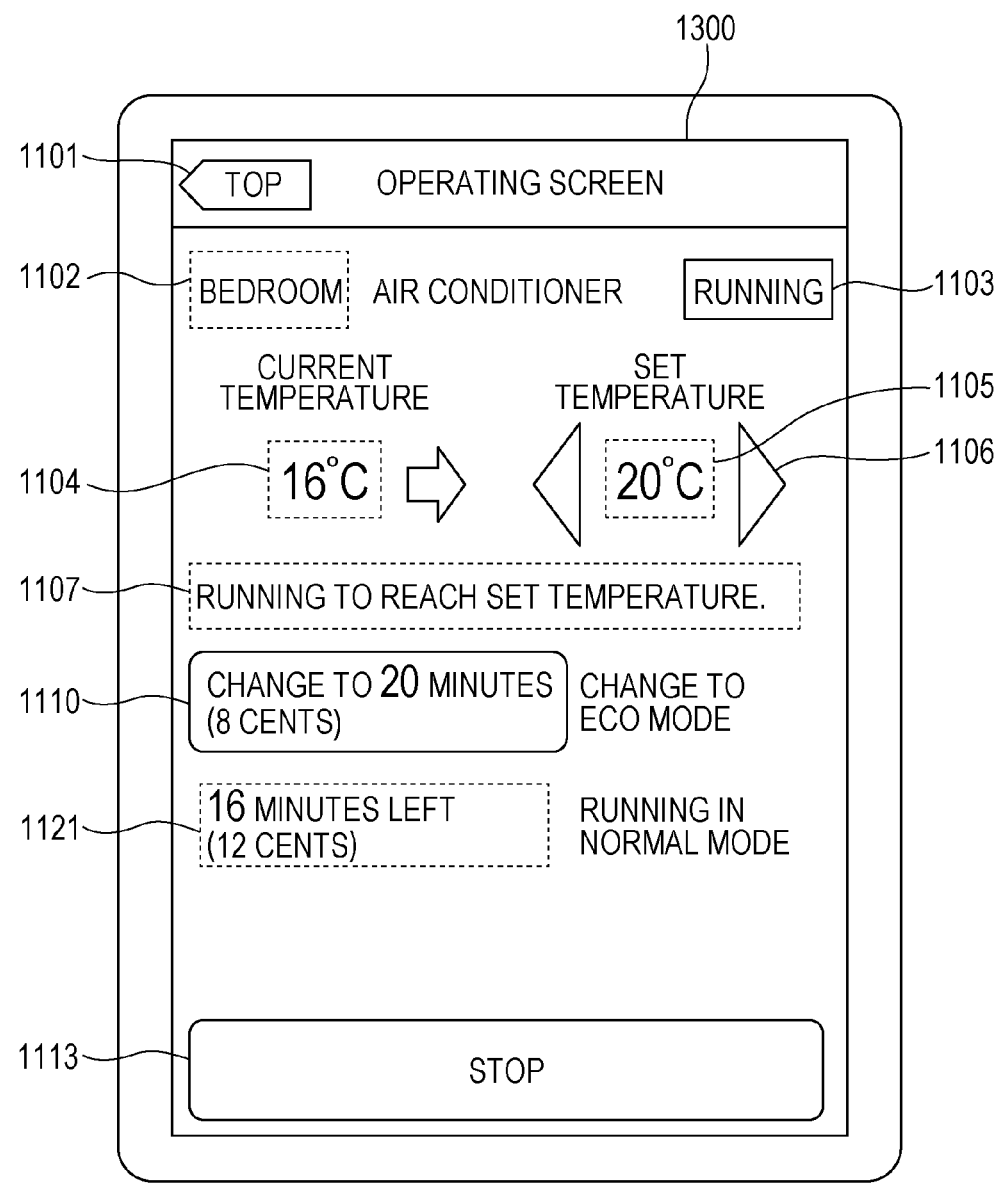
FIG. 26 is a diagram illustrating another example of the operating screen in FIG. 13.

FIG. 26 is a different example of the operating screen for when running 1300 in FIG. 13. A feature of the operating screen for when running 1300 in FIG. 26 as compared to the operating screen for when running 1300 in FIG. 13 is that the powerful mode running button 1112 is hidden instead of being displayed in gray. Components in FIG. 26 which are denoted with the same reference numerals as components in FIG. 13 are the same, so description will be omitted here.

In the arrangement illustrated in FIG. 26, the powerful mode running button 1112 is hidden when the advantage of the time for the room temperature to reach the set temperature being reduced by the user selecting the powerful mode is small. Thus, the user can be prevented from selecting the powerful mode.

Figure 27:
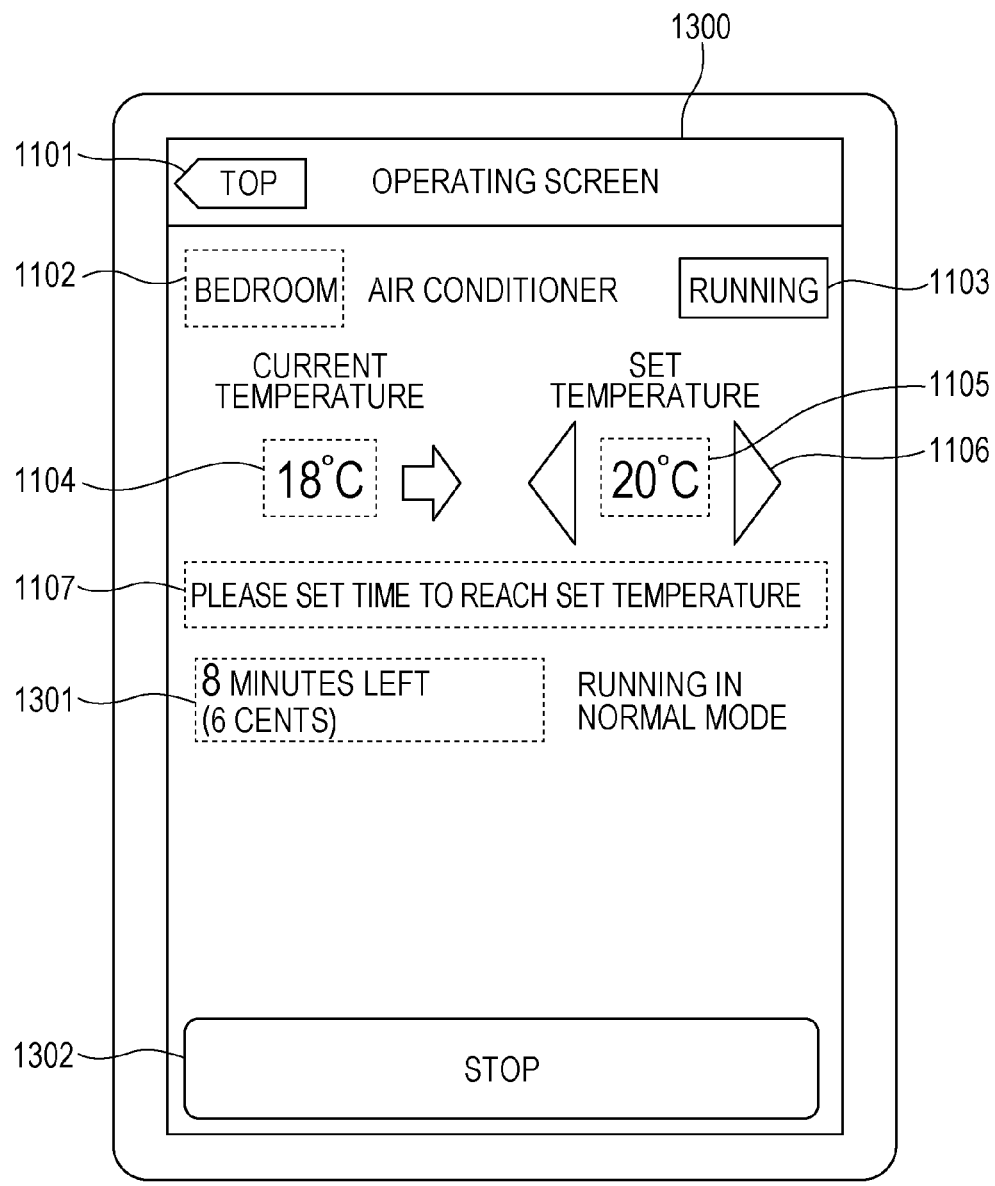
FIG. 27 is a diagram illustrating another example of the operating screen in FIG. 17.

FIG. 27 is a different example of the operating screen for when running 1300 in FIG. 17. A feature of the operating screen for when running 1300 in FIG. 27 as compared to the operating screen for when running 1300 in FIG. 17 is that the eco mode running button 1110 is hidden instead of being displayed in gray, and the powerful mode running button 1112 is hidden instead of being displayed in gray. Components in FIG. 27 which are denoted with the same reference numerals as components in FIG. 17 are the same, so description will be omitted here.

In the arrangement illustrated in FIG. 27, the eco mode running button 1110 is hidden when the advantage of the electricity charges for the room temperature to reach the set temperature being reduced by the user selecting the eco mode is small. Thus, the user can be prevented from selecting the eco mode. Also, the powerful mode running button 1112 is hidden when the advantage of the time for the room temperature to reach the set temperature being reduced by the user selecting the powerful mode is small. Thus, the user can be prevented from selecting the powerful mode.

While the example illustrated in FIG. 27 shows the components situated beneath the hidden button being shifted upwards in the layout, the components may be displayed at their original positions. In this case, the positions of the eco mode, normal mode, and powerful mode operating buttons are fixed, thus reducing the risk that the user may select a button other than the intended button.

Figure 28:
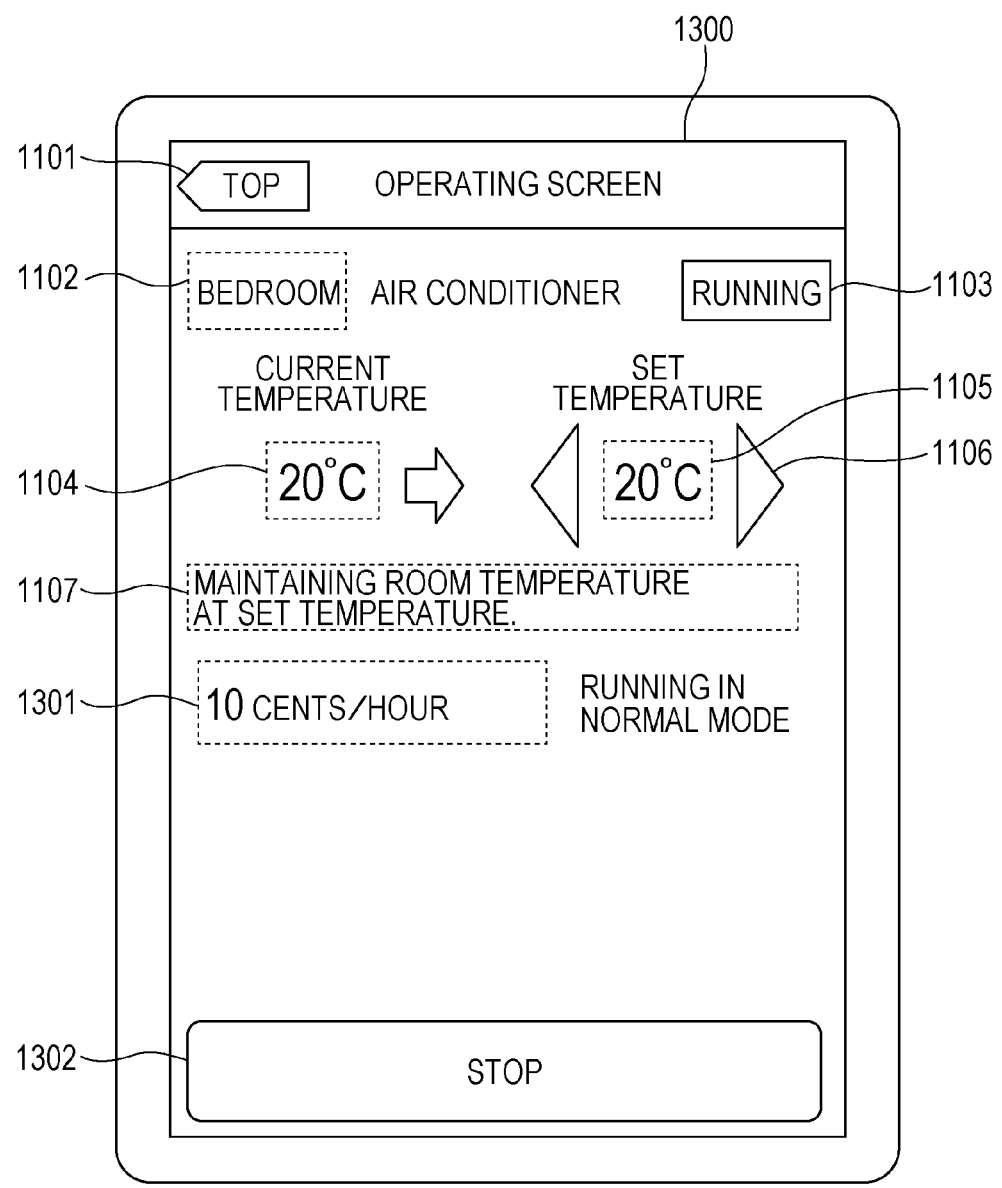
FIG. 28 is a diagram illustrating another example of the operating screen in FIG. 18.

FIG. 28 is a different example of the operating screen for when running 1300 in FIG. 18. A feature of the operating screen for when running 1300 in FIG. 28 as compared to the operating screen for when running 1300 in FIG. 18 is that the eco mode running button 1110 is hidden instead of being displayed in gray, and the powerful mode running button 1112 is hidden instead of being displayed in gray. Components in FIG. 28 which are denoted with the same reference numerals as components in FIG. 18 are the same, so description will be omitted here.

In the arrangement illustrated in FIG. 28, the eco mode running button 1110 is hidden when the advantage of the electricity charges for the room temperature to reach the set temperature being reduced by the user selecting the eco mode is small. Thus, the user can be prevented from selecting the eco mode. Also, the powerful mode running button 1112 is hidden when the advantage of the time for the room temperature to reach the set temperature being reduced by the user selecting the powerful mode is small. Thus, the user can be prevented from selecting the powerful mode.

While the example illustrated in FIG. 28 shows the components situated beneath the hidden button being shifted upwards in the layout, the components may be displayed at their original positions. In this case, the positions of the eco mode, normal mode, and powerful mode operating buttons are fixed, thus reducing the risk that the user may select a button other than the intended button.

Figure 29:
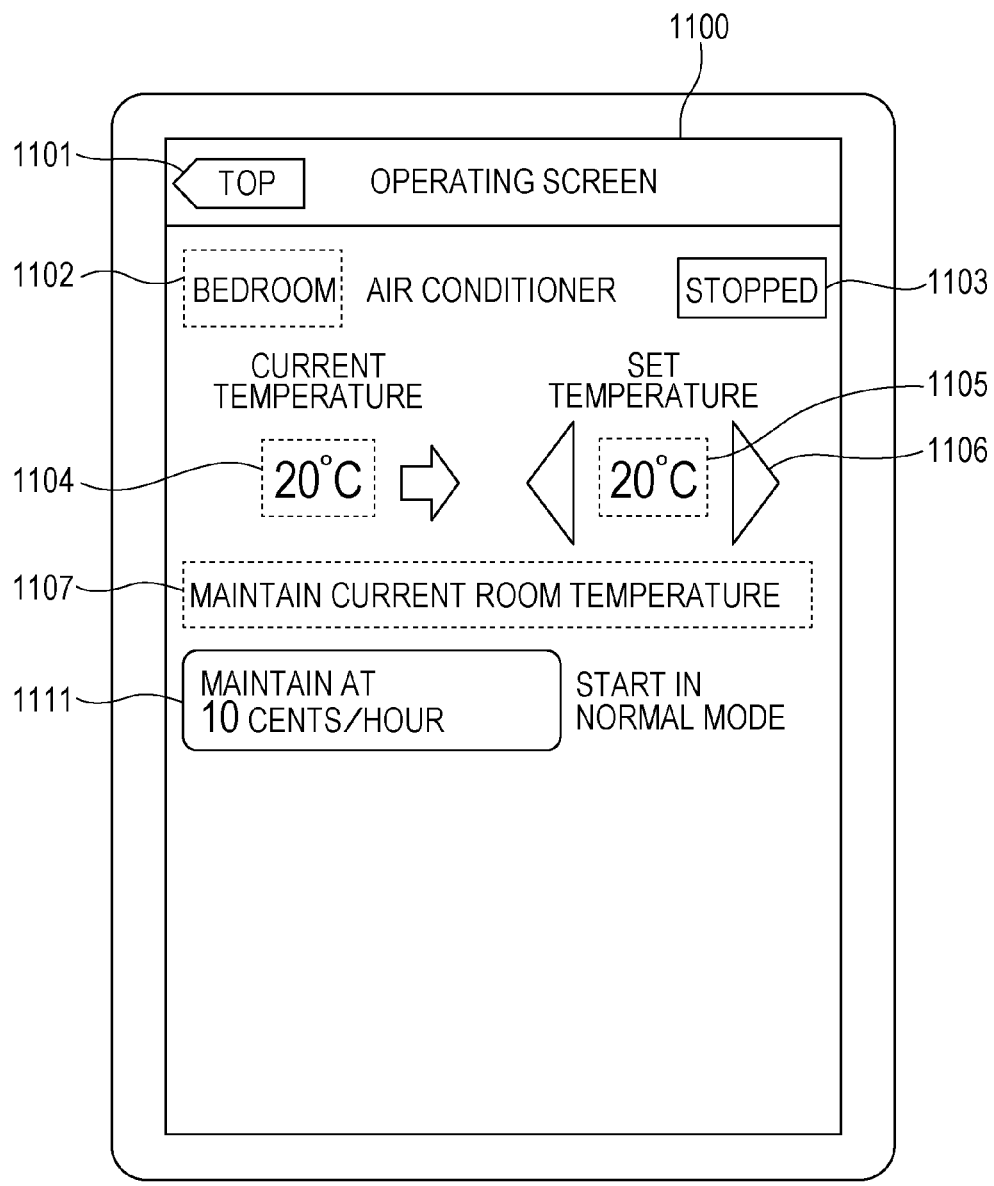
FIG. 29 is a diagram illustrating another example of the operating screen in FIG. 19.

FIG. 29 is a different example of the operating screen for when stopped 1100 in FIG. 19. A feature of the operating screen for when stopped 1100 in FIG. 29 as compared to the operating screen for when stopped 1100 in FIG. 19 is that the eco mode running button 1110 is hidden instead of being displayed in gray, and the powerful mode running button 1112 is hidden instead of being displayed in gray. Components in FIG. 29 which are denoted with the same reference numerals as components in FIG. 19 are the same, so description will be omitted here.

In the arrangement illustrated in FIG. 29, the eco mode running button 1110 is hidden when the advantage of the electricity charges for the room temperature to reach the set temperature being reduced by the user selecting the eco mode is small. Thus, the user can be prevented from selecting the eco mode. Also, the powerful mode running button 1112 is hidden when the advantage of the time for the room temperature to reach the set temperature being reduced by the user selecting the powerful mode is small. Thus, the user can be prevented from selecting the powerful mode.

While the example illustrated in FIG. 29 shows the components situated beneath the hidden button being shifted upwards in the layout, the components may be displayed at their original positions. In this case, the positions of the eco mode, normal mode, and powerful mode operating buttons are fixed, thus reducing the risk that the user may select a button other than the intended button.

While an arrangement is illustrated in the example in FIG. 29 where the eco mode running button 1110 has simply been hidden, the normal mode running button 1111 may be increased in size to cover the area that was covered by the eco mode running button 1110 as well. In this case, the user can be effectively notified that the normal mode is being recommended instead of the eco mode with little advantage, since the normal mode running button 1111 also covers the area that was covered by the eco mode running button 1110.

Further, while an arrangement is illustrated in the example in FIG. 29 where the powerful mode running button 1112 has simply been hidden, the normal mode running button 1111 may be increased in size to cover the area that was covered by the powerful mode running button 1112 as well. In this case, the user can be effectively notified that the normal mode is being recommended instead of the powerful mode with little advantage, since the normal mode running button 1111 also covers the area that was covered by the powerful mode running button 1112.

Figure 30:
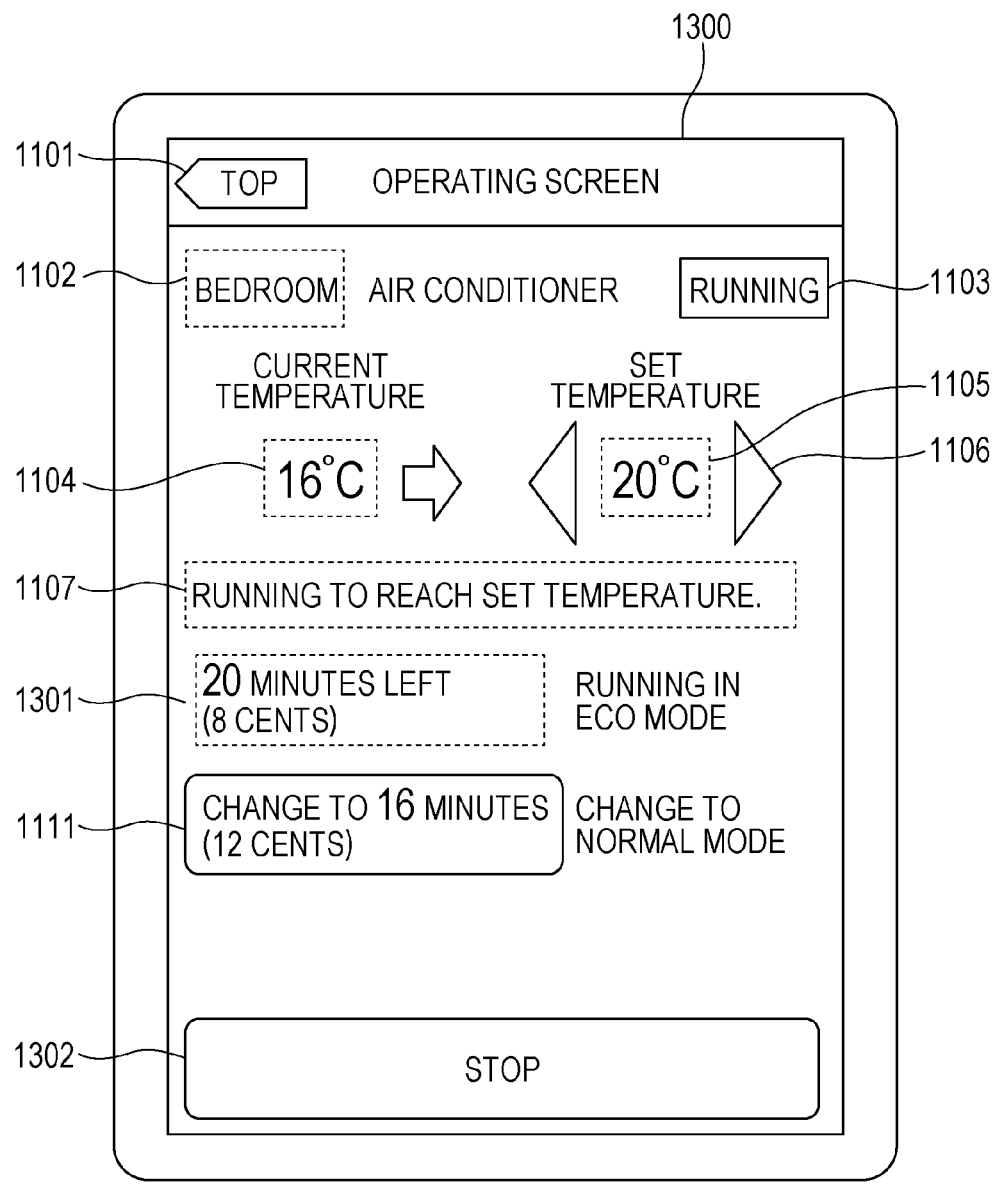
FIG. 30 is a diagram illustrating another example of the operating screen in FIG. 23.

FIG. 30 is a different example of the operating screen for when running 1300 in FIG. 23. A feature of the operating screen for when running 1300 in FIG. 30 as compared to the operating screen for when running 1300 in FIG. 23 is that the powerful mode running button 1112 is hidden instead of being displayed in gray. Components in FIG. 30 which are denoted with the same reference numerals as components in FIG. 23 are the same, so description will be omitted here.

In the arrangement illustrated in FIG. 30, the powerful mode running button 1112 is hidden when the advantage of the time for the room temperature to reach the set temperature being reduced by the user selecting the powerful mode is small. Thus, the user can be prevented from selecting the powerful mode.

While an arrangement is illustrated in the example in FIG. 30 where the powerful mode running button 1112 has simply been hidden, the normal mode running button 1111 may be increased in size to cover the area that was covered by the powerful mode running button 1112 as well. In this case, the user can be effectively notified that the normal mode is being recommended instead of the powerful mode with little advantage, since the normal mode running button 1111 also covers the area that was covered by the powerful mode running button 1112.

Figure 31:
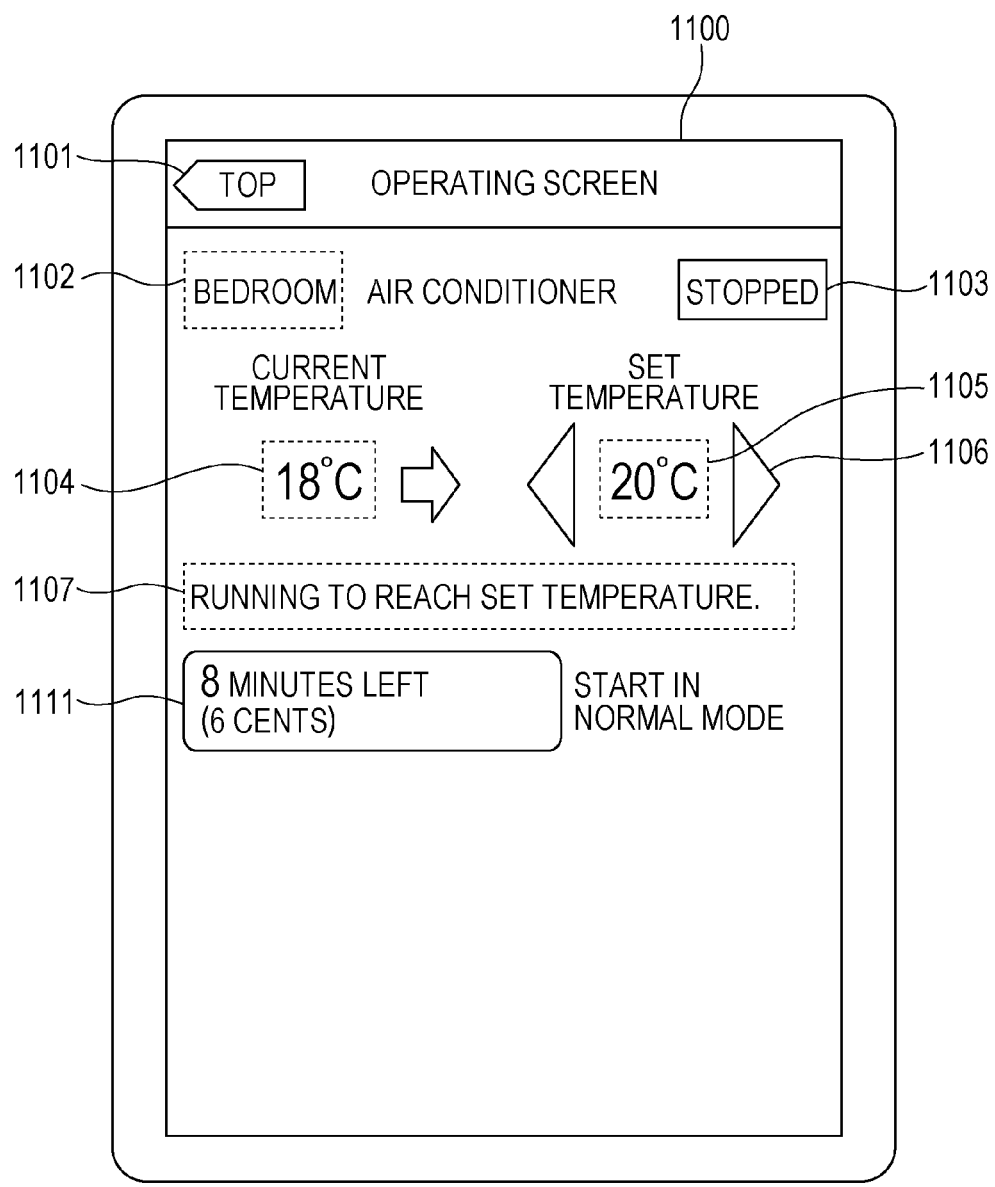
FIG. 31 is a diagram illustrating another example of the operating screen for when stopped.

FIG. 31 is another example of the operating screen for when stopped 1100. A feature of the operating screen for when stopped 1100 in FIG. 31 as compared to the operating screen for when stopped 1100 in FIG. 11 is that the eco mode running button 1110 is hidden, and the powerful mode running button 1112 is hidden. Components in FIG. 31 which are denoted with the same reference numerals as components in FIG. 11 are the same, so description will be omitted here.

The operating screen for when stopped 1100 in FIG. 31 shows a state where time has elapsed from the operating screen for when stopped 1100 in FIG. 11 and the room temperature has risen by 2° C. More specifically, the operating screen for when stopped 1100 in FIG. 31 shows that the room temperature has risen from 16° C. to 18° C., and the electricity charges for the room temperature to reach the set temperature have changed from 15 cents to 6 cents in the normal mode, and from 10 cents to 4 cents in the eco mode. In this case, the difference in electricity charges between the eco mode and the normal mode has fallen below 3 cents, so the eco mode running button 1110 has been hidden.

Further, the operating screen for when stopped 1100 in FIG. 31 shows that the time for the room temperature to reach the set temperature has changed from 20 minutes to 8 minutes in the normal mode, and from 15 minutes to 6 minutes in the powerful mode. In this case, the difference in time between the powerful mode and the normal mode has fallen below 5 minutes, so the powerful mode running button 1112 has been hidden.

In the arrangement illustrated in FIG. 31, the eco mode running button 1110 is hidden when the advantage of the electricity charges for the room temperature to reach the set temperature being reduced by the user selecting the eco mode is small. Thus, the user can be prevented from selecting the eco mode. Also, the powerful mode running button 1112 is hidden when the advantage of the time for the room temperature to reach the set temperature being reduced by the user selecting the powerful mode is small. Thus, the user can be prevented from selecting the powerful mode.

While the example illustrated in FIG. 31 shows the components situated beneath the hidden button being shifted upwards in the layout, the components may be displayed at their original positions. In this case, the positions of the eco mode, normal mode, and powerful mode operating buttons are fixed, thus reducing the risk that the user may select a button other than the intended button.

While an arrangement is illustrated in the example in FIG. 31 where the eco mode running button 1110 has simply been hidden, the normal mode running button 1111 may be increased in size to cover the area that was covered by the eco mode running button 1110 as well. In this case, the user can be effectively notified that the normal mode is being recommended instead of the eco mode with little advantage, since the normal mode running button 1111 also covers the area that was covered by the eco mode running button 1110.

Further, while an arrangement is illustrated in the example in FIG. 31 where the powerful mode running button 1112 has simply been hidden, the normal mode running button 1111 may be increased in size to cover the area that was covered by the powerful mode running button 1112 as well. In this case, the user can be effectively notified that the normal mode is being recommended instead of the powerful mode with little advantage, since the normal mode running button 1111 also covers the area that was covered by the powerful mode running button 1112.

Figure 32:
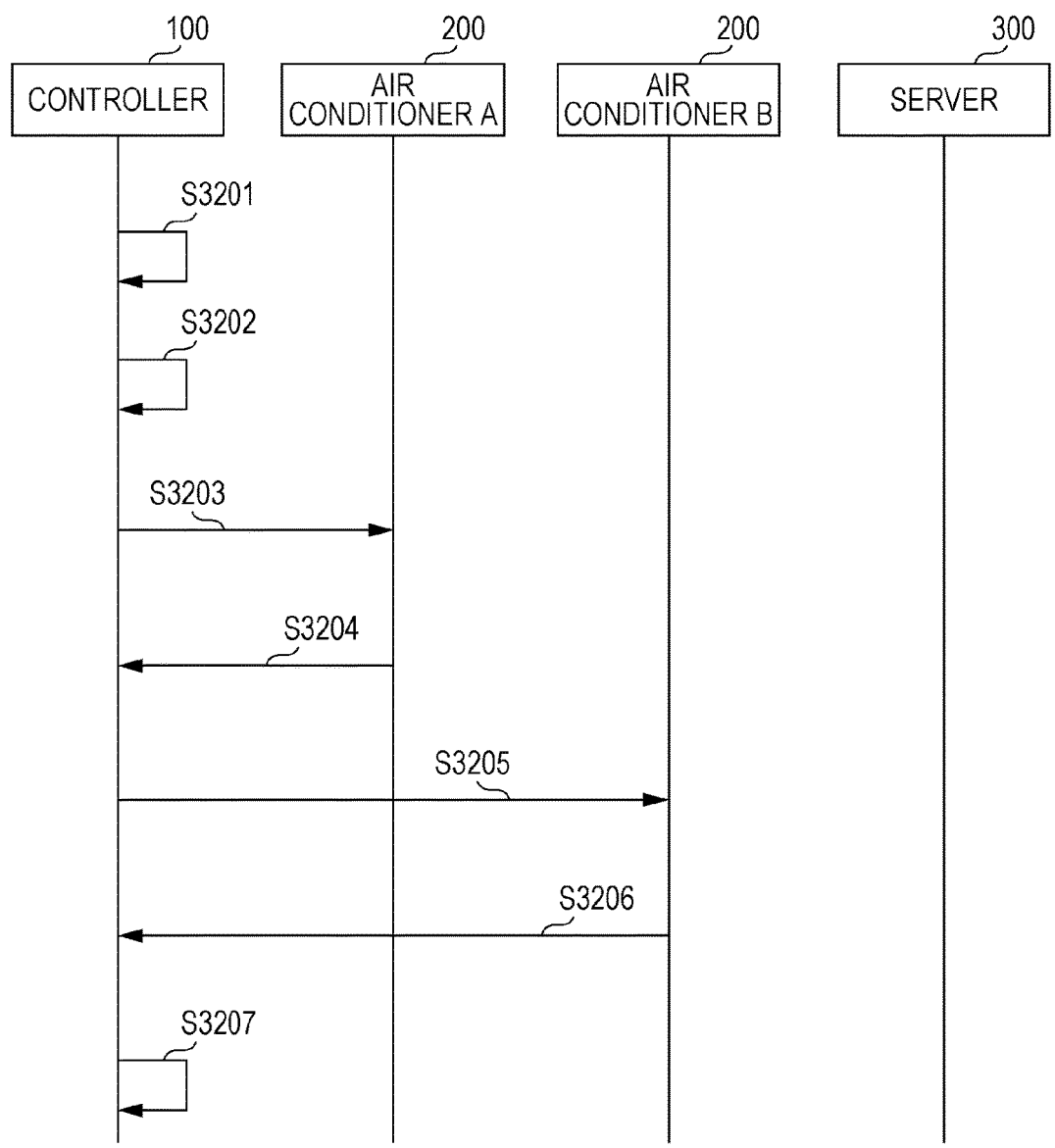
FIG. 32 is a sequence diagram illustrating a first example of top screen display processing in the air conditioning control system.

FIG. 32 is a sequence diagram illustrating a first example of top screen display processing in the air conditioning control system. The device table 500 in the present example is managed at the storage 104 of the controller 100. The controller 100 and the air conditioners 200 communicate directly. This communication is performed via the communication controller 107 and the communication controller 207.

First, the controller 100 activates an app (S3201).

Next, the controller 100 reads out the device table 500 from the storage 104 (S3202). The device table 500 is a list of air conditioners 200 which the controller 100 is capable of operating. Description will be made here under an assumption that an air conditioner 200A and an air conditioner 200B can be operated.

The controller 100 then transmits a device state acquisition request to the air conditioner 200A (S3203). The air conditioner 200A updates the device state table 600 stored in the storage 204 by the state manager 202, and transmits the updated device state table 600 to the controller 100 (S3204).

Next, the controller 100 transmits a device state acquisition request to the air conditioner 200B (S3205). The air conditioner 200B updates the device state table 600 stored in the storage 204 by the state manager 202, and transmits the updated device state table 600 to the controller 100 (S3206).

The controller 100 then configures and displays a top screen 1000 using the acquired device table 500 and device state tables 600 (S3207).

Note that the order of S3204 and S3205 may be reversed. This arrangement allows communication between the controller 100 and multiple air conditioners 200 to be performed in parallel, so the processing time of the overall sequence can be reduced.

Figure 33:
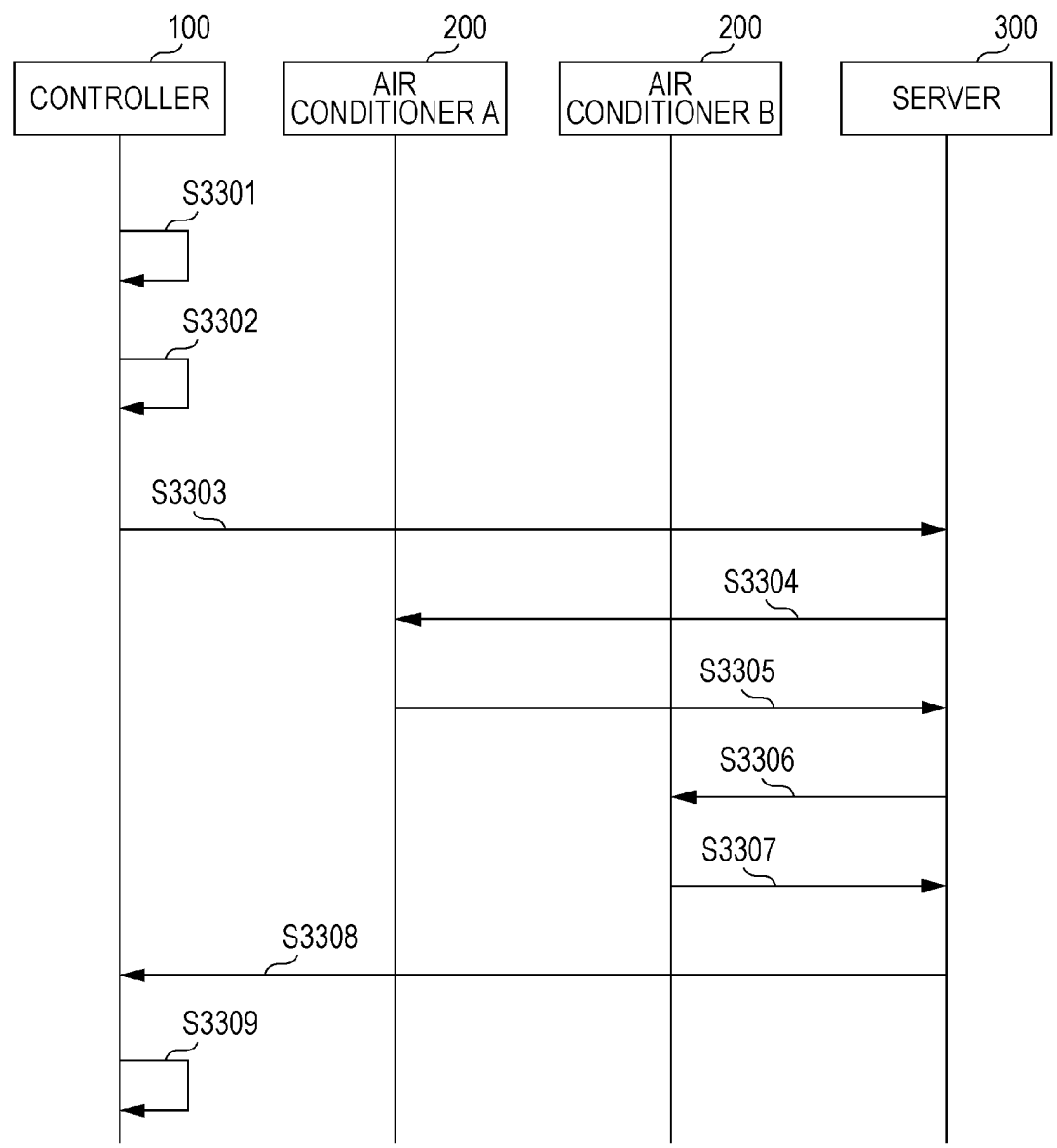
FIG. 33 is a sequence diagram illustrating a second example of top screen display processing in the air conditioning control system.

FIG. 33 is a sequence diagram illustrating a second example of top screen display processing in the air conditioning control system. The device table 500 in the present example is managed at the storage 104 of the controller 100. The controller 100 and the air conditioners 200 communicate via the server 300. This communication is performed via the communication controller 107, the communication controller 207, and the communication controller 307.

First, the controller 100 activates an app (S3301).

Next, the controller 100 reads out the device table 500 from the storage 104 (S3302). The device table 500 is a list of air conditioners 200 which the controller 100 is capable of operating. Description will be made here under an assumption that an air conditioner 200A and an air conditioner 200B can be operated.

The controller 100 then transmits a device state acquisition request to the server 300 regarding the air conditioner 200A and air conditioner 200B (S3303).

The server 300 transmits a device state acquisition request to the air conditioner 200A (S3304). The air conditioner 200A updates the device state table 600 stored in the storage 204 by the state manager 202, and transmits the updated device state table 600 to the server 300 (S3305).

The server 300 further transmits a device state acquisition request to the air conditioner 200B (S3306). The air conditioner 200B updates the device state table 600 stored in the storage 204 by the state manager 202, and transmits the updated device state table 600 to the server 300 (S3307).

The server 300 then combines the device state table 600 acquired from the air conditioner 200A and the device state table 600 acquired from the air conditioner 200B into a device state table 600, and transmits this device state table 600 to the controller 100 (S3308).

The controller 100 configures and displays a top screen 1000 using the acquired device table 500 and device state table 600 (S3309).

Note that the order of S3305 and S3306 may be reversed. This arrangement allows communication between the server 300 and multiple air conditioners 200 to be performed in parallel, so the processing time of the overall sequence can be reduced.

Figure 34:
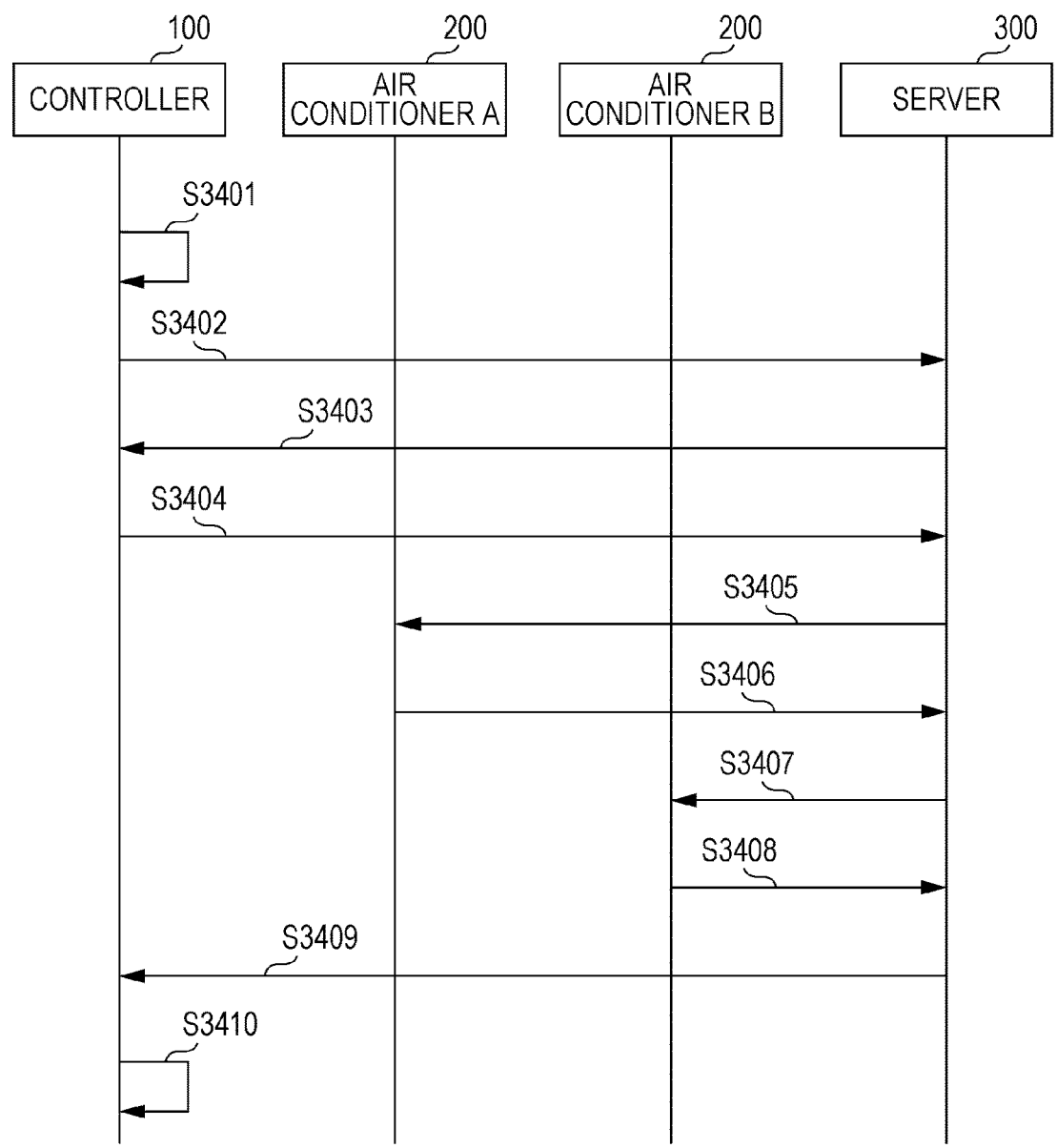
FIG. 34 is a sequence diagram illustrating a third example of top screen display processing in the air conditioning control system.

FIG. 34 is a sequence diagram illustrating a third example of top screen display processing in the air conditioning control system. The device table 500 in the present example is managed at the storage 304 of the server 300. The controller 100 and the air conditioners 200 communicate via the server 300. This communication is performed via the communication controller 107, the communication controller 207, and the communication controller 307.

First, the controller 100 activates an app (S3401).

Next, the controller 100 transmits a device list acquisition request to the server 300 (S3402). The server 300 reads out the device table 500 from the storage 304 and transmits it to the controller 100 (S3403). The device table 500 is a list of air conditioners 200 which the controller 100 is capable of operating. Description will be made here under an assumption that an air conditioner 200A and an air conditioner 200B can be operated.

The controller 100 then transmits a device state acquisition request to the server 300 regarding the air conditioner 200A and air conditioner 200B (S3404).

The server 300 transmits a device state acquisition request to the air conditioner 200A (S3405). The air conditioner 200A updates the device state table 600 stored in the storage 204 by the state manager 202, and transmits the updated device state table 600 to the server 300 (S3406).

The server 300 further transmits a device state acquisition request to the air conditioner 200B (S3407). The air conditioner 200B updates the device state table 600 stored in the storage 204 by the state manager 202, and transmits the updated device state table 600 to the server 300 (S3408).

The server 300 then combines the device state table 600 acquired from the air conditioner 200A and the device state table 600 acquired from the air conditioner 200B into a device state table 600, and transmits this device state table 600 to the controller 100 (S3409).

The controller 100 configures and displays a top screen 1000 using the acquired device table 500 and device state table 600 (S3410).

Note that the order of S3406 and S3407 may be reversed. This arrangement allows communication between the server 300 and multiple air conditioners 200 to be performed in parallel, so the processing time of the overall sequence can be reduced.

Figure 35:
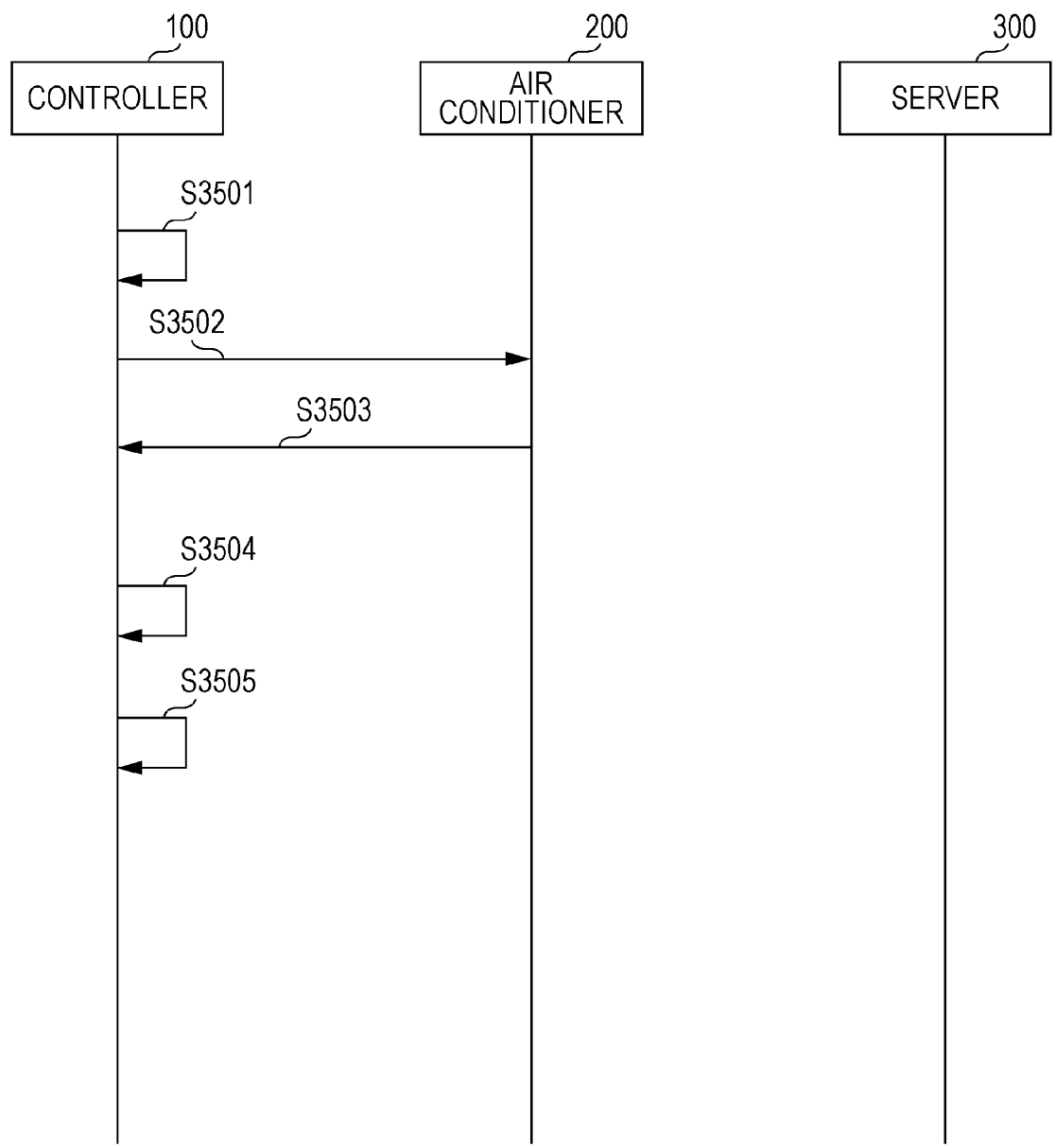
FIG. 35 is a sequence diagram illustrating a first example of operating screen display processing in the air conditioning control system.

FIG. 35 is a sequence diagram illustrating a first example of operating screen display processing in the air conditioning control system. The air conditioning cost in the present example is calculated using the air conditioning cost calculator 108 of the controller 100. The controller 100 and the air conditioner 200 communicate directly. This communication is performed via the communication controller 107 and the communication controller 207. This sequence corresponds to the functional block diagram illustrated in FIG. 2.

First, the controller 100 accepts that the air conditioner 200 has been selected at the top screen 1000 (S3501).

Next, the controller 100 transmits a device state acquisition request to the air conditioner 200 (S3502).

The air conditioner 200 updates the device state table 600 stored in the storage 204 by the state manager 202, and transmits the updated device state table 600 to the controller 100 (S3503).

The controller 100 next acquires the air conditioning cost calculation table 800 from the storage 104, and combines with the device state table 600 to calculate the air conditioning cost (S3504).

Next, the controller 100 uses the device state table 600 and the calculated air conditioning cost to configure and display the operating screen for when stopped 1100 or operating screen for when running 1300 (S3505).

Figure 36:
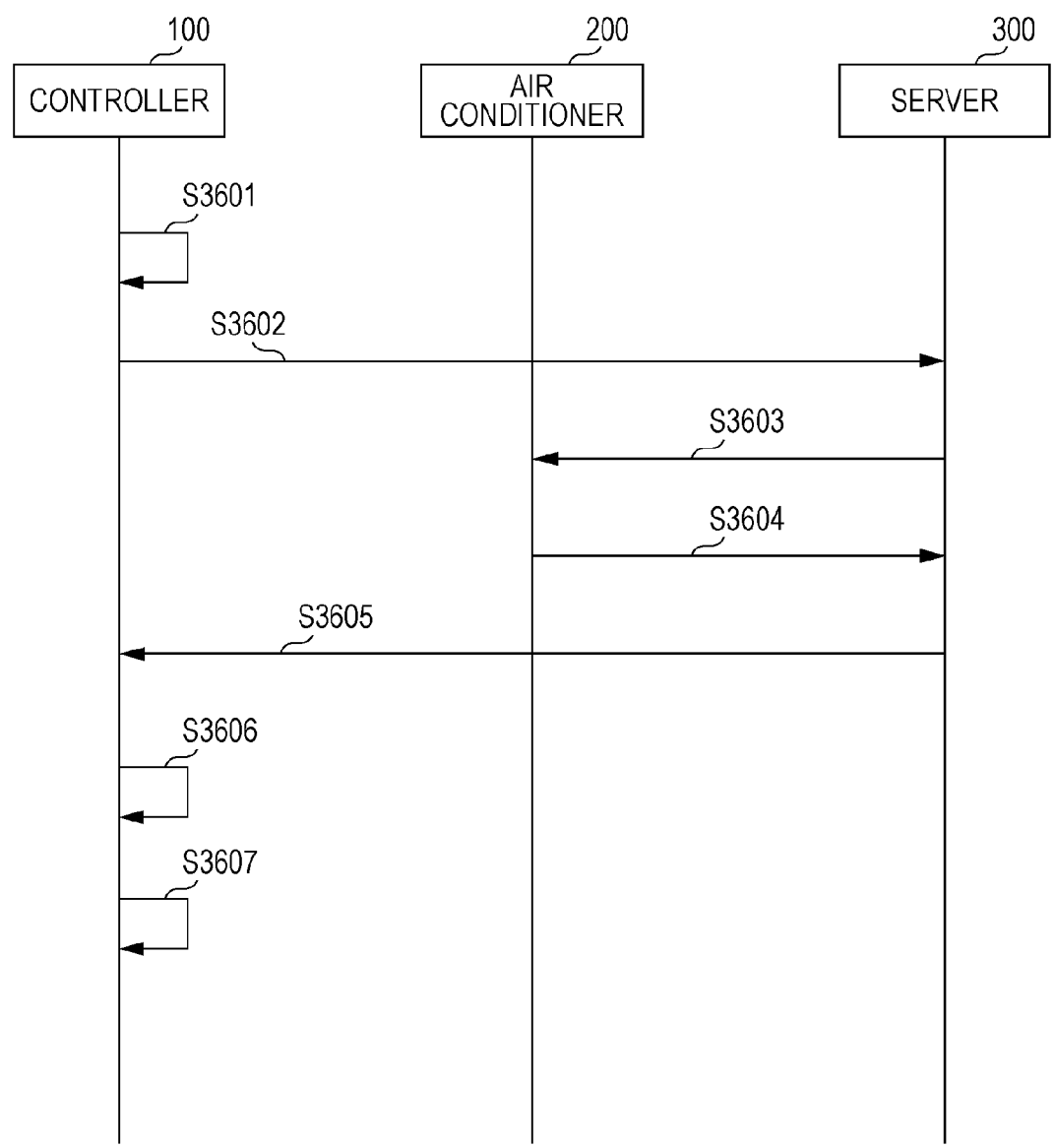
FIG. 36 is a sequence diagram illustrating a second example of operating screen display processing in the air conditioning control system.

FIG. 36 is a sequence diagram illustrating a second example of operating screen display processing in the air conditioning control system. The air conditioning cost in the present example is calculated using the air conditioning cost calculator 108 of the controller 100. The controller 100 and the air conditioner 200 communicate via the server 300. This communication is performed via the communication controller 107, the communication controller 207, and the communication controller 307. This sequence corresponds to the functional block diagram illustrated in FIG. 2.

First, the controller 100 accepts that the air conditioner 200 has been selected at the top screen 1000 (S3601).

Next, the controller 100 transmits a device state acquisition request for the air conditioner 200 to the server 300 (S3602).

Next, the server 300 transmits a device state acquisition request to the air conditioner 200 (S3603).

The air conditioner 200 updates the device state table 600 stored in the storage 204 by the state manager 202, and transmits the updated device state table 600 to the server 300 (S3604).

The server 300 then transmits the device state table 600 acquired from the air conditioner 200 to the controller 100 (S3605).

The controller 100 next acquires the air conditioning cost calculation table 800 from the storage 104, and combines with the device state table 600 to calculate the air conditioning cost (S3606).

Next, the controller 100 uses the device state table 600 and the calculated air conditioning cost to configure and display the operating screen for when stopped 1100 or operating screen for when running 1300 (S3607).

Figure 37:
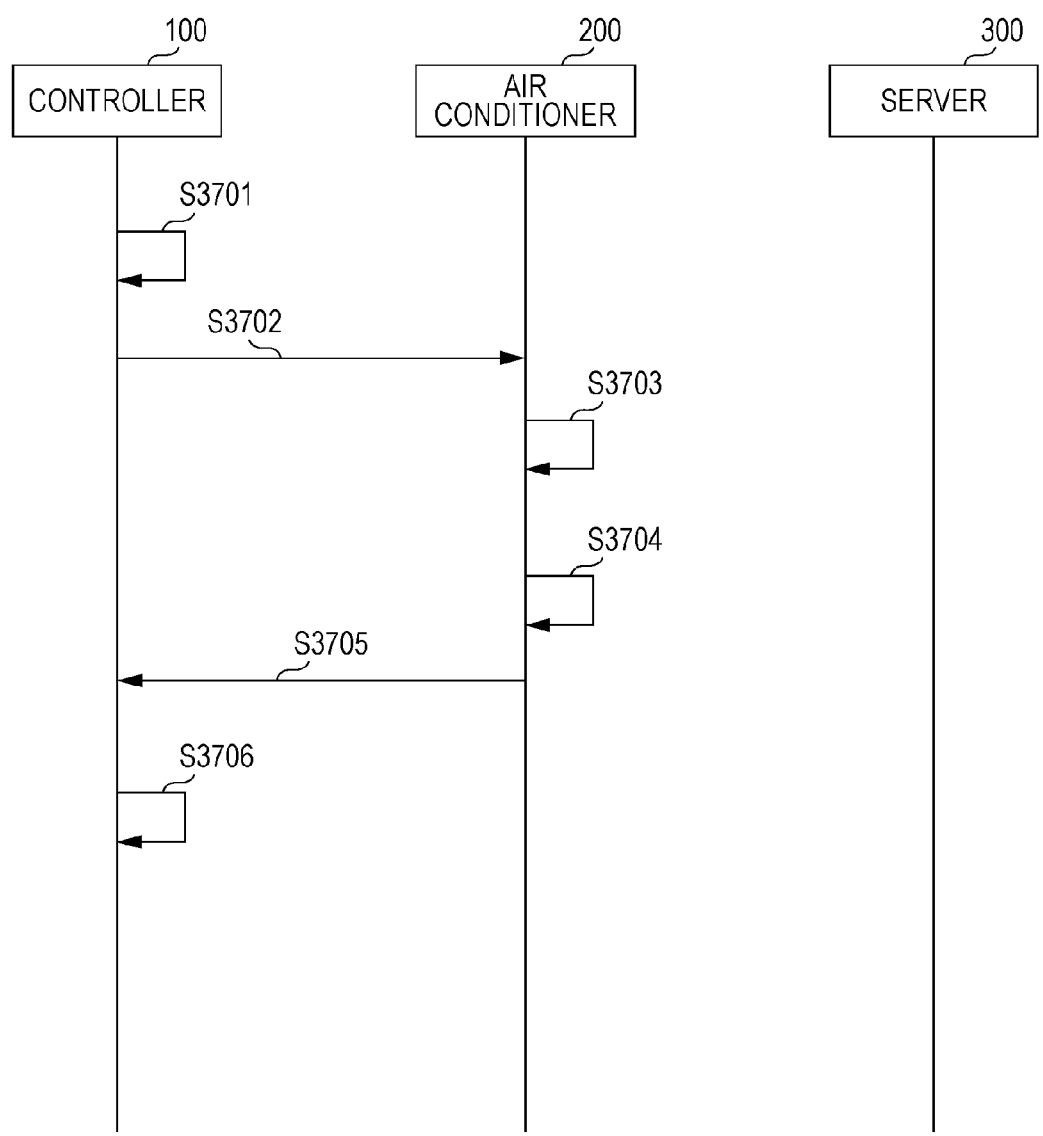
FIG. 37 is a sequence diagram illustrating a third example of operating screen display processing in the air conditioning control system.

FIG. 37 is a sequence diagram illustrating a third example of operating screen display processing in the air conditioning control system. The air conditioning cost in the present example is calculated using the air conditioning cost calculator 208 of the air conditioner 200. The controller 100 and the air conditioner 200 communicate directly. This communication is performed via the communication controller 107 and the communication controller 207. This sequence corresponds to the functional block diagram illustrated in FIG. 3.

First, the controller 100 accepts that the air conditioner 200 has been selected at the top screen 1000 (S3701).

Next, the controller 100 transmits an air conditioning cost calculation request to the air conditioner 200 (S3702).

The air conditioner 200 updates the device state table 600 stored in the storage 204 by the state manager 202 (S3703).

The air conditioner 200 then acquires the air conditioning cost calculation table 800 from the storage 204, and combines with the device state table 600 to calculate the air conditioning cost (S3704).

The air conditioner 200 next transmits the calculated air conditioning cost to the controller 100 (S3705).

Next, the controller 100 acquires the device state table 600 from the storage 104, and uses the device state table 600 and the air conditioning cost to configure and display the operating screen for when stopped 1100 or operating screen for when running 1300 (S3706).

Figure 38:
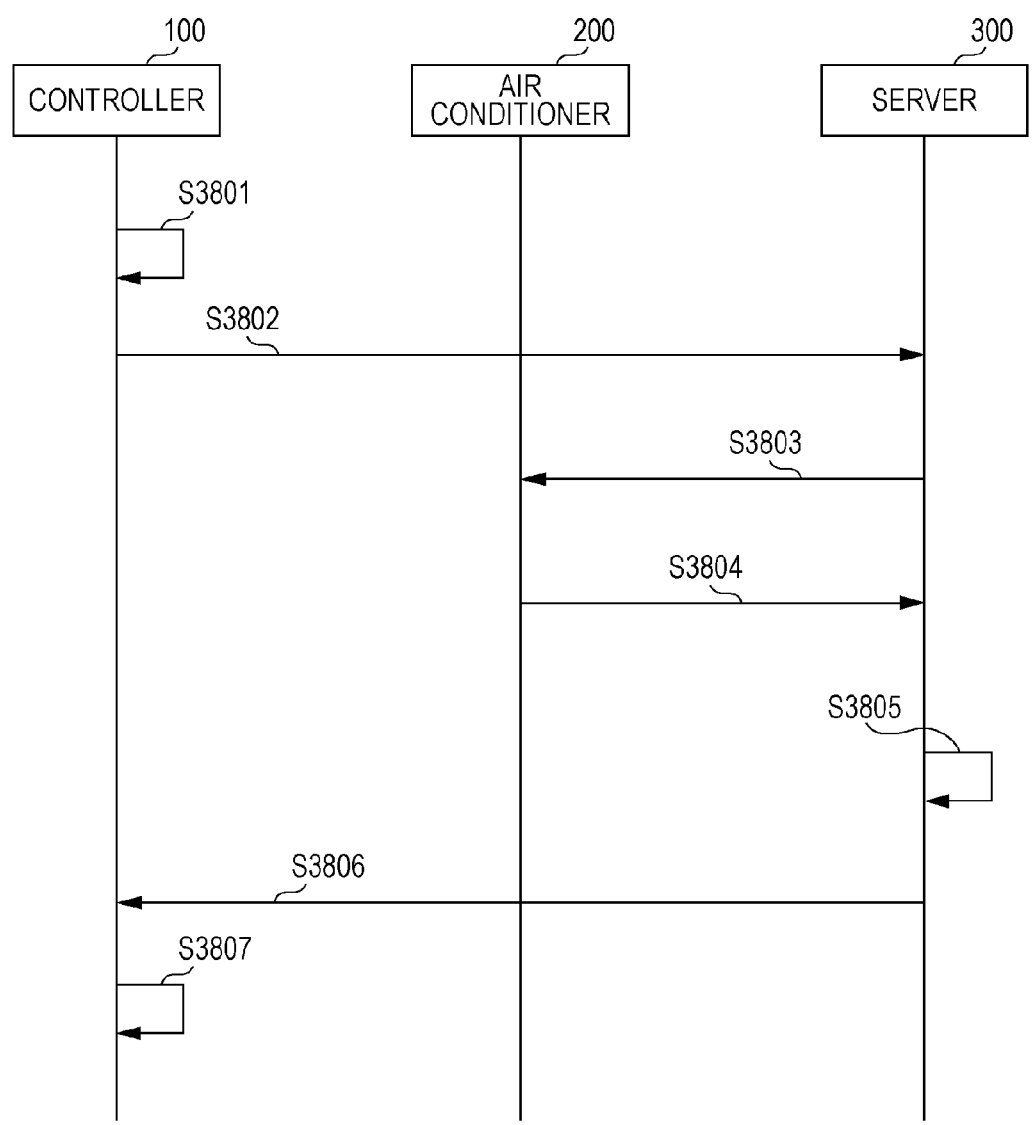
FIG. 38 is a sequence diagram illustrating a fourth example of operating screen display processing in the air conditioning control system.

FIG. 38 is a sequence diagram illustrating a fourth example of operating screen display processing in the air conditioning control system. The air conditioning cost in the present example is calculated using the air conditioning cost calculator 308 of the server 300. The controller 100 and the air conditioner 200 communicate via the server 300. This communication is performed via the communication controller 107, the communication controller 207, and the communication controller 307. This sequence corresponds to the functional block diagram illustrated in FIG. 4.

First, the controller 100 accepts that the air conditioner 200 has been selected at the top screen 1000 (S3801).

Next, the controller 100 transmits an air conditioning cost calculation request to the server 300 (S3802).

Next, the server 300 transmits a device state acquisition request to the air conditioner 200 (S3803).

The air conditioner 200 updates the device state table 600 stored in the storage 204 by the state manager 202, and transmits the updated device state table 600 to the server 300 (S3804).

The server 300 acquires the air conditioning cost calculation table 800 from the storage 304, and combines with the device state table 600 to calculate the air conditioning cost (S3805).

The server 300 then transmits the calculated air conditioning cost to the controller 100 (S3806).

The controller 100 next acquires the device state table 600 from the storage 104, and uses the device state table 600 and the air conditioning cost to configure and display the operating screen for when stopped 1100 or operating screen for when running 1300 (S3807).

Figure 39:
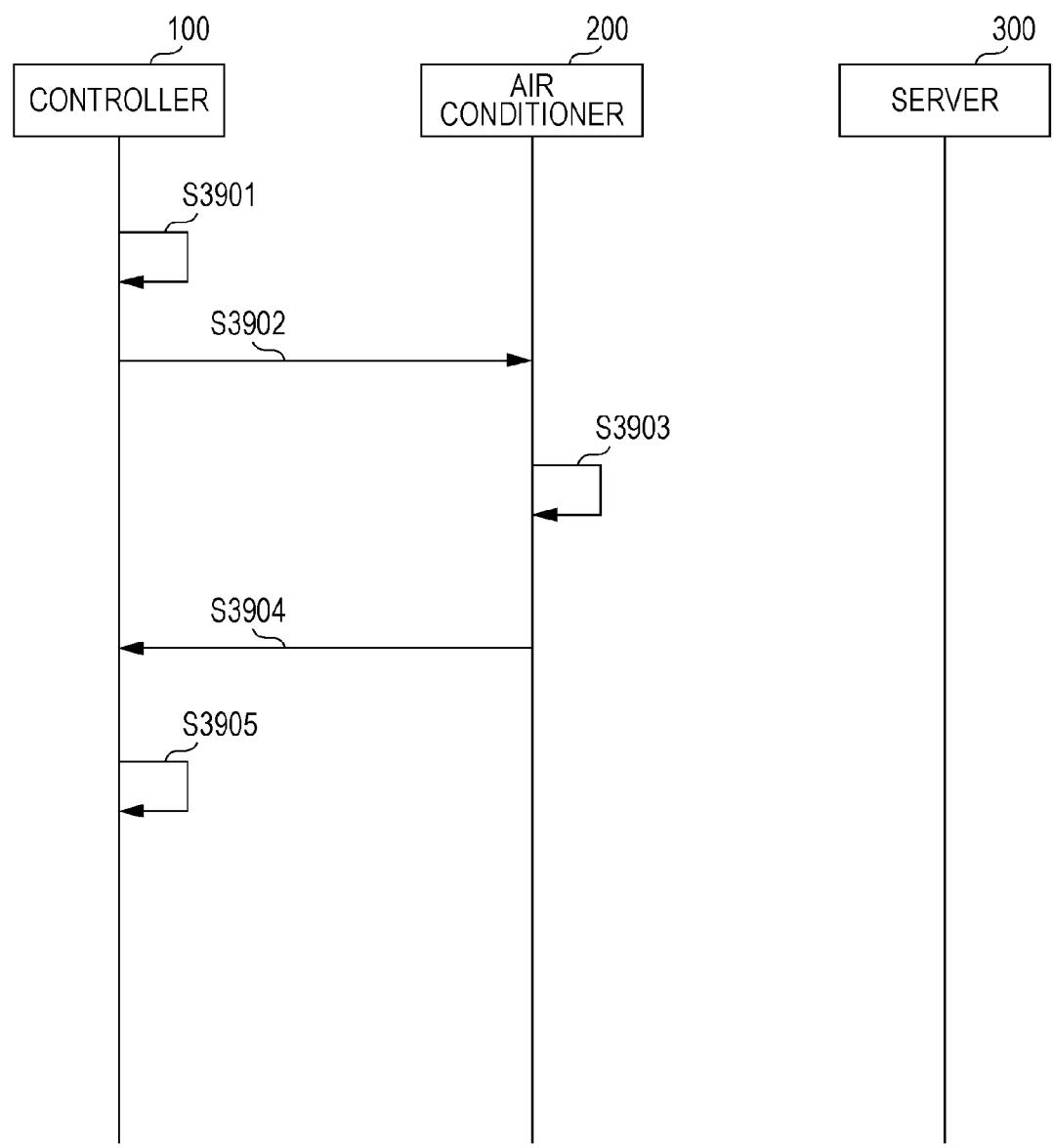
FIG. 39 is a sequence diagram illustrating a first example of device operating processing in the air conditioning control system.

FIG. 39 is a sequence diagram illustrating a first example of device operating processing in the air conditioning control system. The controller 100 and the air conditioner 200 communicate directly. This communication is performed via the communication controller 107 and the communication controller 207.

First, the controller 100 accepts operation input for the air conditioner 200 at the operating screen for when stopped 1100 or operating screen for when running 1300, such as change to the set temperature, changing the operating mode, or the like (S3901).

Next, the controller 100 generates a control command for controlling the air conditioner 200 at the device controller 106, based on the accepted operation input, and transmits the generated control command to the air conditioner 200 (S3902).

The air conditioner 200 then executes the received control command (S3903).

Next, the air conditioner 200 transmits the execution results of the control command to the controller 100 (S3904).

The controller 100 uses the execution results of the control command that have been received to update the operating screen for when stopped 1100 or operating screen for when running 1300 displayed on the display unit 101 (S3905).

Figure 40:
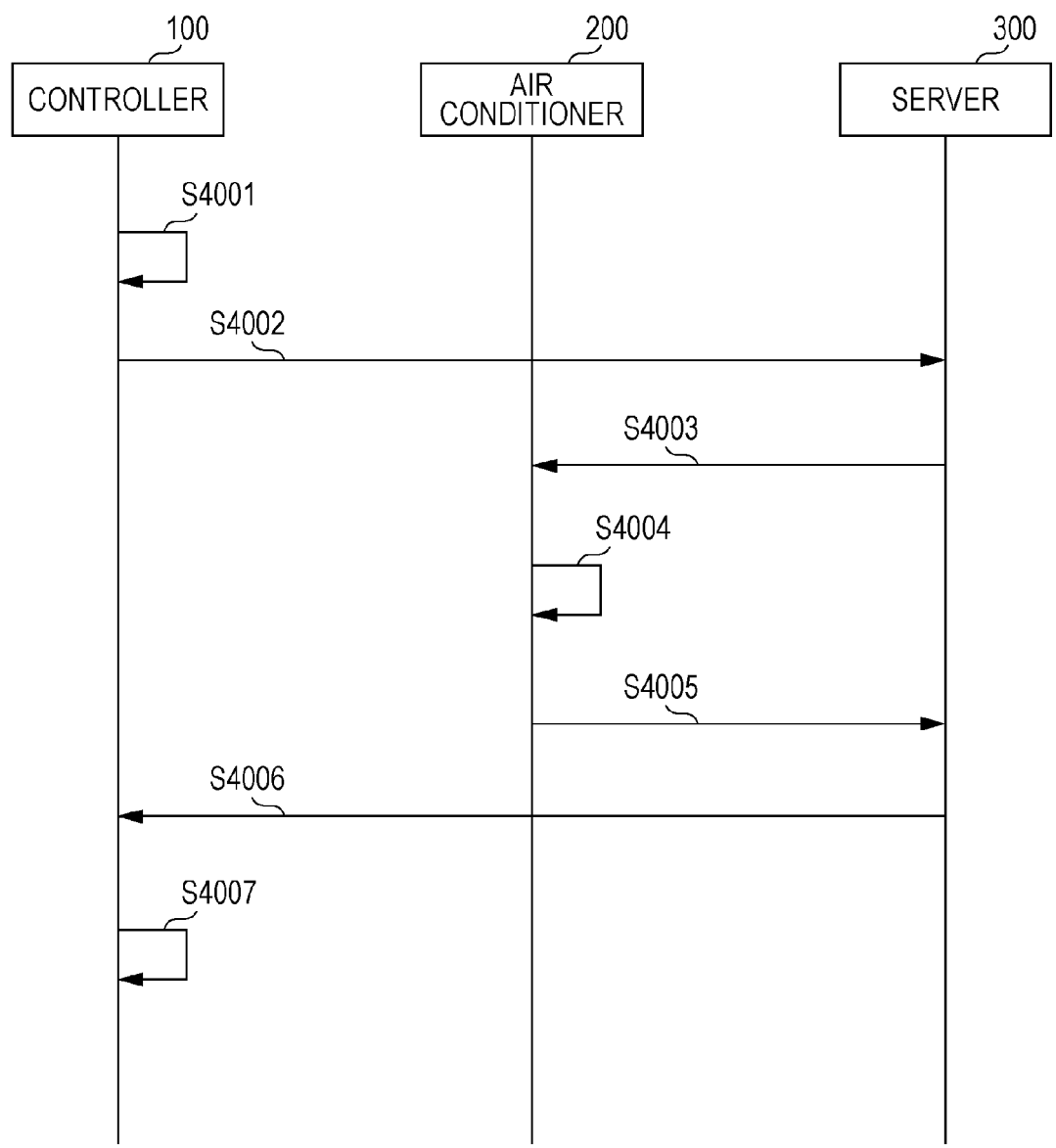
FIG. 40 is a sequence diagram illustrating a second example of device operating processing in the air conditioning control system.

FIG. 40 is a sequence diagram illustrating a second example of device operating processing in the air conditioning control system. The air conditioning cost in the present example is calculated using the air conditioning cost calculator 208 of the air conditioner 200. The controller 100 and the air conditioner 200 communicate via the server 300. This communication is performed via the communication controller 107, the communication controller 207, and the communication controller 307.

First, the controller 100 accepts operation input for the air conditioner 200 at the operating screen for when stopped 1100 or operating screen for when running 1300, such as change to the set temperature, changing the operating mode, or the like (S4001).

Next, the controller 100 generates a control command for controlling the air conditioner 200 at the device controller 106, based on the accepted operation input, and transmits the generated control command to the server 300 (S4002).

The server 300 transmits the control command received from the controller 100 to the air conditioner 200 (S4003).

The air conditioner 200 then executes the received control command (S4004).

Next, the air conditioner 200 transmits the execution results of the control command to the server 300 (S4005).

The server 300 then transmits the execution results of the control command that have been received from the air conditioner 200 to the controller 100 (S4006).

The controller 100 uses the execution results of the control command that have been received to update the operating screen for when stopped 1100 or running state display region 1103 displayed on the display unit 101 (S4007).

Note that in S4002 the controller 100 transmits to the server 300 a control command obtained by converting operation input, but the operation input itself may be transmitted. In this case, the server 300 generates a control command for controlling the air conditioner based on the received operation input at the device controller 302, and transmits this to the air conditioner 200. The same advantages can be obtained in this case as well.

Figure 41:
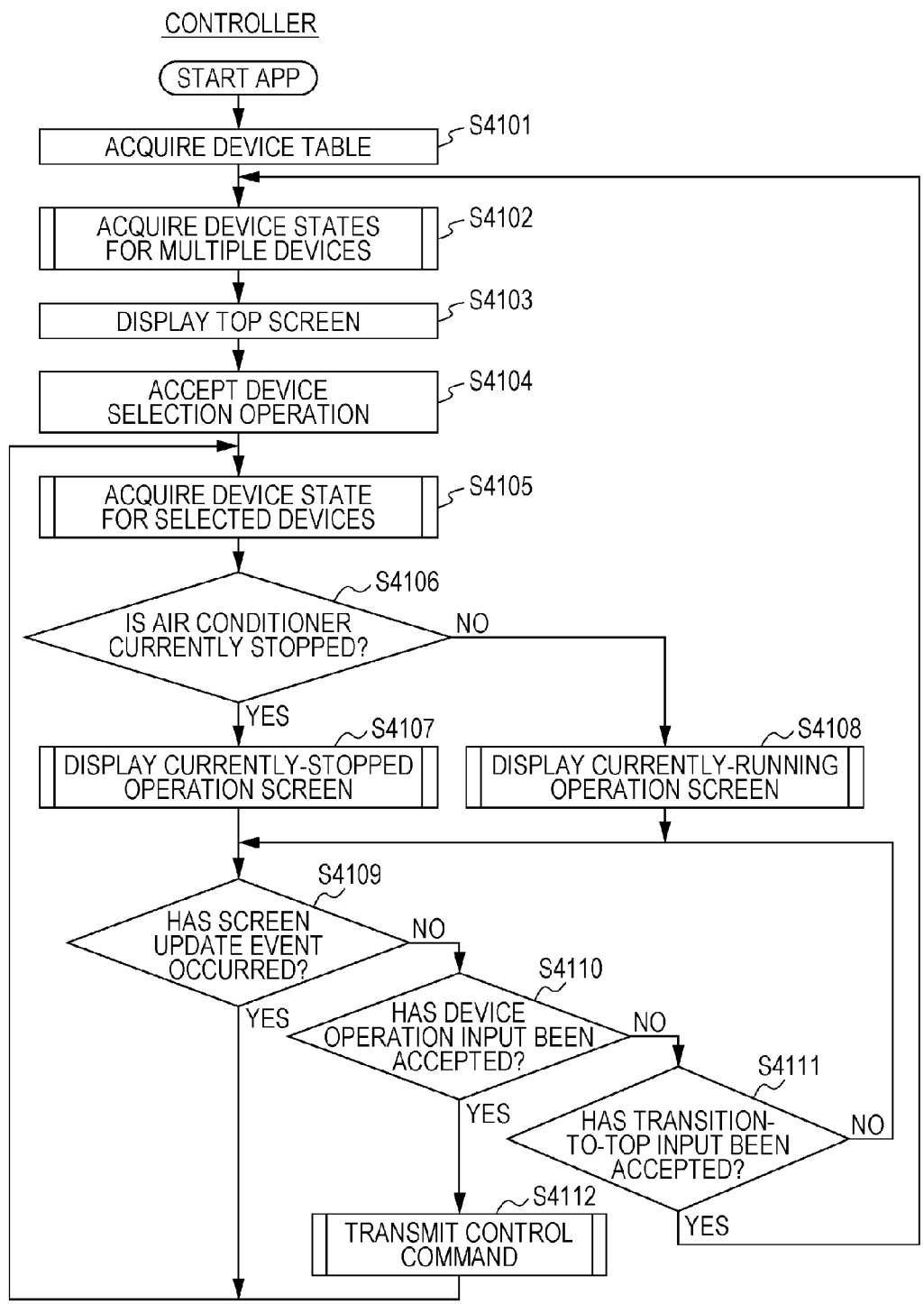
FIG. 41 is a flowchart illustrating an example of overall processing.

FIG. 41 is a flowchart illustrating an example of the overall processing at the controller 100. First, the display controller 103 acquires the device table 500 (S4101). In a case where the controller 100 itself manages the device table 500, the device table 500 is acquired from the storage 104. In a case where the server 300 manages the device table 500, the display controller 103 acquires the device table 500 stored in the storage 304 via the network.

Next, the display controller 103 executes processing to acquire the device state table 600 for the air conditioners 200 corresponding to each row in the device table 500 (S4102). The flow to acquire the device state table 600 is described later with reference to FIG. 42.

The display controller 103 then configures a top screen 1000 using the device table 500 and device state table 600, and displays the top screen 1000 on the display unit 101 (S4103). The top screen 1000 illustrated in FIG. 10 is thus completed. In a case where calculation of air conditioning cost is not necessary to configure the top screen 1000, the air conditioning cost calculation processing described later with reference to FIG. 50 can be performed. For example, "ten minutes left" is displayed in the device state display region corresponding to the air conditioner 200 installed in the den in the top screen 1000 in FIG. 10, but required time information necessary for the room temperature to reach the set temperature needs to be calculated using the air conditioning cost calculation processing in FIG. 50 to make this display.

Next, the input controller 102 detects that a device selection button 1001 has been selected at the top screen 1000 (S4104). Assumption will be made here that the air conditioner 200 corresponding to the selected device selection button 1001 is the air conditioner 200 which the user has selected.

Next, the display controller 103 executes processing to acquire the device state table 600 relating to the selected air conditioner 200 (S4105). The flow for acquiring the device state table 600 will be described later with reference to FIG. 42.

The display controller 103 then determines whether or not the running state of the selected air conditioner 200 is stopped or not (S4106). In a case where the air conditioner 200 is stopped in S4106 (YES in S4106), the display controller 103 executes the processing to display the operating screen for when stopped 1100 on the display unit 101 (S4107). The flow for displaying the operating screen for when stopped 1100 will be described later with reference to FIGS. 43 through 45.

On the other hand, in a case where the air conditioner 200 is running (NO in S4106), the display controller 103 executes processing to display the operating screen for when running 1300 on the display unit 101 (S4108). The flow to display the operating screen for when running 1300 will be described later with reference to FIGS. 46 through 48.

The display controller 103 is then in a standby state awaiting a screen update event to occur or for user input (S4109, S4110, S4111). In a case where a screen update event occurs (YES in S4109), the flow returns to S4105. A screen update event occurs at a timing at which display controller 103 updates the operating screen for when stopped 1100 displayed on the display unit 101, and can be realized by performing such using a timer built into the controller 100 such as, for example, "cause screen update event to occur if time from last screen update is 1 minute or more".

A screen update event may be made to occur at a timing at which the room temperature changes. This can be realized by the air conditioner 200 periodically acquiring the room temperature by the room temperature acquisition unit 205, and notifying the controller 100 at the timing at which the room temperature has changed, for example. In this case, the change in room temperature is instantly reflected in the operating screen for when stopped 1100, so the user can confirm the change in the in-room state in real time.

Alternatively, in a case where the input controller 102 accepts device operation input by the user (NO at S4109 and YES at S4110), the input controller 102 executes processing for transmitting a control command corresponding to the accepted device operation input to the air conditioner 200 (S4112). The flow for converting the operation input into a control command and transmitting the control command will be described later with reference to FIG. 49. The device operation input here is one of the set temperature changing button 1106, eco mode running button 1110, normal mode running button 1111, powerful mode running button 1112, and stop button 1302 being selected.

Upon the input controller 102 detecting that the switch to top screen button 1101 has been selected (NO at S4110 and YES at S4111), the flow returns to S4102.

On the other hand, in a case where S4109, S4110, and S4111 are all NO, i.e., no periodical screen update event occurs and there is no user input, the flow returns to S4109, and the standby state continues.

Figure 42:
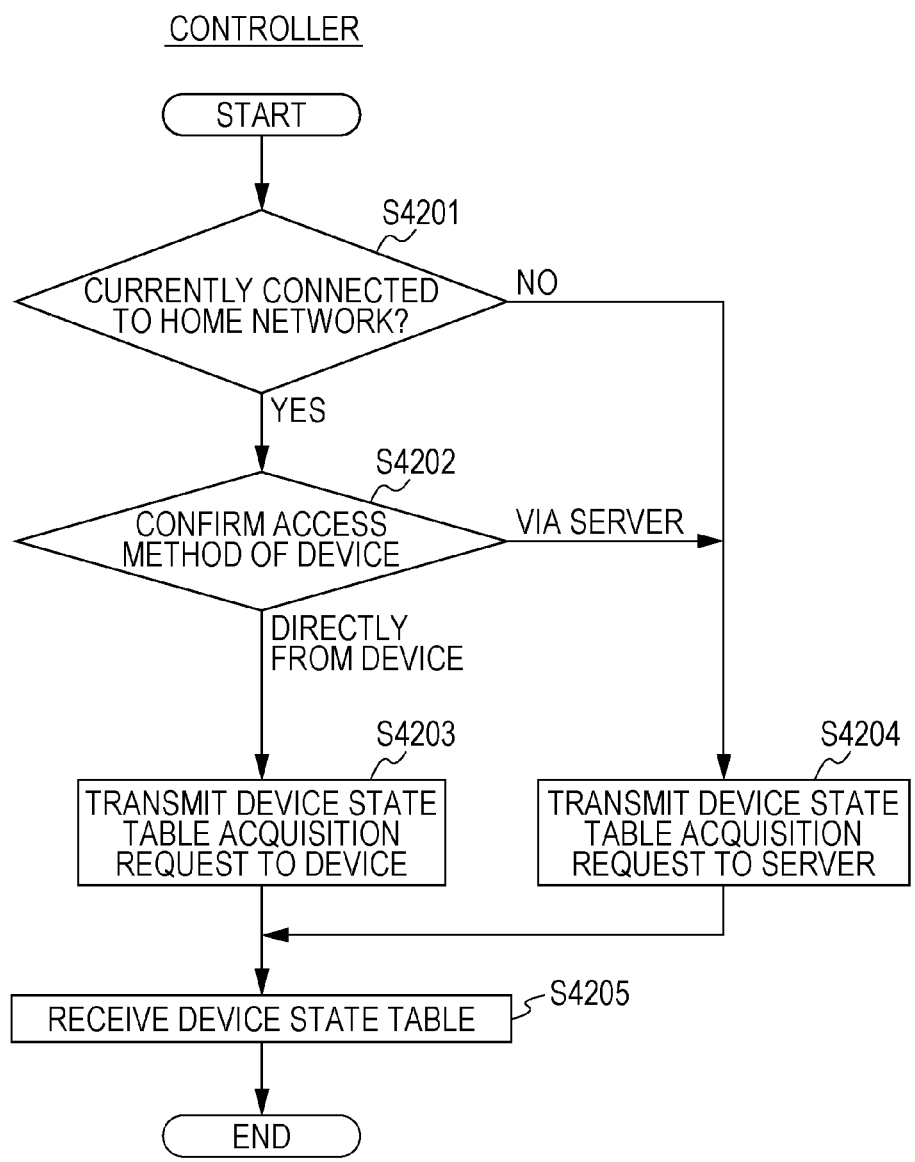
FIG. 42 is a flowchart illustrating an example of device state acquisition processing.

FIG. 42 is a flowchart illustrating the details of the device state acquisition processing executed at S4102 in FIG. 41 and S4105 in FIG. 41. First, the device controller 106 determines whether or not the controller 100 is connected to a home network (S4201). A home network is a network in the home of the user. Accordingly, if the user has operated the controller 100 away from home, a determination of NO is made in S4201, and if the user has operated the controller 100 at home, a determination of YES is made in S4201.

In a case where the controller 100 is connected to the home network (YES at S4201), the device controller 106 confirms the device state acquisition method following the content of "device access method" in the device table 500 (S4202).

In a case where the "device access method" is found to be "directly to device" in S4202, the device controller 106 transmits an acquisition request for the device state table 600 to the respective air conditioner 200 (S4203).

On the other hand, in a case where the "device access method" is found to be "via server" in S4202, the device controller 106 transmits an acquisition request for the device state table 600 to the server 300 (S4204). The processing of S4204 is also executed in a case where determination is made in S4201 that the controller 100 is not connected to the home network (NO at S4201).

Next, the device controller 106 receives the device state table 600 from the air conditioner 200 or from the server 300 (S4205).

Figure 43:
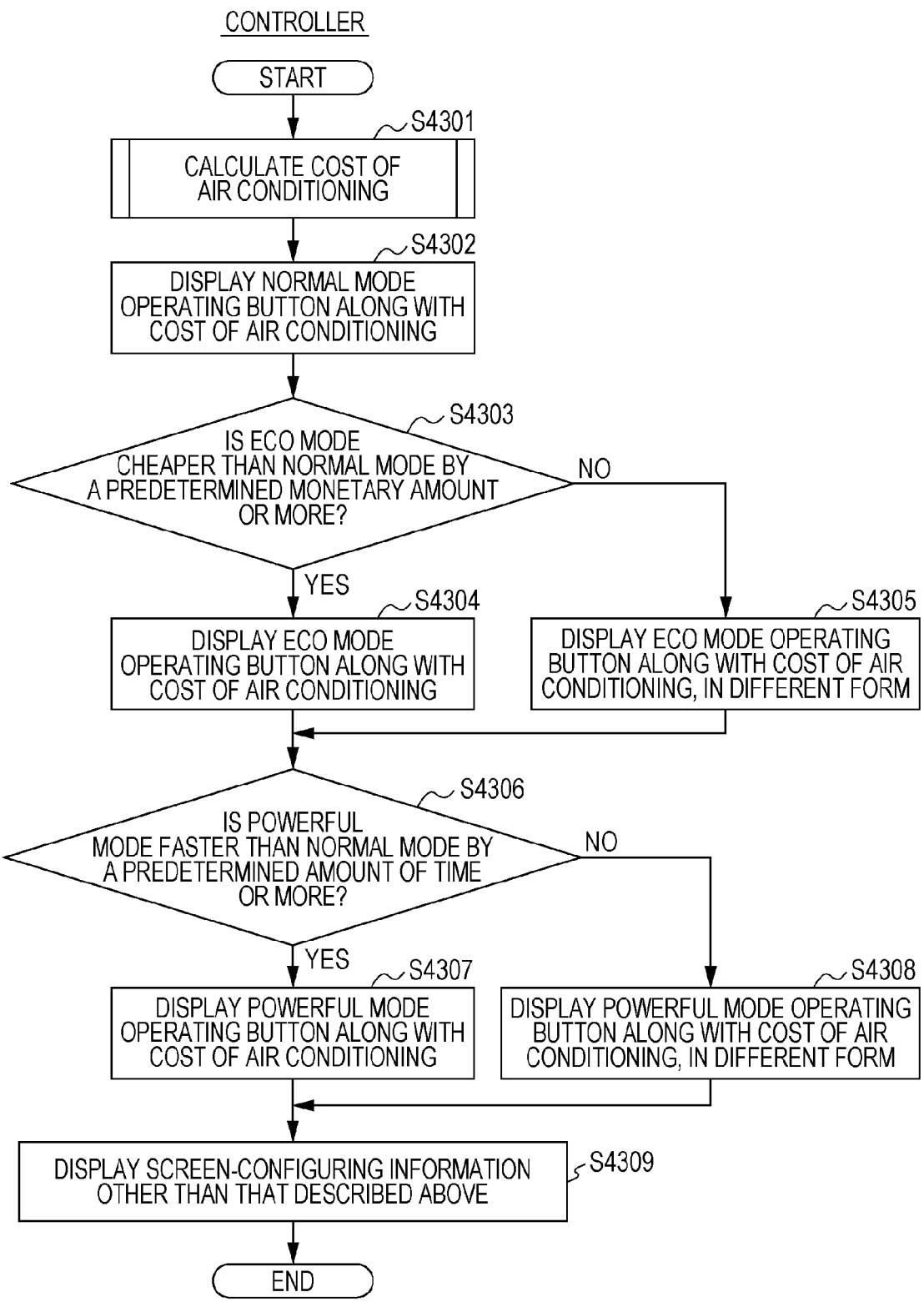
FIG. 43 is a flowchart illustrating a first example of processing to display an operating screen for when stopped.

FIG. 43 is a flowchart illustrating a first example of display processing of the operating screen for when stopped 1100, executed at S4107 in FIG. 41. The air conditioning cost is calculated at the controller 100 in the first example of display processing of the operating screen for when stopped. This flowchart corresponds to the sequence diagrams in FIGS. 35 and 36.

First, the display controller 103 executes processing to calculate air conditioning cost representing time-related and monetary costs necessary to run the air conditioner 200 (S4301). The flow for calculating the cost of air conditioning will be described later with reference to FIG. 50.

Next, the display controller 103 displays the normal mode running button 1111 on the display unit 101 along with the air conditioning cost in the normal mode (S4302).

The display controller 103 then acquires the required charges information in the eco mode and the required charges information in the normal mode from the air conditioning cost, and determines whether or not the charges in the eco mode are smaller than the charges in the normal mode by a predetermined monetary amount or more (S4303). The predetermined monetary amount should be a value which many users feel that it is worthwhile to select the eco mode. A value of 3 cents has been employed in this example. The predetermined monetary amount is set beforehand by the system builder.

In a case where the room temperature has reached the set temperature in S4303 and the air conditioning cost does not include the required charges information, maintaining unit cost information is used instead of the required charges information to perform the determination.

In a case where the charges in the eco mode are cheaper than the charges in the normal mode by the predetermined monetary amount or more (YES in S4303), the display controller 103 displays the eco mode running button 1110 on the display unit 101 along with the air conditioning cost in the eco mode (S4304).

In a case where the charges in the eco mode are not cheaper than the charges in the normal mode by the predetermined monetary amount or more (NO in S4303), the display controller 103 displays the eco mode running button 1110 on the display unit 101 along with the air conditioning cost in the eco mode, in a different form from the normal mode running button 1111 (S4305). The different form is, for example, display in a color which is different from that of the normal mode running button 1111 and which will enable many users to recognize that the advantages of the eco mode are small. Gray and translucent colors are suitably used for this display. This display form which differs from that of the normal mode running button 1111 is set by the system builder beforehand.

Next, the display controller 103 acquires the required time information for the powerful mode and the required time information for the normal mode, from the air conditioning cost, and determines whether or not the time in the powerful mode is shorter by a predetermined amount of time or more (S4306). The predetermined amount of time should be a value which many users feel that it is worthwhile to select the powerful mode. A value of 5 minutes has been employed in this example. The predetermined amount of time is set beforehand by the system builder.

In a case where the room temperature has reached the set temperature, and the required time information is not included in the air conditioning cost, S4306 yields NO.

In a case where the time in the powerful mode is shorter than the time in the normal mode by the predetermined amount of time or more (YES in S4306), the display controller 103 displays the powerful mode running button 1112 on the display unit 101 along with the air conditioning cost in the powerful mode (S4307).

In a case where the time in the powerful mode is not shorter than the time in the normal mode by the predetermined amount of time or more (NO in S4306), the display controller 103 displays the powerful mode running button 1112 on the display unit 101 along with the air conditioning cost in the powerful mode, in a different form from the normal mode running button 1111 (S4308). The different form is, for example, display in a color which is different from that of the normal mode running button 1111 and which will enable many users to recognize that the advantages of the powerful mode are small. Gray and translucent colors are suitably used for this display. This display form which differs from that of the normal mode running button 1111 is set by the system builder beforehand.

Next, the display controller 103 displays the rest of the elements necessary to configure the operating screen for when stopped 1100 on the display unit 101 (S4309). The rest of the elements necessary to configure the operating screen for when stopped 1100 are the switch to top screen button 1101, the room name display region 1102, the running state display region 1103, the room temperature display region 1104, the set temperature display region 1105, the set temperature changing button 1106, the message display region 1107, a fixed image serving as a background, and texts strings and so forth. Thus, the operating screen for when stopped 1100, of which a representative example is illustrated in FIG. 11, is displayed on the display unit 101.

The predetermined monetary amount in a case of using the maintaining unit cost information for determination in S4303 may be a different value from the predetermined monetary amount for making determination by the required charges information. In a case where these are different, a small value such as "1 cent" is preferably used. The reason is that, once the room temperature has reached the set temperature, there is no need to consider the disadvantage of the eco mode where a longer amount of time is required for the room temperature to reach the set temperature, so an advantage of being cheaper by even 1 cent is sufficiently meaningful for many users to select the eco mode.

While a value set by beforehand the system builder for all users has been employed as the monetary amount for comparison between electricity charges in the normal mode and electricity charges in the eco mode in S4303, this value may be individually set for each user. For example, a user who feels that even 1 cent difference in savings is sufficient to justify selecting the eco mode can set the value to "1 cent", and a user who feels that selecting the eco mode is not worthwhile unless there are savings in electricity charges of 10 cents or more can set the value to "10 cents". Allowing the user to set the threshold value for comparing the electricity charges in the eco mode with the weaving control device in the normal mode enables a screen display to be realized according to the intuition of each individual user. Of course, the initial value should be a value where a great part of users feel selecting the eco button is worthwhile. Accordingly, advantages the same as when using the same value for all users can be obtained even if users do not perform individual settings.

While a value set beforehand by the system builder for all users has been employed as the threshold value for comparison between time in the normal mode and time in the powerful mode in S4306, this value may be individually set for each user. For example, a user who feels that even 1 minute in time difference is sufficient to justify selecting the powerful mode can set the value to "1 minute", and a user who feels that selecting the powerful mode is not worthwhile unless there is a time difference of 10 minutes or more can set the value to "10 minutes". Allowing the user to set the threshold value for comparing the time in the powerful mode with the time in the normal mode enables a screen display to be realized according to the intuition of each individual user. Of course, the initial value should be a value where a great part of users feel selecting the powerful button is worthwhile. Accordingly, advantages the same as when using the same value for all users can be obtained even if users do not perform individual settings.

While a color set beforehand by the system builder for all users has been employed as the display color for the eco mode running button 1110 in S4305, this color may be individually set for each user. Enabling each user to set the display color for the eco mode running button 1110 in the case that the advantage of the eco mode to save on electricity charges by selecting the eco mode is small realizes display screens which match the intuition of each individual user. Of course, the initial color should be one where a great part of users recognize that the advantage of the eco mode is small. Accordingly, advantages the same as when using the same color for all users can be obtained even if users do not perform individual settings.

While a color set beforehand by the system builder for all users has been employed as the display color for the powerful mode running button 1112 in S4308, this color may be individually set for each user. Enabling each user to set the display color for the powerful mode running button 1112 in the case that the advantage of the powerful mode of short time for the room temperature to reach the set temperature by selecting the powerful mode is small realizes display screens which match the intuition of each individual user. Of course, the initial color should be one where a great part of users recognize that the advantage of the eco mode is small. Accordingly, advantages the same as when using the same color for all users can be obtained even if users do not perform individual settings.

While the eco mode running button 1110 is displayed in a different color from the normal mode running button 1111 in S4305, the button itself may be hidden from display. In this case, the operating screen for when stopped 1100 where there is no eco mode running button 1110, illustrated as a representative example in FIG. 31, is displayed on the display unit 101. By hiding from display the eco mode running button 1110 when the advantage of lower electricity charges by selecting the eco mode is small, the user can be prevented from selecting the eco mode.

While the powerful mode running button 1112 is displayed in a different color from the normal mode running button 1111 in S4308, the button itself may be hidden from display. In this case, the operating screen for when stopped 1100 where there is no powerful mode running button 1112, illustrated as a representative example in FIG. 31, is displayed on the display unit 101. By hiding from display the powerful mode running button 1112 when the advantage of the powerful mode of short time for the room temperature to reach the set temperature by selecting the powerful mode is small, the user can be prevented from selecting the powerful mode.

Figure 44:
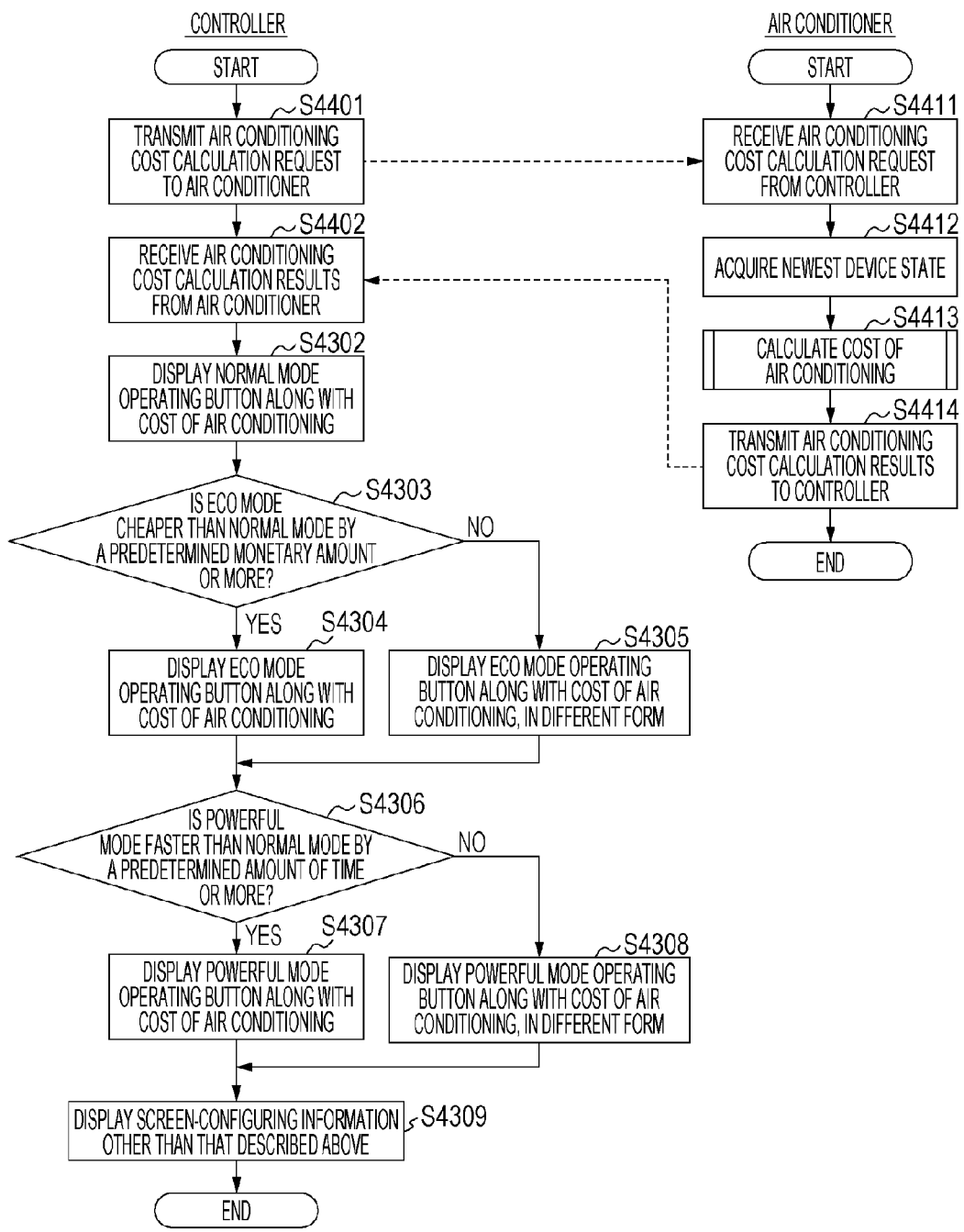
FIG. 44 is a flowchart illustrating a second example of processing to display an operating screen for when stopped.

FIG. 44 is a flowchart illustrating a second example of display processing of the operating screen for when stopped 1100, executed in S4107 in FIG. 41. In the second example of display processing of the operating screen for when stopped, the air conditioning cost is calculated at the air conditioner 200. This flowchart corresponds to the sequence diagram illustrated in FIG. 37.

First, the controller 100 uses the communication controller 107 to transmit an air conditioning cost calculation request to the air conditioner 200 (S4401).

Next, the controller 100 uses the communication controller 107 to receive the air conditioning cost calculation result from the air conditioner 200 (S4402). The calculation result obtained here is in the same format as the result obtained after execution of S4301 in FIG. 43.

The subsequent S4302 through S4309 are the same as the components denoted by the same numerals in FIG. 43, so description will be omitted.

Next, description will be made regarding the flow executed at the air conditioner 200 between S4401 and S4402. First, the air conditioner 200 uses the communication controller 207 to receive the air conditioning cost calculation request from the controller 100 (S4411).

Next, the air conditioner 200 uses the state manager 202 to update the device state table 600 stored in the storage 204 to the newest state (S4412).

The air conditioner 200 then executes processing to calculate the air conditioning cost (S4413). The flow to calculate the air conditioning cost will be described later with reference to FIG. 50.

The air conditioner 200 next uses the communication controller 207 to transmit the calculation result of the air conditioning cost to the controller 100 (S4414).

Figure 45:
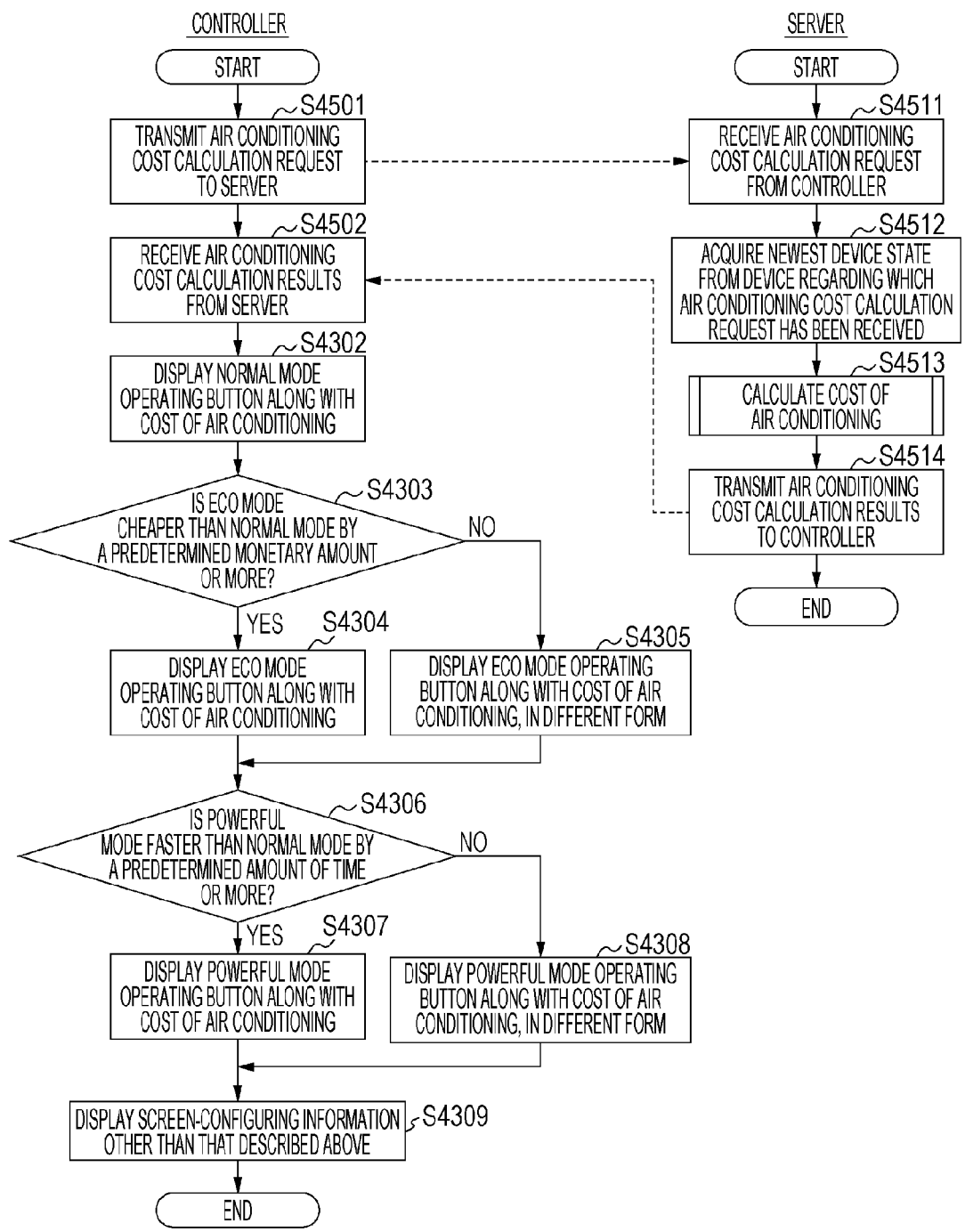
FIG. 45 is a flowchart illustrating a third example of processing to display an operating screen for when stopped.

FIG. 45 is a flowchart illustrating a third example of display processing of the operating screen for when stopped 1100, executed in S4107 in FIG. 41. In the third example of display processing of the operating screen for when stopped, the air conditioning cost is calculated at the server 300. This flowchart corresponds to the sequence diagram illustrated in FIG. 38.

First, the controller 100 uses the communication controller 107 to transmit an air conditioning cost calculation request to the server 300 (S4501).

Next, the controller 100 uses the communication controller 107 to receive the air conditioning cost calculation result from the server 300 (S4502). The calculation result obtained here is in the same format as the result obtained after execution of S4301 in FIG. 43.

The subsequent S4302 through S4309 are the same as the components denoted by the same numerals in FIG. 43, so description will be omitted.

Next, description will be made regarding the flow executed at the server 300 between S4501 and S4502. First, the server 300 uses the communication controller 307 to receive the air conditioning cost calculation request from the controller 100 (S4511).

Next, the server 300 uses the device controller 302 to acquire the newest device state of the air conditioner 200 regarding which the air conditioning cost calculation request has been made, from the air conditioner 200, and updates the device state table 600 stored in the storage 304 (S4512).

The server 300 then executes processing to calculate the air conditioning cost (S4513). The flow to calculate the air conditioning cost will be described later with reference to FIG. 50.

The server 300 then uses the communication controller 307 to transmit the calculation result of the air conditioning cost to the controller 100 (S4514).

Figure 46:
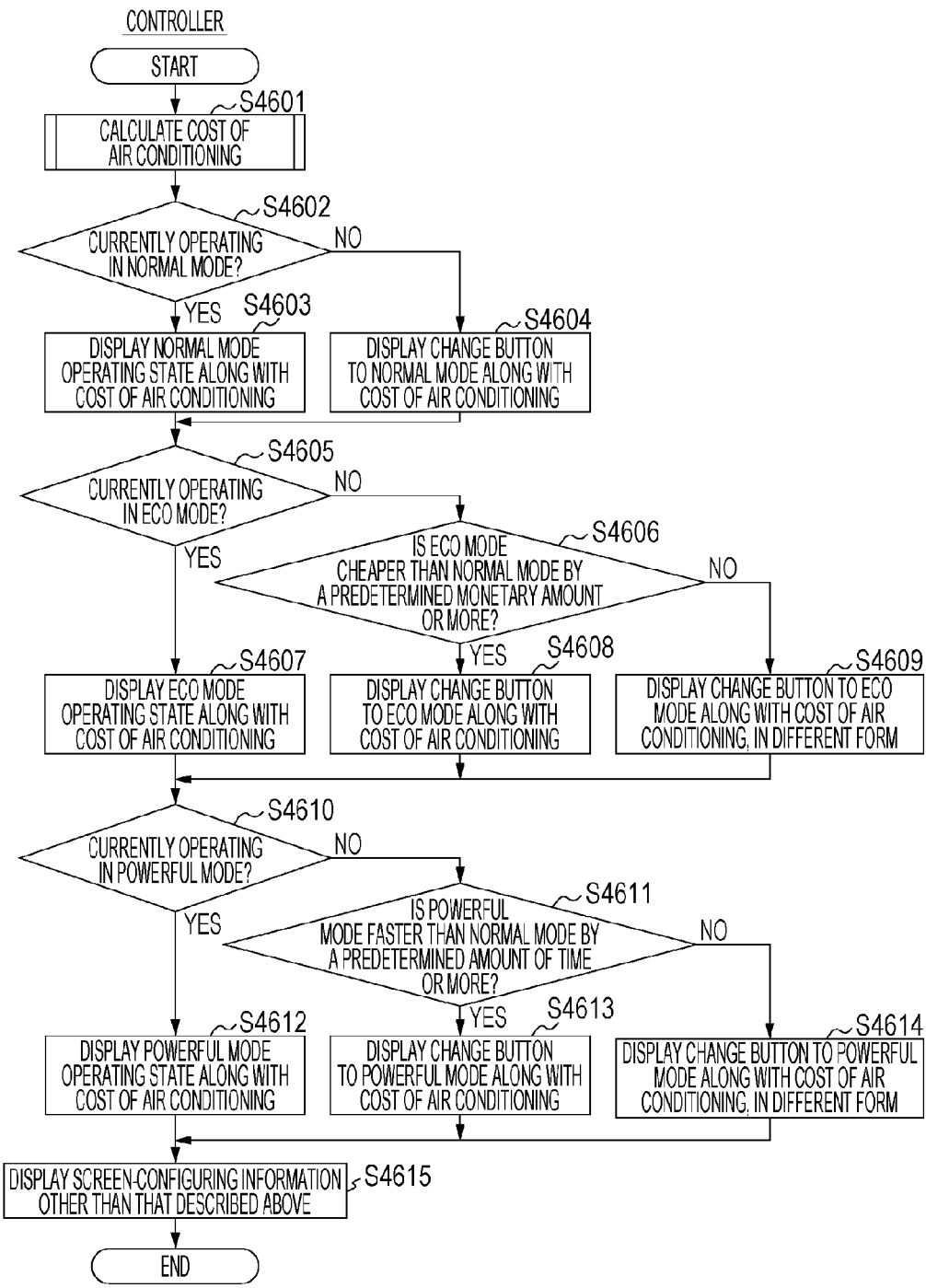
FIG. 46 is a flowchart illustrating a first example of processing to display an operating screen for when running.

FIG. 46 is a flowchart illustrating a first example of display processing of the operating screen for when running 1300, executed in S4108 in FIG. 41. The air conditioning cost is calculated at the controller 100 in the first example of display processing of the operating screen for when running. This flowchart corresponds to the sequence diagrams in FIGS. 35 and 36.

First, the display controller 103 executes processing to calculate air conditioning cost representing time-related and monetary costs necessary to run the air conditioner 200 (S4601). The flow for calculating the cost of air conditioning will be described later with reference to FIG. 50.

Next, the display controller 103 acquires the device state table 600 from the storage 104, and determines whether or not the current operating mode of the air conditioner 200 is the normal mode (S4602).

In a case where the operating mode of the air conditioner 200 is the normal mode (YES in S4602), the display controller 103 displays the air conditioning cost display region 1301 on the display unit 101 along with the air conditioning cost for the normal mode (S4603).

In a case where the operating mode of the air conditioner 200 is not the normal mode (NO in S4602), the display controller 103 displays the normal mode running button 1111 on the display unit 101 along with the air conditioning cost for the normal mode (S4604).

Next, the display controller 103 acquires the device state table 600 from the storage 104, and determines whether or not the current operating mode of the air conditioner 200 is the eco mode (S4605).

In a case where the operating mode of the air conditioner 200 is the eco mode (YES in S4605), the display controller 103 displays the air conditioning cost display region 1301 on the display unit 101 along with the air conditioning cost for the eco mode (S4607).

In a case where the operating mode of the air conditioner 200 is not the eco mode (NO in S4605), the display controller 103 acquires, from the air conditioning cost, required charges information for the eco mode and required charges information for the normal mode, and determines whether the charges in the eco mode are lower than the charges in the normal mode by a predetermined monetary amount or more (S4606). The predetermined monetary amount should be a value which many users feel that it is worthwhile to select the eco mode. A value of 3 cents has been employed in this example. The predetermined monetary amount is set beforehand by the system builder.

In a case where the room temperature has reached the set temperature in S4606 and required charges information is not included in the air conditioning cost, maintaining unit cost information may be used instead of the required charges information.

In a case where the electricity charges in the eco mode are lower than the electricity charges in the normal mode by the predetermined monetary amount or more (YES in S4606), the display controller 103 displays the eco mode running button 1110 on the display unit 101 along with the air conditioning cost for the eco mode (S4608).

In a case where the electricity charges in the eco mode are not lower than the electricity charges in the normal mode by the predetermined monetary amount or more (NO in S4606), the display controller 103 displays the eco mode running button 1110 on the display unit 101 along with the air conditioning cost for the eco mode, in a different form from that of the normal mode running button 1111 (S4609). The different form is, for example, display in a color which is different from that of the normal mode running button 1111 and which will enable many users to recognize that the advantages of the eco mode are small. Gray and translucent colors are suitably used for this display. This display form which differs from that of the normal mode running button 1111 is set by the system builder beforehand.

Next, the display controller 103 acquires the device state table 600 from the storage 104, and determines whether or not the current operating mode of the air conditioner 200 is the powerful mode (S4610).

In a case where the operating mode of the air conditioner 200 is the powerful mode (YES in S4610), the display controller 103 displays the air conditioning cost display region 1301 on the display unit 101 along with the air conditioning cost for the powerful mode (S4612).

In a case where the operating mode of the air conditioner 200 is not the powerful mode (NO in S4610), the display controller 103 acquires, from the air conditioning cost, required time information for the powerful mode and required time information for the normal mode, and determines whether the time in the powerful mode is shorter than the time in the normal mode by a predetermined amount of time (S4611). The predetermined amount of time should be a value which many users feel that it is worthwhile to select the powerful mode. A value of 5 minutes has been employed in this example. The predetermined monetary amount is set beforehand by the system builder.

In a case where the room temperature has reached the set temperature in S4611 and required charges information is not included in the air conditioning cost, S4611 yields NO.

In a case where the time in the powerful mode is shorter than the time in the normal mode by the predetermined amount of time or more (YES in S4611), the display controller 103 displays the powerful mode running button 1112 on the display unit 101 along with the air conditioning cost for the powerful mode (S4613).

In a case where the time in the powerful mode is not shorter than the time in the normal mode by the predetermined amount of time or more (NO in S4611), the display controller 103 displays the powerful mode running button 1112 on the display unit 101 along with the air conditioning cost for the powerful mode, in a different form from that of the normal mode running button 1111 (S4614). The different form is, for example, display in a color which is different from that of the normal mode running button 1111 and which will enable many users to recognize that the advantages of the powerful mode are small. Gray and translucent colors are suitably used for this display. This display form which differs from that of the normal mode running button 1111 is set by the system builder beforehand.

Next, the display controller 103 displays the rest of the elements necessary to configure the operating screen for when running 1300 on the display unit 101 (S4615). The rest of the elements necessary to configure the operating screen for when running 1300 are the switch to top screen button 1101, the room name display region 1102, the running state display region 1103, the room temperature display region 1104, the set temperature display region 1105, the set temperature changing button 1106, the message display region 1107, the stop button 1302, a fixed image serving as a background, and texts strings and so forth. Thus, the operating screen for when running 1300, of which a representative example is illustrated in FIG. 13, is displayed on the display unit 101.

The predetermined monetary amount in a case of using the maintaining unit cost information for determination in S4606 may be a different value from the predetermined monetary amount for making determination by the required charges information. In a case where these are different, a small value such as "1 cent" is preferably used. The reason is that, once the room temperature has reached the set temperature, there is no need to consider the disadvantage of the eco mode where a longer amount of time is required for the room temperature to reach the set temperature, so an advantage of being cheaper by even 1 cent is sufficiently meaningful for many users to select the eco mode.

While a value set beforehand by the system builder for all users has been employed as the threshold value for comparison between electricity charges in the normal mode and electricity charges in the eco mode in S4606, this value may be individually set for each user. For example, a user who feels that even 1 cent difference in savings is sufficient to justify selecting the eco mode can set the value to "1 cent", and a user who feels that selecting the eco mode is not worthwhile unless there are savings in electricity charges of 10 cents or more can set the value to "10 cents". Allowing the user to set the threshold value for comparing the electricity charges in the eco mode with the electricity charges in the normal mode enables a screen display to be realized according to the intuition of each individual user. Of course, the initial value should be a value where a great part of users feel selecting the eco button is worthwhile. Accordingly, advantages the same as when using the same value for all users can be obtained even if users do not perform individual settings.

While a value set beforehand by the system builder for all users has been employed as the threshold value for comparison between time in the normal mode and time in the powerful mode in S4611, this value may be individually set for each user. For example, a user who feels that even 1 minute in time difference is sufficient to justify selecting the powerful mode can set the value to "1 minute", and a user who feels that selecting the powerful mode is not worthwhile unless there is a time difference of 10 minutes or more can set the value to "10 minutes". Allowing the user to set the threshold value for comparing the time in the powerful mode with the time in the normal mode enables a screen display to be realized according to the intuition of each individual user. Of course, the initial value should be a value where a great part of users feel selecting the powerful button is worthwhile. Accordingly, advantages the same as when using the same value for all users can be obtained even if users do not perform individual settings.

While a color set beforehand by the system builder for all users has been employed as the display color for the eco mode running button 1110 in the case that the advantage of the eco mode is small in S4609, this color may be individually set for each user. Enabling each user to set the display color for the eco mode running button 1110 in the case that the advantage of the eco mode to save on electricity charges by selecting the eco mode is small realizes display screens which match the intuition of each individual user. Of course, the initial color should be one where a great part of users recognize that the advantage of the powerful mode is small. Accordingly, advantages the same as when using the same color for all users can be obtained even if users do not perform individual settings.

While a color set by the system builder for all users has been employed as the display color for the powerful mode running button 1112 in the case that the advantage of the powerful mode is small in S4614, this color may be individually set for each user. Enabling each user to set the display color for the powerful mode running button 1112 in the case that the advantage of the powerful mode of short time for the room temperature to reach the set temperature by selecting the powerful mode is small realizes display screens which match the intuition of each individual user. Of course, the initial color should be one where a great part of users recognize that the advantage of the eco mode is small. Accordingly, advantages the same as when using the same color for all users can be obtained even if users do not perform individual settings.

While the eco mode running button 1110 is displayed in a different color from the normal mode running button 1111 in S4609, the button itself may be hidden from display. In this case, the operating screen for when running 1300 where there is no eco mode running button 1110, illustrated as a representative example in FIG. 27, is displayed on the display unit 101. By hiding from display the eco mode running button 1110 when the advantage of lower electricity charges by selecting the eco mode is small, the user can be prevented from selecting the eco mode.

While the powerful mode running button 1112 is displayed in a different color from the normal mode running button 1111 in S4614, the button itself may be hidden from display. In this case, the operating screen for when running 1300 where there is no powerful mode running button 1112, illustrated as a representative example in FIG. 27, is displayed on the display unit 101. By hiding from display the powerful mode running button 1112 when the advantage of short time for the room temperature to reach the set temperature by selecting the powerful mode is small, the user can be prevented from selecting the powerful mode.

Figure 47:
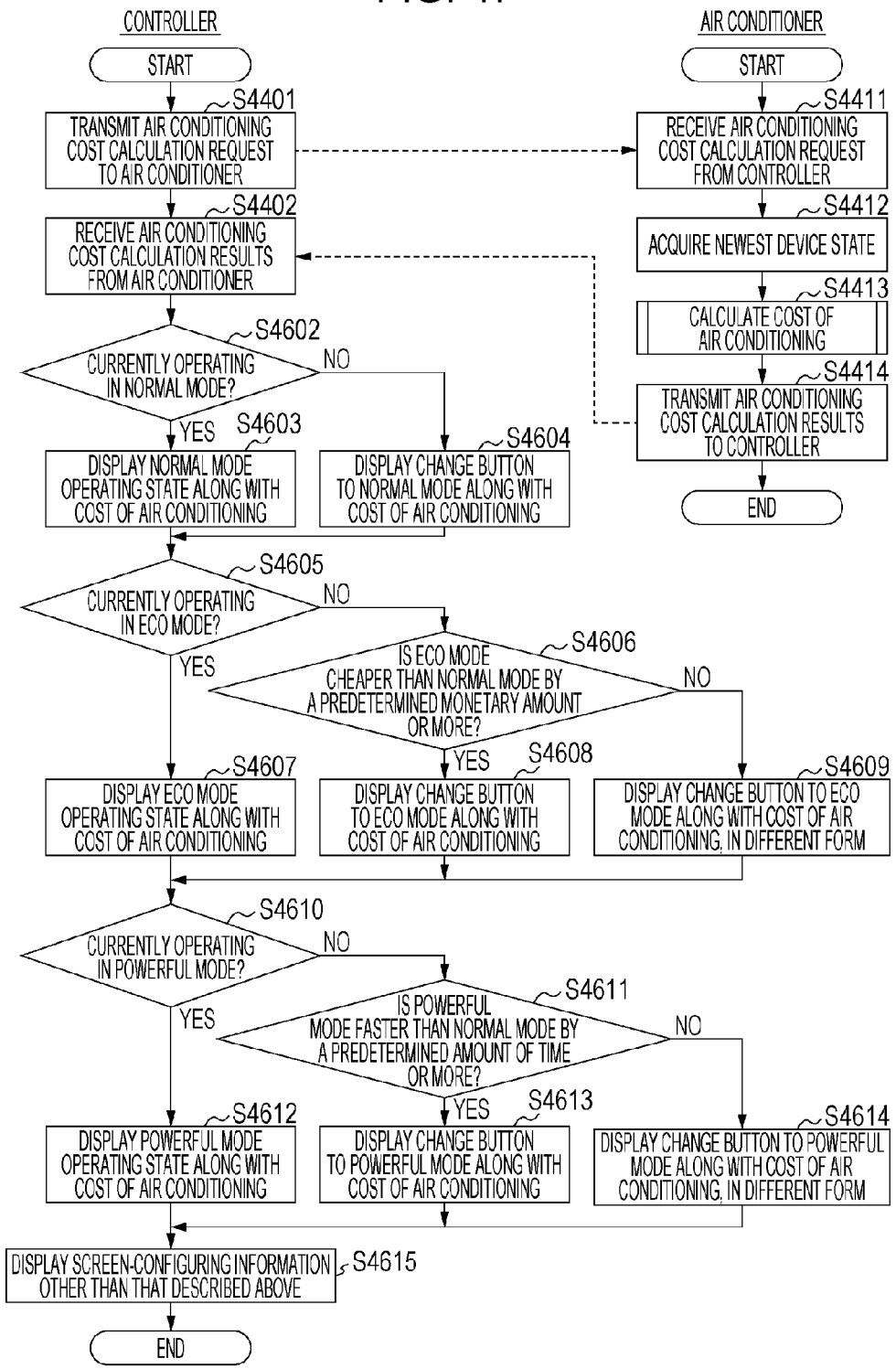
FIG. 47 is a flowchart illustrating a second example of processing to display an operating screen for when running.

FIG. 47 is a flowchart illustrating a second example of display processing of the operating screen for when running 1300, executed in S4108 in FIG. 41. In the second example of display processing of the operating screen for when running, the air conditioning cost is calculated at the air conditioner 200. This flowchart corresponds to the sequence diagram illustrated in FIG. 37.

S4401, S4402, and S4411 through S4414 are the same as the components denoted by the same numerals in FIG. 44, so description will be omitted. Also, S4602 through S4615 are the same as the components denoted by the same numerals in FIG. 46, so description will be omitted.

Figure 48:
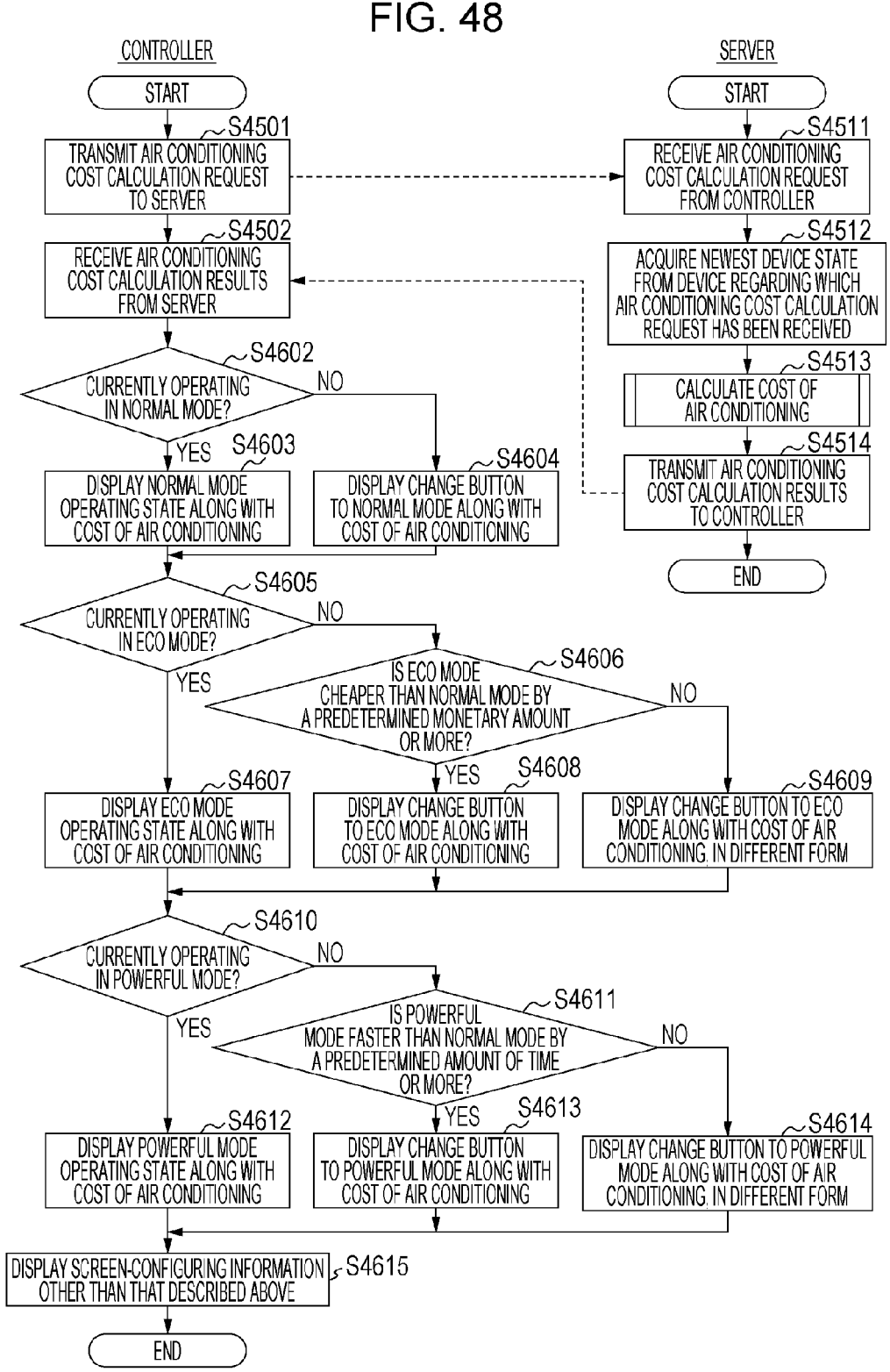
FIG. 48 is a flowchart illustrating a third example of processing to display an operating screen for when running.

FIG. 48 is a flowchart illustrating a third example of display processing of the operating screen for when running 1300, executed in S4108 in FIG. 41. In the third example of display processing of the operating screen for when running, the air conditioning cost is calculated at the server 300. This flowchart corresponds to the sequence diagram illustrated in FIG. 38.

S4501, S4502, and S4511 through S4514 are the same as the components denoted by the same numerals in FIG. 45, so description will be omitted. Also, S4602 through S4615 are the same as the components denoted by the same numerals in FIG. 46, so description will be omitted.

Figure 49:
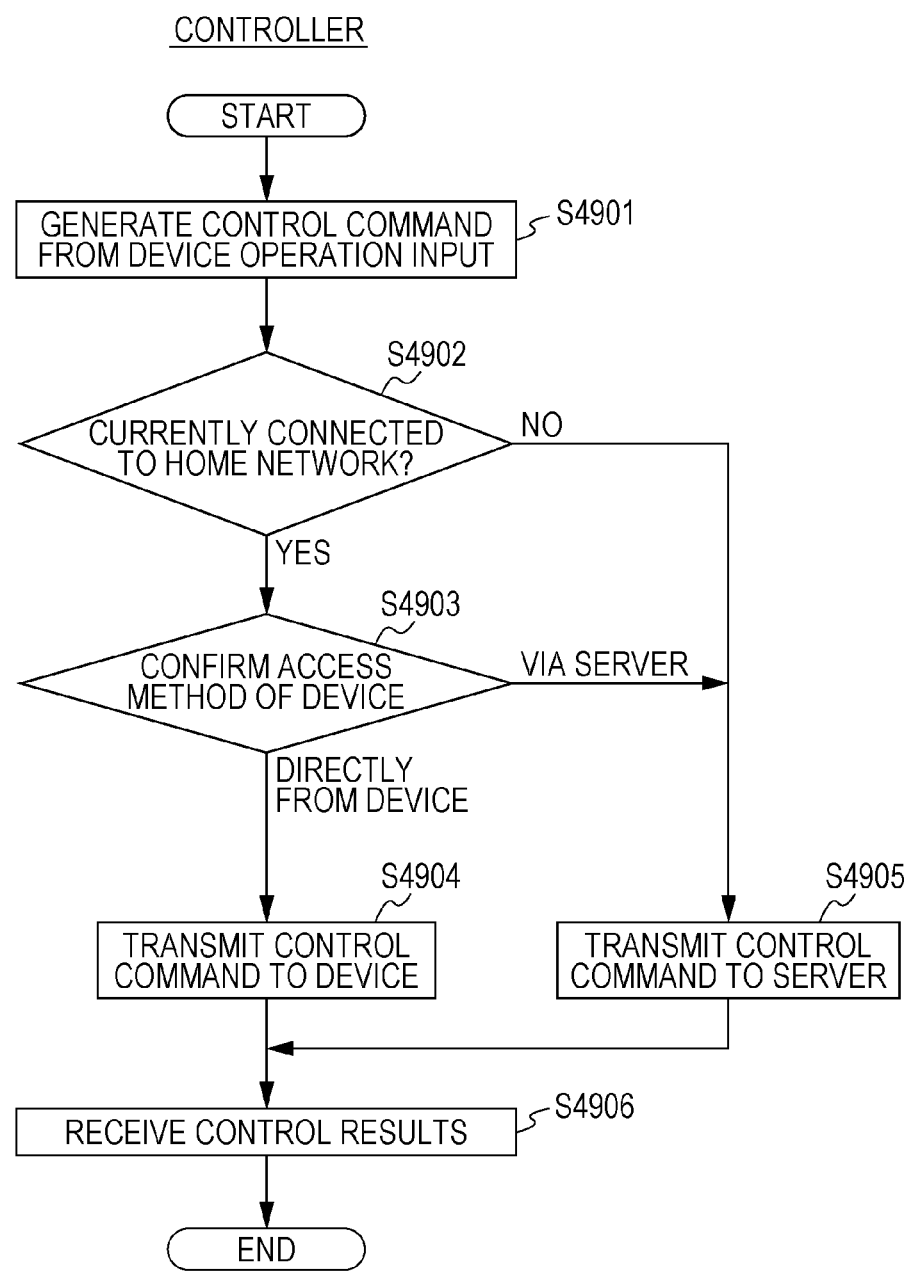
FIG. 49 is a flowchart illustrating an example of control command transmission processing.

FIG. 49 is a flowchart illustrating an example of the control command transmission processing executed at S4112 in FIG. 41. First, The device controller 106 generates a control command to control the air conditioner, in accordance with device operation input accepted at the top screen 1000 (S4901).

Next, the device controller 106 determines whether or not the controller 100 is connected to a home network (S4902). A home network is a network in the home of the user. Accordingly, if the user has operated the controller 100 away from home, a determination of NO is made in S4902, and if the user has operated the controller 100 at home, a determination of YES is made in S4902.

In a case where the controller 100 is connected to the home network (YES in S4902), the device controller 106 confirms the device state acquisition method following the content of "device access method" in the device table 500 (S4903).

In a case where the "device access method" is found to be "directly to device" in S4903, the device controller 106 transmits the control command to the respective air conditioner 200 (S4904).

On the other hand, in a case where the "device access method" is found to be "via server" in S4903, the device controller 106 transmits the command to the server 300 (S4905). The processing of S4905 is also executed in a case where determination is made in S4902 that the controller 100 is not connected to the home network (NO at S4902).

Next, the device controller 106 receives the control results from the air conditioner 200 or from the server 300 (S4906).

Figure 50:
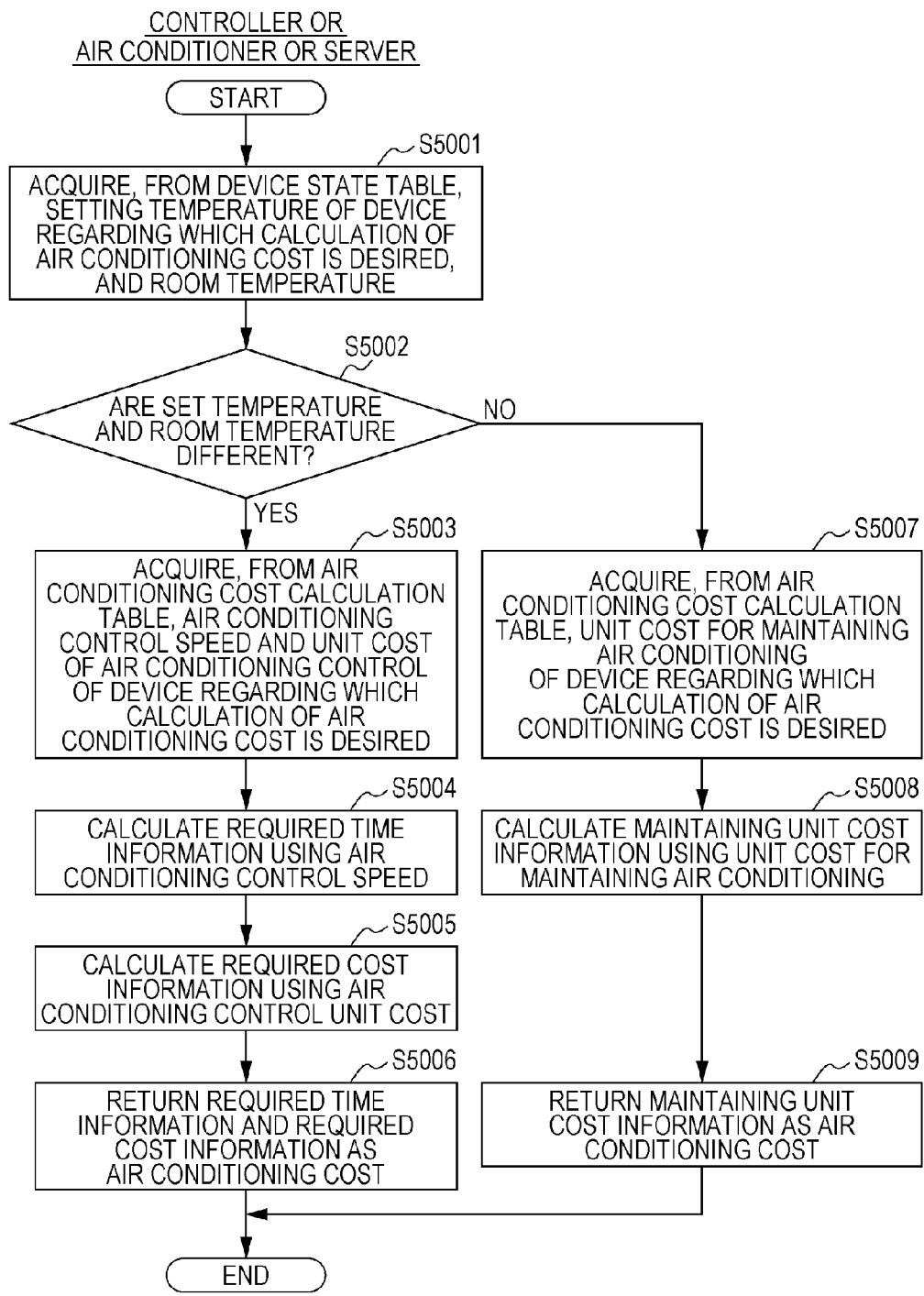
FIG. 50 is a flowchart illustrating an example of air conditioning cost calculation processing.

FIG. 50 is a flowchart illustrating an example of air conditioning cost calculation processing executed in S4301 in FIG. 43, S4413 in FIG. 44, and S4513 in FIG. 45. This processing may be executed at any of the controller 100, air conditioner 200, and server 300. The following description is made regarding a case that the processing is executed at the controller 100.

First, the air conditioning cost calculator 108 reads out the device state table 600 from the storage 104, and acquires the "set temperature" and "room temperature" of the air conditioner 200 for which the air conditioning cost is to be calculated, form the device state table 600 (S5001).

Next, the air conditioning cost calculator 108 compares the acquired set temperature and room temperature, and determines whether or not the set temperature and room temperature differ (S5002).

In a case where the set temperature and room temperature differ (YES in S5002), the air conditioning cost calculator 108 reads out the device table 500 and air conditioning cost calculation table 800 from the storage 104, and from the device table 500 acquires the "model No." for the air conditioner 200 regarding which the air conditioning cost is to be calculated, and from the air conditioning cost calculation table 800 acquires the "air conditioning control speed" and "air conditioning control unit cost" corresponding to the acquired model No. (S5003).

For example, in a case of acquiring the "air conditioning control speed" and "air conditioning control unit cost" for the air conditioner 200 of which the device ID is "A" in the device table 500 in FIG. 6, the model No. of the air conditioner 200 of which the device ID is "A" is "AC-001", so the row where the model No. is "AC-001" is referenced in the air conditioning cost calculation table 800 in FIG. 8. In this example the "air conditioning control speed" for the air conditioner of model No. indicates that the amount of time the air conditioner of model No. AC-001 requires to raise/lower the current temperature by 1° C. is 5 minutes in eco mode, and that the air conditioning control unit cost is 2 cents to raise/lower the room temperature by 1° C.

Next, the air conditioning cost calculator 108 uses the air conditioning control speed to calculate the required time information for the amount of time which each operating mode of the air conditioner 200 needs for the current room temperature to reach the set temperature set to the air conditioner 200 (S5004). For example, in a case of raising the room temperature using the air conditioner of model No. AC-001 from 16° C. to 20° C., referencing the air conditioning cost calculation table 800 in FIG. 8, the required time in eco mode is 20 minutes, as calculated from |16−20|×5=20.

Next, the air conditioning cost calculator 108 uses the air conditioning control unit cost to calculate the required charges information indicating electric charges corresponding to the amount of electric power consumed in each operating mode of the air conditioner 200, in order for the current room temperature to reach the set temperature set to the air conditioner 200 (S5005). For example, in a case of raising the room temperature using the air conditioner 200 of model No. "AC-001" from 16° C. to 20° C., referencing the air conditioning cost calculation table 800 in FIG. 8, the required charges in eco mode is 8 cents, as calculated from |16−20|×2=8.

The air conditioning cost calculator 108 the returns the calculated required time information and required charges information as the air conditioning cost (S5006). The air conditioning cost returned at this time is information of required time and electricity charges for the room temperature to reach the set temperature in each operating mode of the eco mode, normal mode, and powerful mode.

In a case where the set temperature and the room temperature are the same (NO in S5002), the air conditioning cost calculator 108 reads out the device table 500 and air conditioning cost calculation table 800 from the storage 104, acquires the "model No." of the air conditioner 200 regarding which the air conditioning cost is to be calculated from the device table 500, and acquires the "air conditioning maintaining unit cost" corresponding to the acquired model No. (S5007).

For example, in a case of acquiring the "air conditioning maintaining unit cost" for the air conditioner 200 of which the device ID is "A" in the device table 500 in FIG. 6, the model No. of the air conditioner 200 of which the device ID is "A" is "AC-001", so the row where the model No. is "AC-001" is referenced in the air conditioning cost calculation table 800 in FIG. 8. In this example, the air conditioning maintaining unit cost indicates that the air conditioner of the model No. "AC-001" in eco mode requires 10 cents to maintain the room temperature for 1 hour.

Next, the air conditioning cost calculator 108 uses the air conditioning maintaining unit cost to calculate maintaining unit cost information representing electricity charges per time unit corresponding to the amount of electric power which the air conditioner 200 consumes in each operating mode to maintain the room temperature at the set temperature (S5008). The air conditioning cost calculation table 800 illustrated in FIG. 8 stores the electricity charges per hour to maintain the room temperature at the set temperature, in the "air conditioning maintaining unit cost", so the stored value is used as the maintaining unit cost information without any change. In a case where an expression to calculate the maintaining unit cost information as "air conditioning maintaining unit cost", calculations are performed following the expression, and the calculation results are used as the maintaining unit cost information.

Next, the air conditioning cost calculator 108 returns the calculated maintaining unit cost information as the air conditioning cost (S5009). The air conditioning cost returned at this time is electricity charges per hour, necessary to maintain the room temperature at the set temperature in each operating mode of eco mode, normal mode and powerful mode.

In a case where the air conditioning cost calculation processing is executed at the air conditioner 200 instead of the controller 100, this is realized by the storage 204 of the air conditioner 200 being used instead of the storage 104 of the controller 100, and the air conditioning cost calculator 208 of the air conditioner 200 instead of the air conditioning cost calculator 108 of the controller 100. Note that the air conditioning cost calculation table 800 stored in the storage 204 has only one row, so the procedures of acquiring the model No. from the device table 500 in S5003 and S5005 can be omitted.

In a case where the air conditioning cost calculation processing is executed at the server 300 instead of the controller 100, this is realized by the storage 304 of the server 300 being used instead of the storage 104 of the controller 100, and the air conditioning cost calculator 308 of the server 300 instead of the air conditioning cost calculator 108 of the controller 100.

Note that the operating modes in the present disclosure are not restricted to the normal mode, eco mode, and powerful mode, and that other operating modes defined by combinations of air conditioner parameters such as wind flow, running time of compressor, and so forth, may be used. In this case, a great number of combinations of parameters exist, so the number of options to select from, such as time and charges necessary for the room temperature to reach the set temperature, can be increased, and thus the user can select an operating mode closer to the desired time and charges. In this case, there is a greater number of options to select from for operating modes, so pull-down lists, sliders, rotating drum pickers, and so forth, are suitably used in the user interface for selecting the operating mode, rather than buttons.

Operating modes with few time or money related advantages may be excluded from the operating modes defined by combinations of air conditioner parameters, so that operating modes with few time or money related advantages are not included. In this case, the user can be prevented from selecting an operating mode with little advantages.

In a case where there are multiple operating modes in the operating modes defined by combinations of air conditioner parameters which are similar regarding time-related cost, an arrangement may be made where only the one of these where the monetary cost is the lowest is presented to the user. In this case, the user can be prevented from unnecessarily selecting an expensive operating mode.

In a case where there are multiple operating modes in the operating modes defined by combinations of air conditioner parameters which are similar regarding money-related cost, an arrangement may be made where only the one of these where the time-related cost is the lowest is presented to the user. In this case, the user can be prevented from unnecessarily selecting a slow operating mode.

A great number of operating modes which are defined by combinations of air conditioner parameters exist, so an arrangement may be made where the user sets the desired time-related cost and monetary cost conditions. In this case, the user does not need to reference a list of the great number of operating modes that exist, and can set the air conditioner an operating mode according to the desired time-related cost and monetary cost. Examples of user settings might be "the cheapest operating mode for the room temperature to reach the set temperature within 10 minutes" or "the fastest operating mode for the room temperature to reach the set temperature within 10 cents" or the like. Pull-down lists, sliders, rotating drum pickers, and so forth, are suitably used in the user interface for setting the desired time-related cost and monetary cost conditions.

While the air conditioning system according to the present disclosure has been described based on embodiments, the present disclosure is not restricted to such embodiments. One skilled in the art can conceive various modifications of the embodiments, or combinations of components of different embodiments without departing from the essence of the present disclosure, all of which are also encompassed by the scope of the present disclosure.

The present disclosure is useful in a system which controls an air conditioner by a smartphone or the like.

What is claimed is:

1. A method for controlling a terminal device in an air conditioning control system that controls an air conditioner, the air conditioner having a plurality of operating modes to cause a room temperature of a room in which the air conditioner is installed to reach a set temperature of the air conditioner, the method causing a computer of the terminal device to:
acquire, for each of the plurality of operating modes in a case where the air conditioner is in a stopped state, i) time information indicating a time from when the air conditioner switches from the stopped state to a running state, till the room temperature of the room reaches the set temperature, and ii) first charges information indicating electricity charges corresponding to an amount of electric power consumed by the air conditioner from when the air conditioner switches from the stopped state to the running state, till the room temperature of the room reaches the set temperature;

display a plurality of running buttons corresponding to the plurality of operating modes, in association with the time information and the first charges information corresponding to each of the plurality of running buttons; and upon detecting selection of one running button corresponding to one operating mode out of the plurality of operating modes, transmit a control command to the air conditioner, to control the air conditioner to run in the one operating mode, wherein the plurality of operating modes includes
a normal mode, and
an eco mode which consumes less electric power than the normal mode for the room temperature to reach the set temperature, and wherein in a case where a monetary amount indicated by the first charges information corresponding to the eco mode is smaller than a monetary amount indicated by the first charges information corresponding to the normal mode by a predetermined monetary amount or more, a running button corresponding to the eco mode is displayed.

2. The method according to claim 1,
wherein, when causing the computer of the terminal device to display the plurality of the running buttons corresponding to the plurality of operating modes, the time information and the first charges information corresponding to each of the plurality of operating modes are displayed within each of the plurality of the running buttons corresponding to the plurality of operating modes.

3. The method according to claim 1,
wherein, in a case where the air conditioner is running in the one operating mode, the one running button corresponding to the one operating mode is hidden from display,
wherein the time information and the first charges information corresponding to the one operating mode are displayed in a region where the one running button corresponding to the one operating mode had been displayed;
and wherein the time information and the first charges information corresponding to other operating modes other than the one operating mode are displayed within respective other running buttons corresponding to the other operating modes.

4. The method according to claim 1, further causing the computer of the terminal device to:
display a set temperature changing button that changes the set temperature of the air conditioner;
newly acquire, in a case where selection of the set temperature changing button is detected in the stopped state of the air conditioner before selection of the one running button, the time information and the first charges information corresponding to the changed set temperature of the air conditioner; and
update the time information and the first charges information, corresponding to each of the plurality of operating modes, to the newly acquired time information and the newly acquired first charges information.

5. The method according to claim 4,
wherein, in the case where the selection of the set temperature changing button is detected, a control command for controlling to change the set temperature of the air conditioner is transmitted to the air conditioner.

6. The method according to claim 1, further causing the computer of the terminal device to:
display a set temperature changing button that changes the set temperature of the air conditioner;
newly acquire, in a case where selection of the set temperature changing button is detected in the running state of the air conditioner after selection of the one running button, the time information and the first charges information corresponding to the changed set temperature of the air conditioner; and update the time information and the first charges information, corresponding to each of the plurality of operating modes, to the newly acquired time information and the newly acquired first charges information.

7. The method according to claim 6,
wherein, in the case where the selection of the set temperature changing button is detected, a control command for controlling to change the set temperature of the air conditioner is transmitted to the air conditioner.

8. The method according to claim 1, further causing the computer of the terminal device to:
acquire, at a predetermined timing, temperature information indicating the room temperature of the room in which the air conditioner is installed,
newly acquire, in a case where the acquired temperature information changes from previous temperature information indicating the room temperature acquired at a previous time, the time information and the first charges information corresponding to the changed temperature information; and
update the time information and the first charges information, corresponding to each of the plurality of operating modes, to the newly acquired time information and the newly acquired first charges information.

9. The method according to claim 1,
wherein the plurality of operating modes further includes a powerful mode which takes less time than the normal mode for the current room temperature to reach the set temperature,
and wherein, in the case where the monetary amount indicated by the first charges information corresponding to the eco mode is not smaller than the monetary amount indicated by the first charges information corresponding to the normal mode by the predetermined monetary amount or more, and also a duration indicated by the time information corresponding to the powerful mode is not shorter than a duration indicated by the time information corresponding to the normal mode by a predetermined amount of time or more, only a running button corresponding to the normal mode is displayed.

10. The method according to claim 1, further causing the computer of the terminal device to:
acquire, at a predetermined timing, temperature information indicating the room temperature of the room in which the air conditioner is installed;
acquire, in a case where the acquired temperature information reaches the set temperature of the air conditioner, second charges information indicating electricity charges corresponding to an amount of electric power consumed by the air conditioner, that is necessary for the air conditioner to maintain the set temperature; and
switch display of the time information and the first charges information corresponding to at least the one operating mode, to the second charges information corresponding to at least the one operating mode.

11. The method according to claim 1, further causing the computer of the terminal device to:
acquire, at a predetermined timing, temperature information indicating the room temperature of the room in which the air conditioner is installed;
acquire, in a case where the acquired temperature information reaches the set temperature of the air conditioner, second charges information indicating electricity charges corresponding to an amount of electric power consumed by the air conditioner, that is necessary for the air conditioner to maintain the set temperature, in each of the plurality of operating modes; and
switch the time information and the first charges information corresponding to each of the plurality of operating modes, to the second charges information corresponding to each of the plurality of operating modes.

12. The method according to claim 1, further causing the computer of the terminal device to:
newly acquire, at a predetermined timing, the time information, and the first charges information for each of the plurality of operating modes; and
update the time information and the first charges information corresponding to each of the plurality of operating modes, to the newly acquired time information and the newly acquired first charges information.

13. The method according to claim 1, further causing the computer of the terminal device to:
acquire, from the air conditioning control system, i) set information indicating the set temperature of the air conditioner, ii) temperature information indicating the room temperature of the room in which the air conditioner is installed, and iii) capability information indicating an air conditioning control speed and an air conditioning control unit cost, for each of the plurality of operating modes; and
generate the time information and the first charges information for each of the plurality of operating modes, using the acquired set information, the acquired temperature information, and the acquired capability information.

14. The method according to claim 1,
wherein the time information and the first charges information are acquired from the air conditioning control system for each of the plurality of operating modes.

15. A method for controlling a terminal device in an air conditioning control system that controls an air conditioner, the air conditioner having a plurality of operating modes to cause a room temperature of a room in which the air conditioner is installed to reach a set temperature of the air conditioner,
the method causing a computer of the terminal device to:
acquire, for each of the plurality of operating modes in a case where the air conditioner is in a stopped state, i) time information indicating a time from when the air conditioner switches from the stopped state to a running state, till the room temperature of the room reaches the set temperature, and ii) first charges information indicating electricity charges corresponding to an amount of electric power consumed by the air conditioner from when the air conditioner switches from the stopped state to the running state, till the room temperature of the room reaches the set temperature;
display a plurality of running buttons corresponding to the plurality of operating modes, in association with the time information and the first charges information corresponding to each of the plurality of running buttons; and
upon detecting selection of one running button corresponding to one operating mode out of the plurality of operating modes, transmit a control command to the air conditioner, to control the air conditioner to run in the one operating mode,
wherein the plurality of operating modes includes
a normal mode, and an eco mode which consumes less electric power than the normal mode for the room temperature to reach the set temperature, and wherein, in a case where a monetary amount indicated by the first charges information corresponding to the eco mode is not smaller than a monetary amount indicated by the first charges information corresponding to the normal mode by a predetermined monetary amount or more, a running button corresponding to the eco mode is displayed in a different form from a running button corresponding to the normal mode.

16. The method according to claim 15, the causing the computer of the terminal device to display the running button corresponding to the eco mode in the different form comprises displaying the running button corresponding to the eco mode in a different color than the running button corresponding to the normal mode.

17. The method according to claim 15, the causing the computer of the terminal device to display the running button corresponding to the eco mode in the different form comprises hiding the running button corresponding to the eco mode from display.

18. A method for controlling a terminal device in an air conditioning control system that controls an air conditioner, the air conditioner having a plurality of operating modes to cause a room temperature of a room in which the air conditioner is installed to reach a set temperature of the air conditioner, the method causing a computer of the terminal device to:

acquire, for each of the plurality of operating modes in a case where the air conditioner is in a stopped state, i) time information indicating a time from when the air conditioner switches from the stopped state to a running state, till the room temperature of the room reaches the set temperature, and ii) first charges information indicating electricity charges corresponding to an amount of electric power consumed by the air conditioner from when the air conditioner switches from the stopped state to the running state, till the room temperature of the room reaches the set temperature;

display a plurality of running buttons corresponding to the plurality of operating modes, in association with the time information and the first charges information corresponding to each of the plurality of running buttons; and upon detecting selection of one running button corresponding to one operating mode out of the plurality of operating modes, transmit a control command to the air conditioner, to control the air conditioner to run in the one operating mode, wherein the plurality of operating modes includes
a normal mode, and
a powerful mode which takes less time than the normal mode for the room temperature to reach the set temperature, and wherein, in a case where a duration indicated by the time information corresponding to the powerful mode is shorter than a duration indicated by the time information corresponding to the normal mode by a predetermined amount of time or more, a running button corresponding to the powerful mode is displayed.

19. A method for controlling a terminal device in an air conditioning control system that controls an air conditioner, the air conditioner having a plurality of operating modes to cause a room temperature of a room in which the air conditioner is installed to reach a set temperature of the air conditioner, the method causing a computer of the terminal device to:

acquire, for each of the plurality of operating modes in a case where the air conditioner is in a stopped state, i) time information indicating a time from when the air conditioner switches from the stopped state to a running state, till the room temperature of the room reaches the set temperature, and ii) first charges information indicating electricity charges corresponding to an amount of electric power consumed by the air conditioner from when the air conditioner switches from the stopped state to the running state, till the room temperature of the room reaches the set temperature;

display a plurality of running buttons corresponding to the plurality of operating modes, in association with the time information and the first charges information corresponding to each of the plurality of running buttons; and upon detecting selection of one running button corresponding to one operating mode out of the plurality of operating modes, transmit a control command to the air conditioner, to control the air conditioner to run in the one operating mode, wherein the plurality of operating modes includes
a normal mode, and
a powerful mode which takes less time than the normal mode for the room temperature to reach the set temperature, and wherein, in a case where a duration indicated by the time information corresponding to the powerful mode is not shorter than a duration indicated by the time information corresponding to the normal mode by a predetermined amount of time or more, a running button corresponding to the powerful mode is displayed in a different form from a running button corresponding to the normal mode.

20. The method according to claim 19, the causing the computer of the terminal device to display the running button corresponding to the powerful mode in the different form comprises displaying the running button corresponding to the powerful mode in a different color than the running button corresponding to the normal mode.

21. The method according to claim 19, causing the computer of the terminal device to display the running button corresponding to the powerful mode in the different form comprises hiding the running button corresponding to the powerful mode from display.

* * * * *